US007233960B1

(12) United States Patent
Boris et al.

(10) Patent No.: US 7,233,960 B1
(45) Date of Patent: *Jun. 19, 2007

(54) SYSTEM AND METHOD FOR MOBILE WIRELESS ELECTRONIC DATA CAPTURE AND DISTRIBUTION OF A MERCHANT CARD-PROCESSING APPLICATION

(75) Inventors: Ann S. Boris, Philadelphia, PA (US); RoseMary Wall, Philadelphia, PA (US)

(73) Assignee: Numoda Corporation, Philadelphia, PA (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/281,481

(22) Filed: Oct. 25, 2002

Related U.S. Application Data

(60) Provisional application No. 60/339,964, filed on Oct. 31, 2001.

(51) Int. Cl.
G06F 17/30 (2006.01)
G06F 15/16 (2006.01)

(52) U.S. Cl. .............................. 707/104.1; 707/103 R; 719/318

(58) Field of Classification Search ............. 707/104.1; 705/38
See application file for complete search history.

(56) References Cited

U.S. PATENT DOCUMENTS

| 4,905,080 | A |   | 2/1990  | Watanabe et al. |
|-----------|---|---|---------|-----------------|
| 5,379,213 | A |   | 1/1995  | Derks |
| 5,437,027 | A |   | 7/1995  | Bannon et al. |
| 5,560,005 | A |   | 9/1996  | Hoover et al. |
| 5,570,415 | A |   | 10/1996 | Stretton et al. |
| 5,615,112 | A |   | 3/1997  | Liu Sheng et al. |
| 5,704,029 | A | * | 12/1997 | Wright, Jr. .................. 715/505 |
| 5,857,201 | A | * | 1/1999  | Wright et al. ............ 707/104.1 |
| 5,870,765 | A |   | 2/1999  | Bauer et al. |
| 5,873,086 | A |   | 2/1999  | Fujii et al. |
| 5,899,998 | A |   | 5/1999  | McGauley et al. |
| 5,950,173 | A |   | 9/1999  | Perkowski |
| 5,970,490 | A |   | 10/1999 | Morgenstern |
| 5,995,965 | A |   | 11/1999 | Experton |

(Continued)

FOREIGN PATENT DOCUMENTS

WO    WO 01/73612 A1    10/2001

OTHER PUBLICATIONS

Fulton, "Sams Tech Yourself Microsoft Excel in 10 minutes", Apr. 30, 1999, Sams Publishing, "Lesson 28: Working with a database".*

(Continued)

Primary Examiner—Jeffrey Gaffin
Assistant Examiner—Hassan "Tony" Mahmoudi
(74) Attorney, Agent, or Firm—Akin Gump Strauss Hauer + Feld, LLP

(57) ABSTRACT

A computerized data capture system for processing applications for merchant card service processing accounts is provided. The system has a project database that includes a plurality of data capture objects that are relevant to the system and table structures which define the relationship between the data capture objects. A subset of the data capture objects are defined to process applications for merchant card service processing accounts. Applications for merchant card service processing accounts are captured and processed using the plurality of data capture objects and the table structures of the project database.

9 Claims, 13 Drawing Sheets

U.S. PATENT DOCUMENTS

| | | | |
|---|---|---|---|
| 5,999,908 A | 12/1999 | Abelow | |
| 6,012,067 A | 1/2000 | Sarkar | |
| 6,035,297 A | 3/2000 | Van Huben et al. | |
| 6,058,393 A | 5/2000 | Meier et al. | |
| 6,063,128 A | 5/2000 | Bentley et al. | |
| 6,065,008 A | 5/2000 | Simon et al. | |
| 6,067,523 A | 5/2000 | Bair et al. | |
| 6,084,585 A * | 7/2000 | Kraft et al. | 715/733 |
| 6,112,206 A | 8/2000 | Morris et al. | |
| 6,135,349 A | 10/2000 | Zirkel | |
| 6,170,057 B1 * | 1/2001 | Inoue et al. | 713/153 |
| 6,193,152 B1 | 2/2001 | Fernando et al. | |
| 6,298,347 B1 | 10/2001 | Wesley | |
| 6,494,367 B1 * | 12/2002 | Zacharias | 235/382 |
| 6,834,285 B1 * | 12/2004 | Boris et al. | 707/103 R |
| 6,944,866 B1 * | 9/2005 | MacPhail | 709/204 |
| 2001/0056475 A1 * | 12/2001 | Anderson et al. | 709/217 |
| 2002/0026410 A1 * | 2/2002 | Woloshin et al. | 705/38 |
| 2002/0052835 A1 * | 5/2002 | Toscano | 705/38 |
| 2002/0077964 A1 * | 6/2002 | Brody et al. | 705/38 |
| 2002/0083044 A1 * | 6/2002 | Kalpan | 707/1 |
| 2002/0138411 A1 * | 9/2002 | Monlux et al. | 705/38 |
| 2002/0138414 A1 * | 9/2002 | Baker | 705/38 |
| 2002/0194068 A1 * | 12/2002 | Bishop et al. | 705/14 |
| 2002/0198822 A1 * | 12/2002 | Munoz et al. | 705/38 |
| 2003/0014330 A1 * | 1/2003 | Showghi et al. | 705/26 |
| 2003/0033209 A1 * | 2/2003 | Minear et al. | 705/26 |
| 2003/0046222 A1 * | 3/2003 | Bard et al. | 705/38 |
| 2003/0083944 A1 * | 5/2003 | Duvall et al. | 705/21 |
| 2003/0120586 A1 * | 6/2003 | Litty | 705/38 |
| 2003/0163412 A1 * | 8/2003 | Monlux et al. | 705/38 |
| 2003/0177066 A1 * | 9/2003 | Zhang et al. | 705/14 |

OTHER PUBLICATIONS

Hester, "FileMaker Pro 5.5 for Windows and Macintosh: Visual QuickStart Guide", Dec. 28, 2001, Copyright 2000, Peachpit Press, "Chapter 2: Database Basics".*

Peterson, "Absolute Beginner's Guide to Databases", Mar. 5, 2002, Que, "Chapter 1: An Introduction to Databases".*

International Search Report for PCT/US01/09227, dated Jun. 12, 2001, 1 page.

Yamagishi et al., A Multi-Representational Design Data Capture System, IEEE Custom Integrated Circuits Conference, 1993, pp. 13.2.1-13.2.4 (4 pages).

* cited by examiner

*Figure 13*

SYSTEM AND METHOD FOR MOBILE WIRELESS ELECTRONIC DATA CAPTURE AND DISTRIBUTION OF A MERCHANT CARD-PROCESSING APPLICATION

CROSS-REFERENCE TO RELATED APPLICATIONS

This application claims the benefit of U.S. Provisional Application No. 60/339,964, filed Oct. 31, 2001, entitled "SYSTEM AND METHOD FOR MOBILE WIRELESS ELECTRONIC DATA CAPTURE AND DISTRIBUTION OF A MERCHANT CARD-PROCESSING APPLICATION," which is incorporated herein by reference in its entirety.

This application relates to copending U.S. application Ser. No. 09/724,541 filed Nov. 27, 2000 entitled "COMPUTER SYSTEM FOR PORTABLE DIGITAL DATA CAPTURE AND DATA DISTRIBUTION," also found in WO 01/73612, which is incorporated by reference herein.

This application also relates to U.S. Pat. No. 6,298,347 entitled "SYSTEM AND METHOD FOR REMOTE DATA ENTRY," which is also incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The present invention relates to systems and methods to apply for processing accounts and, more particularly, to enable a merchant to apply for a credit card processing account using a small form factor computing device such as a handheld computer with modem, PDA with modem, or phone connecting to a server through a communications medium.

Customers use credit cards and other bankcards, such as direct debit cards, to purchase and order goods and services from merchants. Banks and other financial service organizations complete, collect and process merchant applications to sign up for card processing, either directly with the merchant, through a sales representative of the bank or indirectly, through an outsource company that specializes in obtaining merchant applications. The faster that a merchant can sign up for customer card processing, the faster the merchant can collect revenues from credit card and bank card sales. In addition, the customer is given the convenience of multiple options for payment. It is estimated that an electronic and automated method for data capture and data distribution can reduce the time of merchant sign up from 28 days to 2 days. The faster the bank or financial services institution can get the merchant signed up, the faster they can collect funds for processing credit card transactions, and the faster they can generate revenue from the use of a card for the transaction. Merchants are located in many different places across the globe and the sales force that visits them covers a large territory. Organizing and tracking the collected merchant applications, distributing and reporting the data to the proper parties, and distributing the merchant number that signals the approval for services for card processing is a daunting task of data distribution and logistics management that spans across several organizations. Sales representatives are required to learn the complex process of completing a merchant application, which requires coordinating pricing models (which change very frequently), and discounts available along with a complete listing of hardware and software that the merchant can choose from to process cards at the store. The sales rep must also know the rules for making a decision about which combination of hardware is best suited for the merchant and which software is configured for that hardware. Often the merchant application is completed and approved only to be delayed by the delivery of the incorrect hardware and software for "card swiping" or credit entry. A delay in getting the right solution to the customer delays the realization of financial services organization revenue for transactions and merchant revenue for card use by the customer. Some sales reps, in an effort to avoid all the inconvenience of the process, have the merchant sign the application in blank, for later input into a laptop system. Relying on human memory leads to errors, or at best, makes the process of completing a merchant card processing application redundant.

Typical methods for merchant card processing applications are solutions that automate and allow for electronic data capture for certain portions of the sale and merchant application process. Some sales representatives who visit a merchant location to collect data for the merchant's application use laptop solutions. A laptop solution, or a laptop with a handheld device that connects to it, eliminates the need for manual completion of paperwork associated with the process, yet requires sales representatives to carry a heavy laptop into a sales call with a merchant. These laptops are expensive and easily damaged or stolen and cumbersome to set up in a retail store where space is very valuable. The laptop solution is also lacking a mechanism for sales representatives to receive information about potential customers who have notified a bank of their interest in signing up for card processing services. The solution provided to a sales force is usually a piecemeal combination of hardware, software and connectivity that is not easily updated if and when frequent changes are implemented in a merchant application. In addition, completing a credit processing application using a laptop system is cumbersome for data entry and is obtrusive to the merchant. Connecting to a server for delivery of the data from the laptop is a complicated process of sign-on and requires constant connectivity to the database during the process. Sales reps and merchant are alienated as a result of the complex system of software and laptop to make the solution work. Complaints about this method include the following comments from sales reps: "There is no place to set up the laptop with the merchant"; "It takes too much time to boot up the laptop"; "Making corrections to errors is not easy"; and "Laptops are expensive to purchase and support". Another method for completion of a merchant application is disclosed in U.S. Pat. No. 6,135,349 (Zirkel) entitled "System and Method for Enabling a Merchant to Apply for a Credit Card Account Using the Internet." The scheme in this patent is an advance over paper-based system of a sales representative completing an application for a merchant. However, there are several problems with this approach:

(1) A merchant must purchase and install or must have available to them a computer with browser software and Internet connectivity. Then the merchant must install the hardware, software and connectivity and maintain the system.

(2) Connection to the Internet must be continuous during completion of the application process or all input that was made in an application will be lost and the input must be reentered.

(3) Two-way synchronization is not available to return the status of the application (whether it was approved) or to ask additional questions to approve the application.

(4) Brick and Mortar stores require additional hardware and software in order to electronically process the cards, yet a mechanism for calculating the right combination of hardware and software is not available as part of the Internet solution.

(5) Merchants are very seldom at their desk and are often "minding the store" so that a desktop solution cannot be easily accessed anytime.

(6) Laptops, laptops with handhelds, or handhelds with browser capabilities require recompiling to configure changes in the applications on the handheld or laptop.

The present invention solves each of those problems and is a significant improvement over a laptop solution.

Requirements of a mobile wireless merchant bankcard processing application—Such an application must solve the problems listed above. In one solution set forth in the present invention, four main components are required as follows:

1. A computer system for portable digital data capture and data distribution—This system will manage the design and assembly of the complex components that make up the entire application process. This includes the logistics management of card processing hardware and software inventory, configuration for the merchant and delivery of the desired solution.

2. A set of specialized programs that consist of interfaces, logic and edit checks on handheld computing devices or phones that enable a user to enter and view data, assignments, help text, answer choices, and other items and help the user calculate the needs of the customer based on input made in the interface.

3. A set of specialized tools that enable a user to make changes to data and information that will be revealed to the user of the handheld device and to enable other users to distribute and view data collected with the devices.

4. A means for delivering new programs specific to each handheld device based on data received from other databases, interfaces, or based on data received from the handheld device. An example of this is the delivery of the merchant number, which designates the approval of the merchant's card processing account or the delivery of a request for additional information. The advantage of this is that it speeds time to revenues for both the financial service organization and the merchant.

5. A means for automated synchronization of the programs to deliver data, receive data, or be updated with new program functionality and configurations.

These requirements can be met with the following six elements:

1. A Computer System for Portable Digital Data Capture and Data Distribution

One system that is suitable for use in the present invention is disclosed in U.S. patent application Ser. No. 09/724,541. A mobile electronic merchant application is used to capture and distribute different data within the project. It may also be used to capture and distribute different data between projects. For example, within the project, one sales rep may serve the needs of the lodging merchants with all the associated questions, pricing models and hardware and software for "card swiping", while another sales rep may serve the restaurant merchants with a different set of information required for them. Within the project, the two different sales reps would receive a different directory of data capture objects on their handheld device that will enable them to view and enter data without sorting through questions and screens that do not pertain to their work. In addition, different questions might be required across different sales forces and/or different financial service firms. To manage this customization across companies and sales reps, the system must automate the design, creation, manipulation, tracking, visualizing, and distribution of a data capture and data distribution project, as described in U.S. application Ser. No. 09/724,541. The logistics requirements of managing the merchant's hardware and software needs for card processing and the ordering and delivery of this equipment are a complex. This problem can be solved by the use of the system in U.S. application Ser. No. 09/724,541.

2. Significant Number of Data Elements

The merchant application process requires the entry of a large number of data elements (questions). On average, there are 1,000-1,500 questions for data capture in a merchant application. Merchants and the sales rep must answer demographic information about the business and other business locations, and about the owners of the business. There are questions about bank references, credit references, expected sales and type of goods sold. There is legal information needed regarding bankruptcies, credit history and other businesses. Then there are questions about the services that the merchant will require for card processing, for example, is a PIN Pad for entry of a PIN needed, a barcode scanner for check reading, or does the merchant want VISA, MasterCard and AMEX. On a handheld computing device or a phone, the screen is small and not easily visualized so that it would be necessary to present multiple questions on an individual screen without crowding the screen with information and making it difficult to visualize. In addition the device does not have the computing capabilities of a laptop or desktop PC. It is therefore important to present the questions in a simple computing format so that complex calculations, logic that sorts through and presents screens, navigation and edit checks might be included in each of the questions.

3. Store and Forward Architecture Enabling Offline Browsing

The use of HTML pages in U.S. Pat. No. 6,135,349 requires that the HTML pages with answers input by the merchant be returned to the server and then returned to the device if the answers are not completely filled out. This would be similar with Wireless Markup Language (WML) pages or with the presentation of a form on a device. Waiting for a message that the page is not completely filled would take time and would require a constant connection to the server. The constant connectivity needed for pages and forms may be impossible with the short supply of bandwidth and with the drop off of connectivity in wireless networks. The requirements for a mobile wireless merchant application system should include a store and forward architecture that enables objects to be delivered to the handheld computer and enables the user to work "offline" and then connect to the server to transmit data that has been collected and verified as accurate by the objects on the device. Being tethered to an Internet connection in order to perform work is not a mobile solution. Neither is a solution that requires the user to synchronize with the desktop or laptop. In comparison, this would be like a mobile phone that requires one to return to a desk station to connect and receive all calls. This is not a truly mobile solution. To utilize an Internet connection with HTML pages would limit the mobile capabilities of the device and limit the benefits for a mobile workforce. The use of object-based architecture, where each of the individual screens or questions is an object that is forwarded to the device for use while not connected, creates additional flexibility and mobility for the sales rep. With architecture such as described above, there is one point of entry for the changes, which are forwarded to all users. Changes to the application, pricing, or product availability can be immediately forwarded to all users in the field, eliminating the need to return to a central location for updates. In addition, if a problem arises that the device becomes lost or the battery drains, the lost objects can be immediately remotely forwarded to the device during a connection with the server. Information, as well as data capture objects, can be forwarded. For example, the in-house sales group that has obtained sales leads can forward the merchant application that was started over the phone to the appropriate sales rep.

A mobile wireless merchant card processing application system provides for the capture and distribution of an organization's mission critical data. An important requirement for this solution is to provide this functionality via wireless devices with no drop-off despite the narrow bandwidth available today. Bandwidth cannot be a primary concern with the need for large sets of answers and other information transmitted to and from the handheld device. Meticulous organization tracking and delivery of project subsets using a system such as disclosed in U.S. patent application Ser. No. 09/724,541 eliminates the need for a lot of bandwidth required during transmission of the objects with any standard operating system including Palm OS, Win CE and RIM. Telecommunications carriers use a host of network options for connectivity such as CDMA, CDPD, TDMA, GSM and 802.11 networks. A system will need to optimize the use of the spectrum by using both circuit switched and packet-switched data services. Store and forward technology in combination with the efficient use of bandwidth enables the user to enter data in the handheld device or phone without a constant connection to a wireless network. Data organized and communicated by a system such as disclosed in U.S. patent application Ser. No. 09/724,541 during transmission to make the most efficient use of bandwidth provides communications that are relatively short and tightly controlled. This flexibility gives users a choice regarding the best possible communications mechanism. The network, the carrier, the bandwidth should not be a concern and there should not be a problem with stopped data due to bandwidth limitations.

4. Safety and Security of Data Transmission

Sensitive financial information is collected during data input by a sales rep and it is essential to maintain control with user ID and PIN so that information is available to only those with permission to view it. User ID and PIN is in addition to the security of the server that recognizes only devices approved for access. Encryption on the device and during transmission and transmissions of answers only (not questions with answers) is necessary so that interrupted transmissions are not read. When transmissions are interrupted, the system needs to prevent loss of data.

5. Signature Capture and Specialized Functionality

The ability to collect the signature of the merchant is an essential part of the application. There may be additional functionality requirements among the different user groups/sales force that will need the ability to add new sets of objects that automate other aspects of the sales process, such as the presales encounter and sales encounter process, among others.

6. Reporting

Although reports may not be essential for a system such as this, the availability of reports distributed to the handheld device or the phone eliminate the need for the sales rep to return to the office to view the status of accounts, view their work for the month, get assignments, and get updates in pricing and product/service offerings. Reporting, as discussed herein, also includes the ability to translate and distribute data returned to the project database into other databases and the ability to translate and return data from other databases to the project database to be forwarded as a subset of objects to a specific user's device.

7. Synchronization for Program Changes and Data Exchange

The ability to connect to a small storage computer to receive updates to the program without the intervention of technical support. This remote configuration allows changes to be made to the program without the need to remove the handheld device from use in the field.

BRIEF SUMMARY OF THE INVENTION

A computer system and method for processing mobile wireless merchant card service applications is provided wherein the computer system has a storage device; first and second platforms; a merchant credit card processing project; a means to forward a project subset during synchronous reconciliation between the first and second platform; a means to translate data between the project subset and other storage devices; and a means to incorporate changes to the project subset and translate them to a form acceptable to the communication medium and/or first platform and update the project subset as a result, and then forward the changed project subset to the first platform. The present invention relates to a system and method to assemble a mobile wireless electronic merchant card processing application, which may use a computer system for portable digital data capture and distribution, such as disclosed in U.S. patent application Ser. No. 09/724,541, in order to automate the collection and distribution of electronic data in a merchant application to the other platform for review and approval for a merchant account. Upon approval, the merchant will be allowed to perform credit and other bank card transactions. In contrast to the present invention, the scheme in U.S. Pat. No. 6,135,349 does not automate the process of collection and distribution of electronic data in a merchant application, but merely makes the data electronic. More particularly, the present invention is related to an object-oriented computerized data capture and data distribution system that is used to construct an electronic credit card processing application with specialty GUIs from a set of component objects and the like; forward subsets of data capture objects from a project database to a small mobile wireless handheld computing device or cellular phone for the purpose of capturing data and registering transactions; persistently save, recall, reconcile, share and distribute the project and information from other databases/tables; and forward additional object subsets to the device in response from input from those databases and in response to queries designed by the user by means of the objects on the device. This mobile wireless system for merchant card processing provides services that include: retrieving the merchant application project from the storage device; manipulating the merchant application project by adding, redefining and removing persistent objects; marking the merchant application project for forwarding to the first platform; persistently saving the project to the storage device, reconciling versions, and adding data to the project that has been reconciled with other storage devices; and marking the project for distribution on the Internet and to the first platform.

The present invention includes the following steps in a mobile wireless merchant card service application process:

1. Assemble the objects from a library of data capture objects into a group of objects that will represent a mobile wireless electronic merchant card processing application with accompanying components and define the function of and logistics of objects in the group.

2. Translate from other databases or storage medium data pertaining to a specific subset of objects in the project database and integrate this data into the group of objects.

3. Query a subset of these objects with all accompanying data from the project database for the purpose of forwarding the subset and/or data to users or devices, which will perform transactions and/or view reports on this subset.

4. Query the project data for the purpose of forwarding and synchronizing any changes made to the subset by any user or device.

5. Translate the necessary data between the project subset and other databases or storage medium and translate data coming from the other database or storage medium into the project database for forwarding during the next reconciliation.

BRIEF DESCRIPTION OF THE DRAWINGS

The above summary, as well as the following detailed description of a preferred embodiment of the invention, will be better understood when read in conjunction with the following drawings. For the purpose of illustrating the invention, the drawings show an example of how the invention is used in a merchant card processing application process. It should be understood that the invention is not limited to the precise arrangements and instrumentalities shown. In the drawings:

Figure 13:
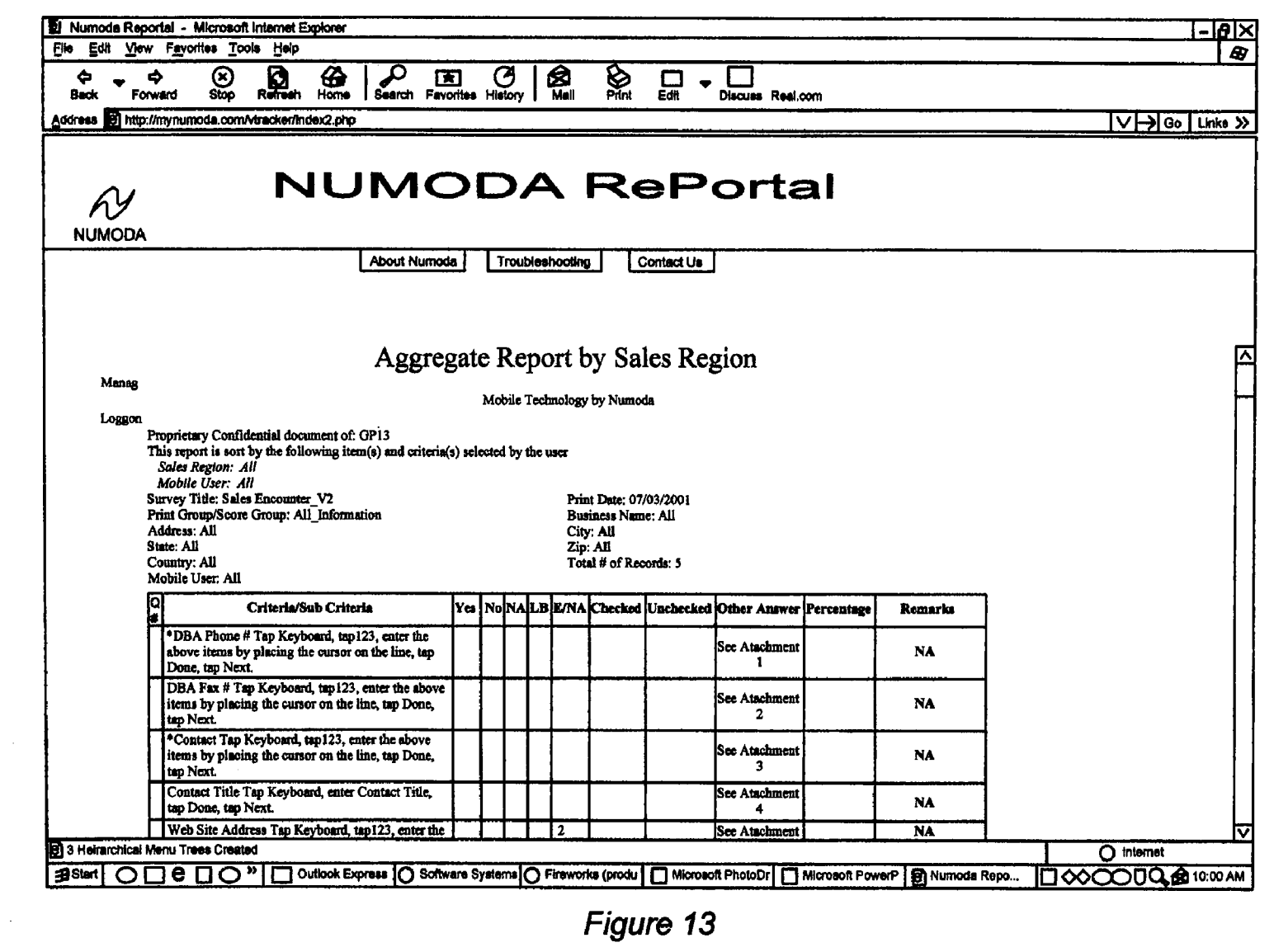

FIG. 13 is a sample report screen for the portal of FIG. 12.

DETAILED DESCRIPTION OF THE INVENTION

Figure 1:
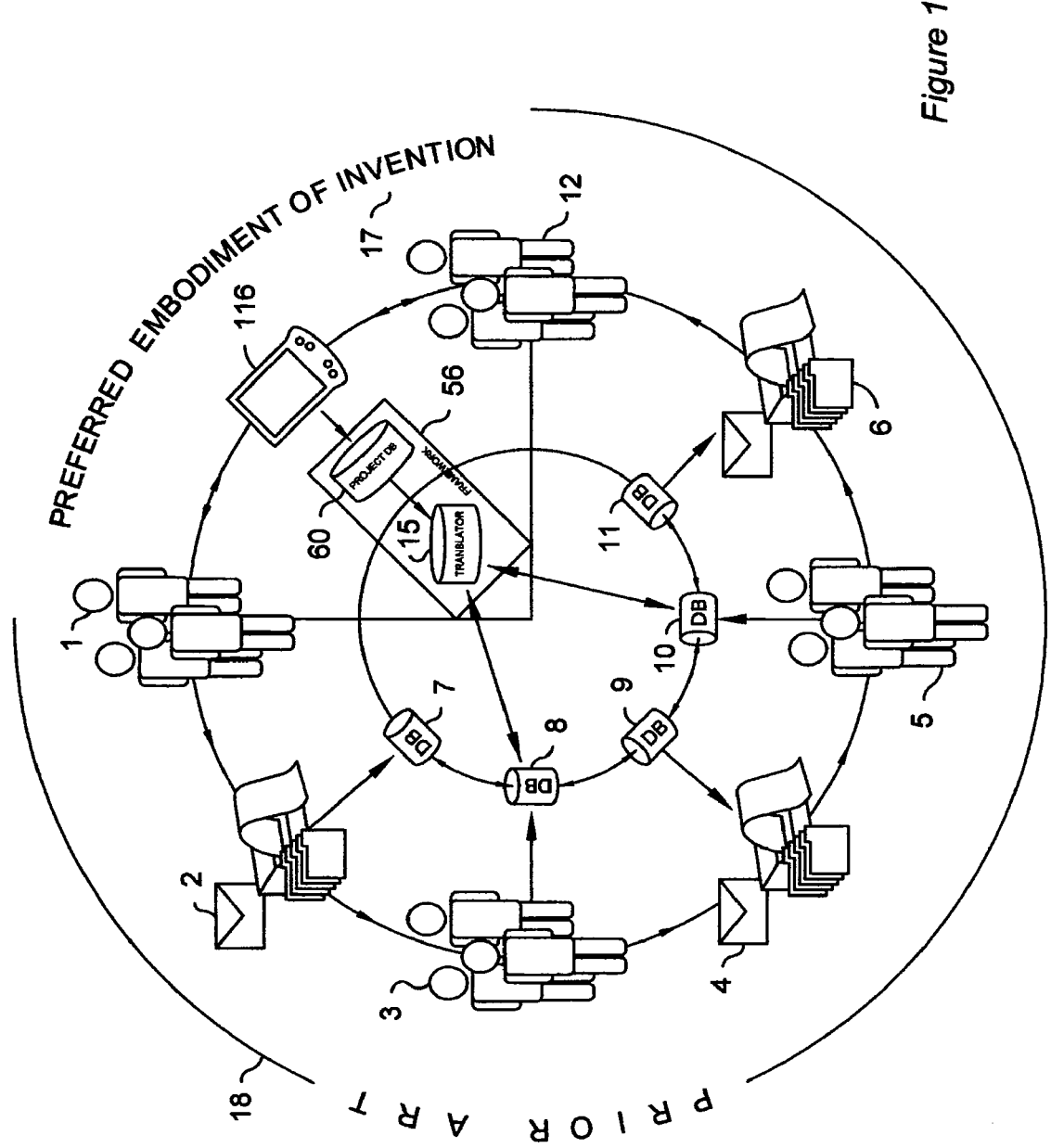
FIG. 1 is a comparison diagram depicting the time spent and workflow of the conventional (prior art) process for a merchant card processing application system vs. a system in accordance with one preferred embodiment of the present invention.

Certain terminology is used herein for convenience only and is not to be taken as a limitation on the present invention. In the drawings, the same reference letters are employed for designating the same elements throughout the several figures.

1. Overview of Present Invention

A mobile wireless system and method to collect and process merchant card processing applications is provided that would enable a merchant to apply for a credit card processing account using a small portable computer such as a PDA with a modem or phone. This system and method includes a wire line or cellular network communication link between the portable computer and a server. On the PDA or phone resides a subset of data capture objects that has been forwarded from a project database residing on the server. This set of objects form an interactive software application on the device which prompts the user to input data into a set of Graphical User Interfaces. The PDA with modem or phone device connects to the server where the project database resides, through a cellular or wire line connection, and is recognized by the server, which then delivers the captured data into tables in the project database. The project database on the server distributes data to other servers that process the credit card processing account information to determine whether to grant the merchant a credit card processing account. Information about approval is distributed through the same mechanism back to the PDA, or phone, to be revealed in the application on the PDA or phone of the person who has requested the information.

One of the novel concepts of the present invention is to use a portable digital data capture and distribution system and related project database, such as disclosed in U.S. patent application Ser. No. 09/724,541, to assemble and manage the delivery of a specific set of data capture objects that are specifically designed and used to capture merchant card processing application data. In the preferred embodiment of the present invention, the project database contains data capture objects specific to the task of automating the collecting and distribution of merchant application data between multiple databases. The project database includes a plurality of project subsets. Each specific group of users or individual users gets a project subset forwarded from the project database.

This is a complete automation process and not just a process to make a single document electronic. For example, the present invention includes the delivery in the project database of data translated from one or more databases outside the project database after a procedure of translation.

The object oriented nature of the smallest data element or individual field and the table structure to designate the characteristics and functionality of the elements enable expansion and scalability to add additional functionality without the need to completely redesign of the entire system. For example, encryption o hardware may be added, or the distribution of data may be extended to multiple databases without the need for any system redesign.

Another important feature of the present invention is the use of answer tables containing incomplete records as part of the project subset. These incomplete records in relationship to the data capture objects are forwarded to the handheld device to give the user specific information and enable the user to respond with answers to questions within the record.

The conventional method of data capture and distribution for merchant card application processing has consisted of using a web browser or a form loaded onto a device from a desktop cradle for view or data entry into a database. This requires that a device gain access to the corporate database or a mirrored database as a window into the database. There are problems with this method that make it very difficult for an end user with a small mobile computing device to access the data that pertains only to them and to view it or make changes to the content in an efficient, user friendly manner. There are usually large amounts of data that the user must sift through to find what they need and it takes 15-20 minutes to even get into the corporate database. Since the method is form-based, if a connection is lost during that time, the progress made while sifting, is lost and the user must begin again. This is similar to the problems one encounters looking for information or purchasing something on the Internet from a desktop.

The preferred object-based embodiment of the present invention is a considerable improvement on current methods of electronic data capture. Objects are suited for a small computing format and screen and are easily processed by a small computing device. Instead of a form on the device, there is a program that allows the sales rep to custom-build his or her own forms and queries for the database only within the confines of the project. This eliminates searching through the entire database and provides protection for the rest of the data in the database. The objects in the program used in the present invention organize the individual fields into a table on the small computing device and set them in motion by determining or selecting configurations and complex characteristics marked in tables in an application server, and coordinating their reference to other tables.

By leveraging the specific question logic and skip protocols found in U.S. Pat. No. 6,298,347 and U.S. application Ser. No. 09/724,541, the preferred embodiment of the present invention has baked in the best experience of how the questions for the sales encounter and the equipment calculator can be most easily answered. The question and answer format creates a query that the translator carries to other databases to then find and transport information back into the project. The translator forwards the retrieved information into any type of mobile computing device. Accordingly, a sales rep is not simply getting access to look around inside a huge mirrored database which is a process that takes time and requires a continuous connection. The conventional methods of data capture and distribution thus present a security risk and are not efficient.

The present invention automates the entire process of merchant application processing. The mobile workers who interact with the merchants use devices which are easy to carry and use, do not require continuous connectivity to the server, can be managed and loaded with all appropriate data capture objects remotely, allow for two-way synchronization, and include objects that enable the calculation of software and hardware needs of the merchant for "in store" electronic card processing.

Another embodiment of the present invention is to use the systems and devices described in U.S. Pat. No. 6,298,347 in combination with the components discussed in this document.

2. Detailed Disclosure of Present Invention

One preferred embodiment of the present invention uses the system and methods in U.S. application Ser. No. 09/724,541. Another embodiment of the present invention uses the system and methods in U.S. Pat. No. 6,298,347. This would provide a less dynamic system of automation than the preferred embodiment, but would still be a significant improvement over the scheme disclosed in U.S. Pat. No. 6,135,349.

Figure 2:
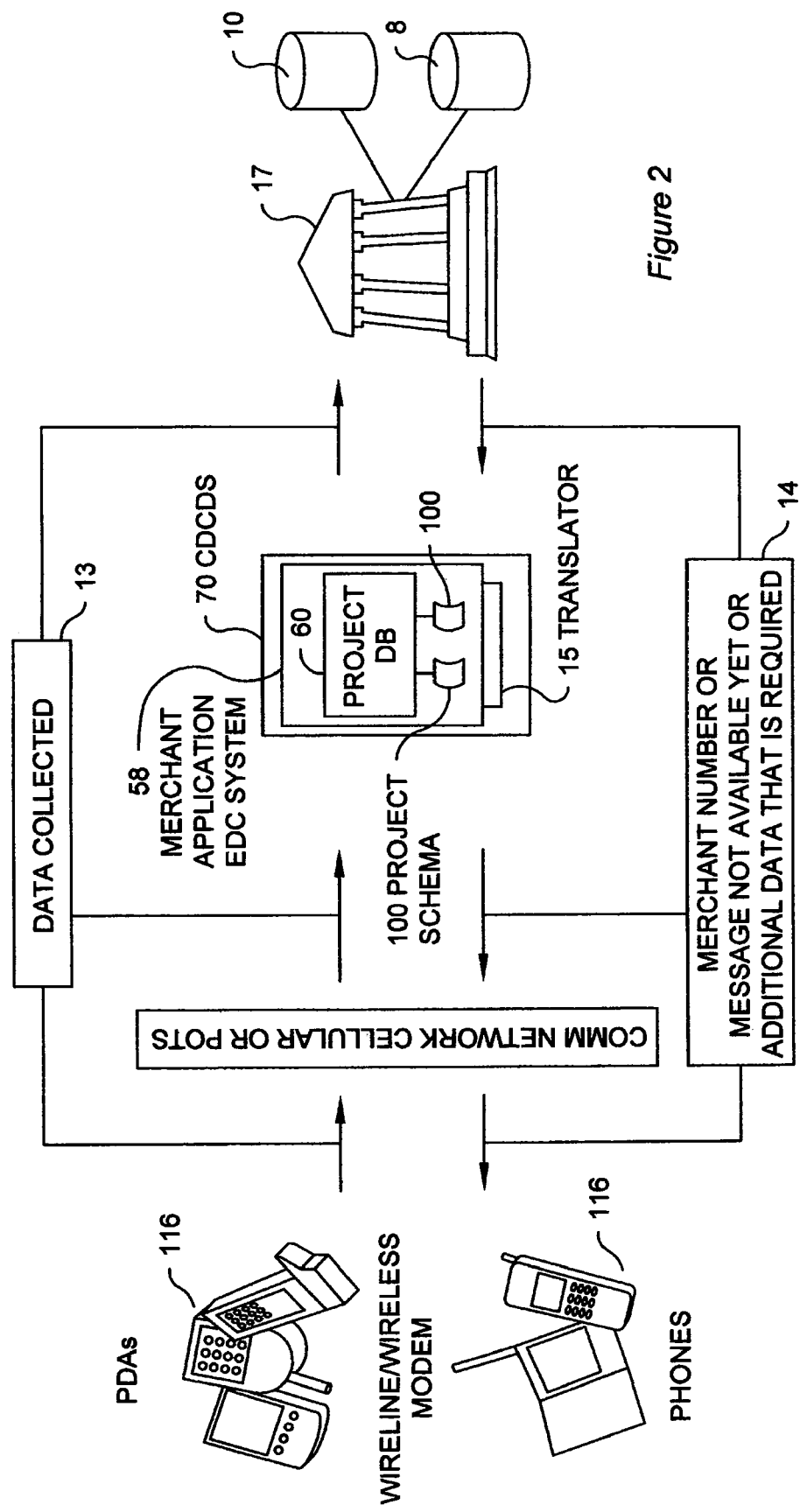
FIG. 2 is a diagram depicting the flow of the steps of the present invention showing data flowing through the translator in the project database between the salesperson or merchant and the Bank or financial services institution.

FIG. 1 illustrates the workflow for the prior art 18 in comparison to the workflow for the preferred embodiment of the invention 17. The diagram is depicted in a circular manner in order to represent the time element involved in the process with prior art 18 vs. the preferred embodiment of the invention 17. The prior art 18 requires the use of several different types of individuals 1, 3, 5, and 12 interacting with different sets of paperwork/phone/and electronic data entry 2, 4 and 6 shown with arrows connecting them in the direction of information flow. These sets are entered or retrieved from a number of different databases depicted in FIG. 1 as DB 7, DB 9, and DB 11. Personnel 3 and 5, who are also shown, connected to the process by the arrows depicting data flow, access several other different databases such as DB 8 and DB 10. U.S. Pat. No. 6,135,349 merely delivers an electronic means to collect the merchant materials 2 and to submit these to DB 7 by means of the Internet. Although this has offered a valuable service for eliminating the need for completing paper forms and then performing data entry using those forms, it has done little to eliminate the errors and inconvenience associated with data entry from a desktop with a browser and it has only eased the burden of data entry into one database as seen in FIG. 2 of U.S. Pat. No. 6,135,349. This is because the prior art uses pages exchanged with a server over the Internet and is not object-based and thus not capable of interactive functionality that objects are capable of.

The prior art process, as exemplified by U.S. Pat. No. 6,135,349, has also done little to automate the rest of the complex logistics and data entry requirements needed to deliver the necessary data to a number of disparate databases in order to get approval for, and the right equipment to, the merchant 12, thereby giving them the means to process sales from customers using credit and bank cards. The prior art does not automate the management of the sales force (track and deliver assignments, produce new electronic forms as needed) on both a web-browser and a mobile computing device. The prior art has only decreased the time involved in some of the steps and the movement of data between the different parts of the process rather than consider the process, as a whole to eliminate steps in the process and speed up the entire process. The prior art does not allow or enable the automatic aggregation of collected data into reports.

The preferred embodiment of the present invention 17, shown in FIG. 1, on the other hand offers a solution to automate all the steps involved in a merchant card processing application and approval process, and to directly collect and exchange data using a mobile wireless computing device shown in FIG. 1 as a handheld with a project subset 116 between groups of individuals, shown in FIG. 1 as sales representatives 1 and the merchant 12, although this information can be exchanged with a number of different groups of individuals. The present invention is an improvement on the data collection component in that it simplifies and speeds the flow of data between a mobile computing device, such as a handheld hardware 34, through the framework 56, to a project database 60 and enables the data to be changed into multiple formats for forwarding between multiple databases, DB 8 and DB 10 by means of the translator 15.

FIG. 2 shows a more detailed diagram of the automation of data flow in the present invention. A handheld computing device is forwarded a project subset 116 which consists of a specific set of project schema 100, assembled and managed by the system in U.S. patent application Ser. No. 09/724,541, from a component of the present invention called a project database 60. With this project subset 116, the user can collect basic merchant information, order the hardware and software needed for the merchant to process credit and bankcards, as well as receive a merchant account number designating approval from the bank 17. This project subset 116 is not limited to this functionality. The user can even receive a message that additional information is required from the merchant in order to give approval. The data collected 13 is transmitted from the objects in the project subset 116 across a communications network into the project database 60 based on configurations set for the Merchant Application EDC System 58 within the CDCDS 70. The translator will organize the collected data 13 in a format that is readable by the DB 10 and DB 8 of the bank/FS institution 17 and forward the data to these databases. The forwarded data acts as a query sent by the translator 15 which requests the return of data to the translator 15 where it is formatted within the object schema 100 for forwarding to the project subset 116. The project subset 116 will contain the merchant number 14, or a message "approval is not available yet", or "more information needed".

Figure 3:
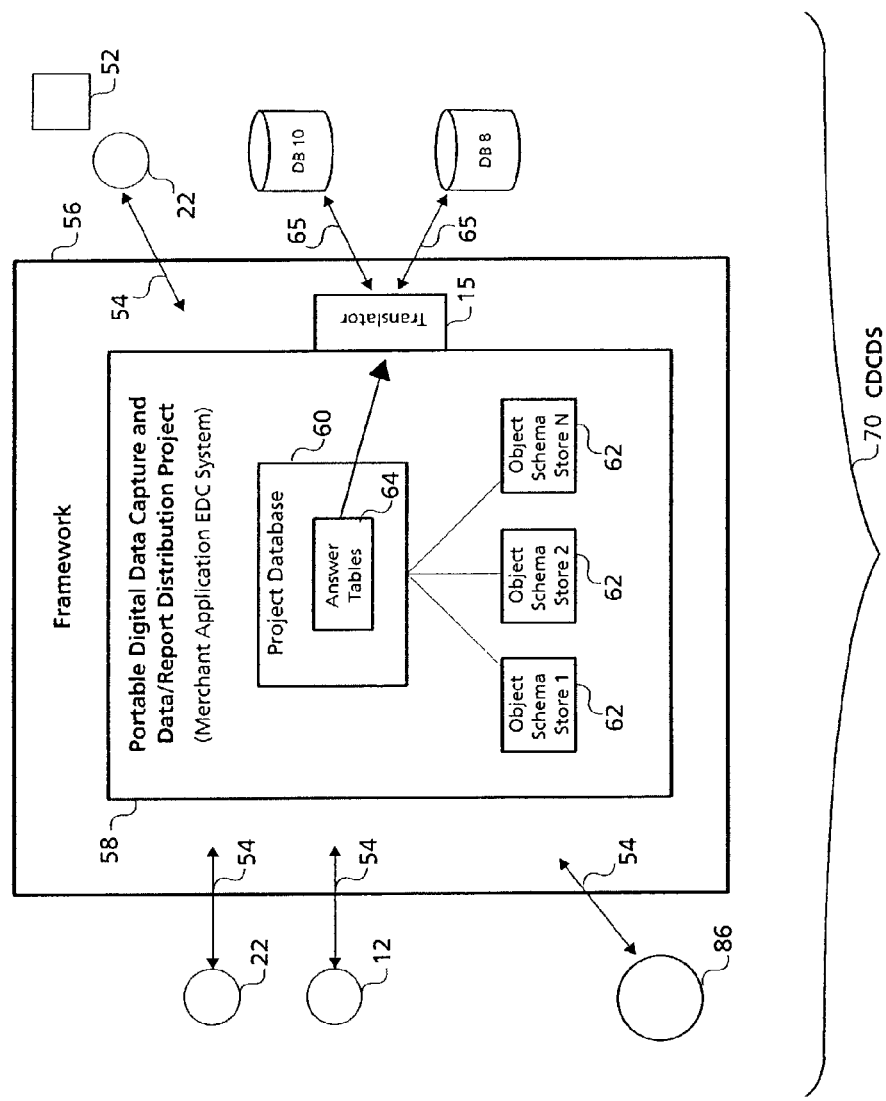
FIG. 3 is a diagram representing the process workflow using one preferred embodiment of the present invention.

FIG. 3 is a diagrammatic representation of the workflow and responsibilities of the CDCDS 70 in U.S. patent application Ser. No. 09/724,541 with regard to the Merchant Application EDC System 58. The Merchant Application EDC System 58 is the Portable Digital Data Capture and Data Distribution Project 58 of the CDCDS 70 in FIG. 2 of U.S. patent application Ser. No. 09/724,541. In the present invention, the Merchant Application EDC System 58 allows managers 22, merchant 12, sales representative 1, and others 86 to use a device 52 capable of measuring and inputting data, and sharing and accessing the Merchant Application EDC System 58 through a customizable interaction 54 that is part of the framework 56 of the CDCDS 70. As described in U.S. application Ser. No. 09/724,541, the framework 56 performs project design logic, passes messages between project components and/or individuals, manages project interactions, reconciles project versions, forwards project changes, tracks and organizes project logistics. In essence, the framework 56 automates certain tasks in order to free users to perform higher level tasks, remove redundancies and errors from the system, reduce time and costs, and produce better quality information. In a CDCDS 70 of FIG. 2 of U.S. application Ser. No. 09/724,541, many of the tasks and requisite staff in the prior art system 10 of data capture and data/report distribution (shown in FIG. 1 of U.S. application Ser. No. 09/724,541) are absent. With the CDCDS 70, shown in FIG. 2 of U.S. application Ser. No. 09/724,541, compared to FIG. 1 of U.S. application Ser. No. 09/724,541, there is now no need for programmers 32 to build, modify and upgrade a data entry interface 44, logistics report interface 48, and report interface 50 to the main database 20. There is no need for attendant couriers 30; printer admin 38; data entry 42; template software 26; templates 28; logic 24; or lookup for work due 46. In addition, modification reports request 80, delivery of reports loop 74, redo of report request 76, redo of data collection 72, design/development redo loop 82, and redo of an assignment request 84 are eliminated. All of these are required by the prior art system 10 of data capture and data/report distribution. These staff and tasks are not present in FIG. 2 of U.S. application Ser. No. 09/724,541 because of the resulting automation accomplished by the preferred embodiment of the invention disclosed therein. The functions automated and the subsequent staff and tasks eliminated will be described below a) regarding programmers 32, b) regarding managers 22, and c) regarding field workers 36.

The CDCDS 70 shown in FIG. 2 of U.S. application Ser. No. 09/724,541 eliminates the ongoing need for skilled programmers 32 to develop, update, modify and track version control of the data entry interface 44, logistics report interface 48, and report interface 50 of FIG. 1. As shown in FIG. 2 of U.S. application Ser. No. 09/724,541, a CDCDS 70 user that has minimal technical training can access the framework 56 to access the object schema store 62 in the project database 60. Eliminated are some managers 22 performing logic 24 about managerial functions, modification report request 80, redo of project report request 76, and delivery of reports loop 74, that routinely recur related to programmers 32, along with attendant couriers 30 and data entry 42 as seen in FIG. 1 of U.S. application Ser. No. 09/724,541.

The CDCDS 70 in FIG. 2 of U.S. application Ser. No. 09/724,541 eliminates the need for numerous managers 22 that perform logic 24 in the sub-process of logistics 14, quality assurance logic 24QA, in the sub-process of data collection 16, and form design logic 24FD, in the sub-process of design/development 12 of the system 10 of data capture and data/report distribution of FIG. 1 of U.S. application Ser. No. 09/724,541. Managerial functions such as the design/development redo loop 82, and redo of an assignment request 84 of FIG. 1 of U.S. application Ser. No. 09/724,541 are eliminated along with the attendant couriers 30, printer admin 38 and field workers 36 involved. As shown in FIG. 2, of U.S. application Ser. No. 09/724,541, the framework 56 of a CDCDS 70 is set to perform these tasks automatically and eliminate the trivial and repetitive work (see FIG. 1 of U.S. application Ser. No. 09/724,541) of logic 24, quality assurance logic 24QA and form design logic 24FD. This automation occurs as a result of the CDCDS 70 user integrating specific items in object schema store 62 already available in the project database 60 to be forwarded as part of a project subset 116 to field workers 36 and others. In a CDCDS 70, for example, managers 22, are able to design a project, request all report parameters at the time of project design, view various reports on input from field workers 36, and connect with a main database 20 to verify data against input from the field. The CDCDS 70 gives users the scalability to ramp up or ramp down a project as well as add new projects without the geometric increase in work. Referring to FIG. 3 of U.S. application Ser. No. 09/724,541, a CDCDS 70 is shown having an architecture of layers that include a portable digital data capture and data/report distribution project 58 consisting of object schema store 62 of a project database 60, a dynamic framework 56, and a kernel 92 connected to the underlying platform 94. These layers are each made with different tools and are meant to perform different functions. It is the architecture that allows the portability and the flexibility to expand, add functionality, and add increasing automation to the CDCDS 70. The kernel 92 provides the services necessary to load/execute the higher levels and to provide an interface to the system-dependent services of the underlying platform 94 which consists of the operating system 96 and the hardware 34. The hardware 34 has memory such as RAM in which the kernel 92, the framework 56 and a portion of the portable digital data capture and data/report distribution project 58 reside at run-time. There is at least one storage device such as a hard drive in which the portable digital data capture and data/report distribution project 58 is stored. Preferably, the kernel 92 is written in C++ (although not limited to C++), which is a well-known programming language that is compiled using vendor tools that are appropriate to that platform 94, thus platform specific for each of several platforms. Using a function call-based programmer interface ("API"), the kernel 92 performs services for the higher levels. The API's native code functions are accessed via direct calls from the framework 56. The kernel 92 is not portable but can be extended by loading additional modules with associated DSL files.

In the preferred embodiment of the present invention, FIG. 3 illustrates several components to the CDCDS 70 that are in addition to the components of the invention discussed in U.S. application Ser. No. 09/724,541. Within the project database, there is a specialized set of answer tables 64 in the project database 60, connected to a translator 15 that move data to and from external databases DB 8 and DB 10 by means of a specialized stored procedure 65. The combination of the translator 15 in connection with the answer tables 64 as part of the CDCDS 70 enables the delivery of partially completed field input form 219, which unlike the HTML pages of U.S. Pat. No. 6,135,349, can be presented to the user as content with the ability to edit the content as well as view the content. The advantage of this methodology is that the user, such as the sales representative 1, can directly update the content with the most recent information available with the merchant 12 data. All users that access the system from other points will have access to this information as allowed by the CDCDS 70. In prior art schemes, the user would be able to view the content but would be required to complete other or additional forms to update the content, often slowing the process of information flow. To eliminate the potential for unwanted information flowing into the system, the Merchant Application EDC System 58 is configured with Object schema store 62 that will have only the functionality allowed by the Merchant Application EDC System 58.

For example, a specific object schema store 62 might include objects in the project database 60 that enable users to view data only and not edit data. There can be specialized data capture objects such as a signature capture objects and hardware/software calculator objects that are included in the libraries of data capture objects available in the project database 60. These specialized objects are specific to use in a project such as the Merchant Application EDC system 58 in FIG. 2. In the preferred embodiment of the invention, this project database 60 of FIG. 1 is connected through a translator 15, which is commanded to manage the distribution and receipt of data to, and the translation of the data between, more than one databases. For example, as shown in FIG. 1 the translator 15 connects with DB 8 and DB 10, which represent databases at the financial service institutions and banks that warehouse credit information and transaction information with regard to the merchant 12.

Figure 4:
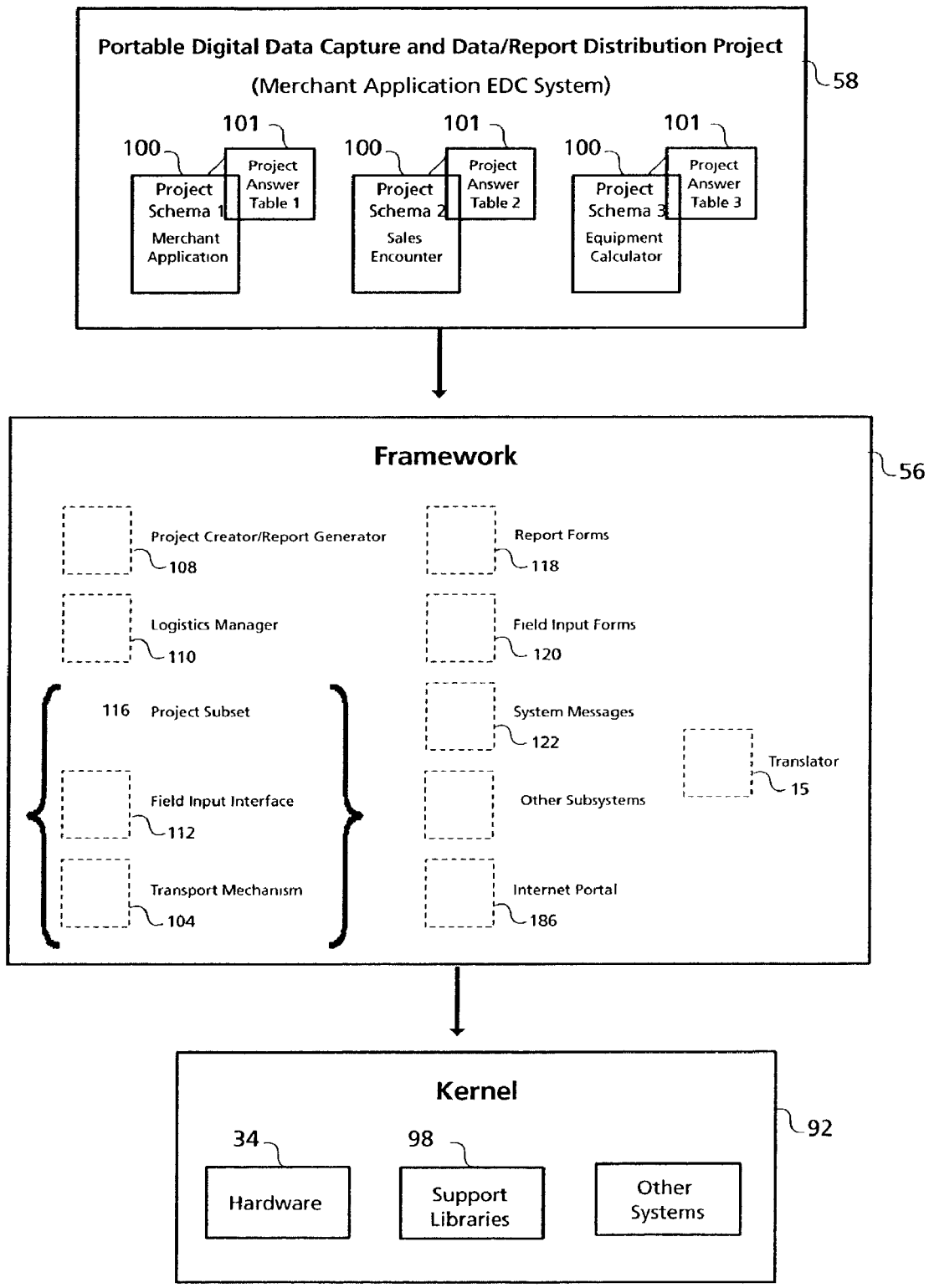
FIG. 4 is a more detailed block diagram of the present invention that shows elements included of the EDC system for merchant card processing applications as it relates to the components of the framework and the kernel.

Referring to FIG. 4 in U.S. application Ser. No. 09/724,541, the kernel 92 consists of the support libraries 98 that are necessary for the CDCDS programs. These include libraries for file and resource I/O, configuration management, memory management and diagnostics. These support libraries can be changed when the platform of choice for the project is changed. The kernel 92 manages part of the transport of objects when connections are made to the field. The framework 56 provides the visual interfaces between the CDCDS and the CDCDS users. The framework 56 consists of the Internet portal 186, project creator/report generator 108, report forms 118, logistics manager 110, system messages 122, and the project subset that includes the transport mechanism 104, field input interface 112, and field input forms 120 along with other subsystems. In the preferred embodiment of the present invention this is also true and in addition, the framework 56 includes the translator 15. As described in U.S. application Ser. No. 09/724,541, the framework 56 provides access and incorporates the necessary CDCDS logic to the project and to the project subset 116 forwarded to the hardware 34. The project subset 116 is designated as a specific field input interface 112 referenced to the project schema 100 of the portable digital data capture and data/report distribution project 58. This project subset 116 is named by the CDCDS user to be forwarded by the transport mechanism 104 to a specific hardware 34. The framework 56 is written in C, C++, Visual Basic, and HTML (although it need not be limited to these languages) for maintainability and extensibility, although Java and XML could be implemented at any time. The framework 56 is not necessarily portable and may perform differently on different platforms 94. In the preferred embodiment of the present invention, the project schema 100 relate to the appropriate Project Answer Tables 101 within the Merchant Application EDC System 58, which is specific to the present invention, whereas U.S. application Ser. No. 09/724,541 discusses other types of Portable Digital Data Capture Report Distribution Projects.

Figure 6:
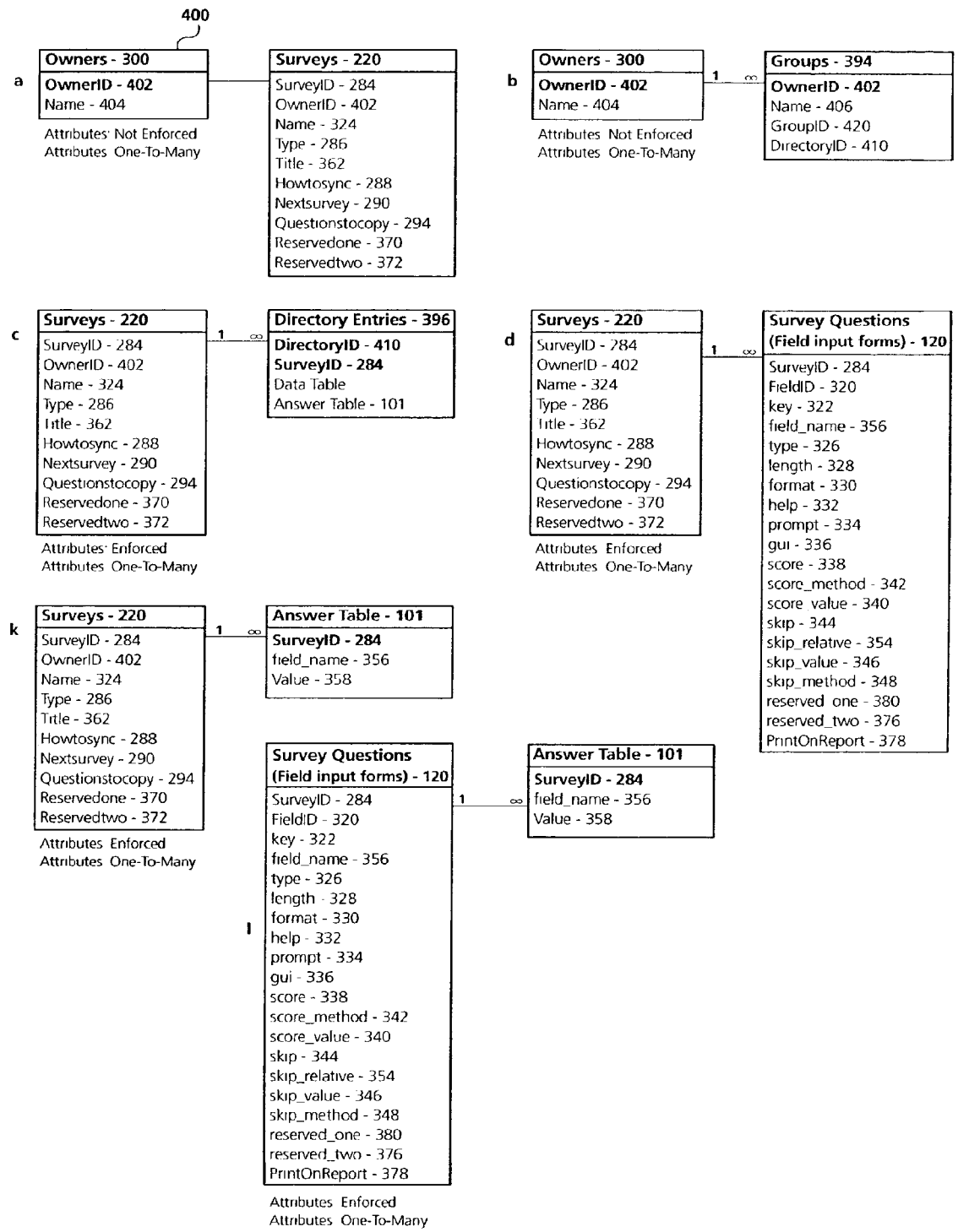
FIG. 6 is an entity relationship diagram illustrating the tables and relationships in the project database that manage the design and assembly of the objects used in the project database in accordance with the present invention.
Figure 7:
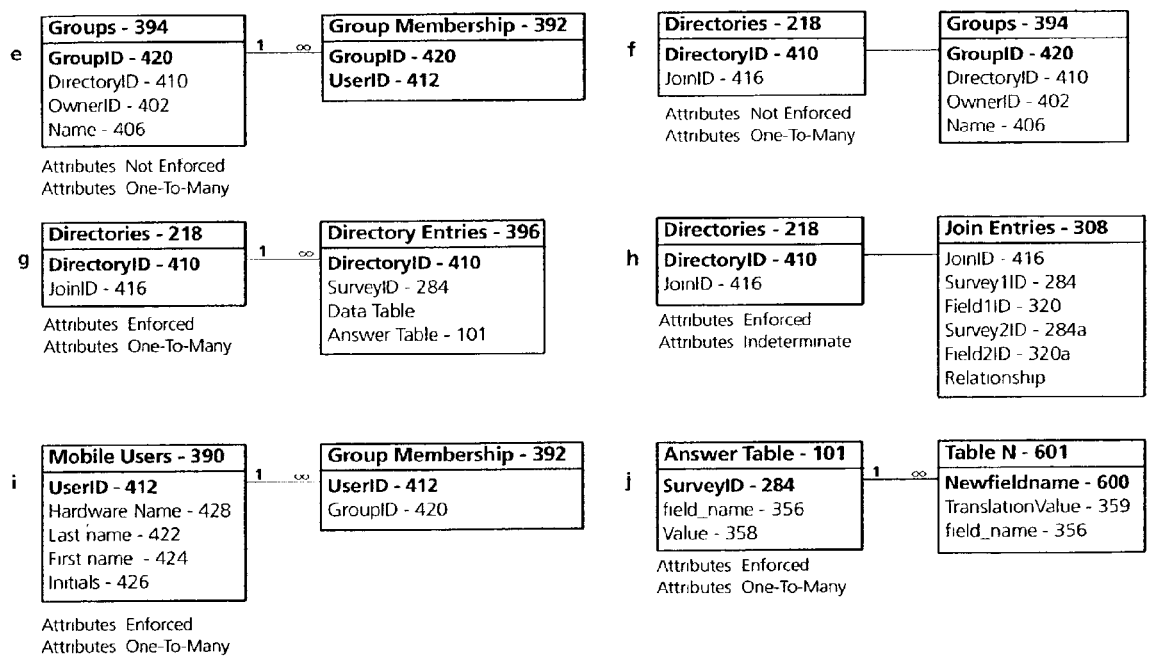
FIG. 7 is an entity relationship diagram illustrating the tables and relationships in the project database that manage the logistics of delivery of objects and data to the devices of specific users in accordance with the present invention.

FIG. 6 and FIG. 7 illustrate the relationships of the answer tables 101 and the project schema 100 within the project database 60. The Appendix is the "code" (configuration of data elements) of the project database 60 which is required for the Merchant Application EDC System 58 project schema 100.

The preferred embodiment of the present invention includes the project subset 116 where the framework 56 queries to access the current state of the project. The project subset references the project schema 100, which references the project answer table 101 that is part of the Merchant Application EDC System 58, which is a type of portable digital data capture and data distribution project that requires a specific combination of objects related to the financial services domain. In the present invention, the advantage of having project answer tables 101 is that it enables the forwarding of specific data within the field input interface 112 of the project subset 116. The preferred embodiment of the present invention includes the functionality shown in FIG. 5 of U.S. application Ser. No. 09/724,541 in order to accomplish the dynamic requirements of a Merchant Application EDC System 58 wherein the project subset 116 is created as part of the initialization of the framework 56. Report forms 118 and field-input forms 120 are employed as the interface between the user and the CDCDS 70. Field-input forms 120 and report forms 118 are implemented using the services of the API of the kernel 92 and are notified when an event occurs either as a result of input or as a result of other program events. Report forms 118 receive input from CDCDS users during the initial design or when changes are made to a CDCDS portable digital data capture and data/report distribution project 58 and changes are available immediately throughout the project. Logic has been programmed into the project creator/report generator 108 to remove the burden of logic from human users. The project creator/report generator 108 returns system messages 122 to the user such as a reminder that a particular object is unable to be integrated into a project without including the object's functions, as well as supplying other system messages 122.

The process of creating or manipulating objects in a project requires a series of actions that precipitate visual feedback, confirmation and qualification of inputs. Therefore the "state information" must be maintained while a user is making changes to the project. The project creator/report generator 108 controls the process of manipulating the portable digital data capture and data/report distribution project 58 by a set of queries (not shown). The project creator/report generator 108 has an expected set of inputs, which bring about predictable results. In a CDCDS 70 of the preferred embodiment of the present invention, it is important to implement one input over another. For example, changes are being made to protocols at the same time as other users are being forwarded the project subset 116 by the transport mechanism 104 of the framework 56 shown in FIG. 4 of U.S. application Ser. No. 09/724,541. However, these different inputs will likely conflict with one another. It is necessary to mark which input will overwrite other input and under what circumstances this should occur. In order to accomplish this, the CDCDS 70 allows users with specific permissions to mark and integrate the functions of objects that are part of the field input forms 120 to respond in a particular ordered fashion in the portable digital data capture and data/report distribution project 58. It is because of this that the CDCDS 70 of the present embodiment allows the user access through the project creator/report generator 108. The project creator/report generator 108 exhibits a system message 122 to the CDCDS user that input has been accepted, or why it has not been accepted and then reveals the result of the input. If the CDCDS user is not satisfied with the result of the input, then, the CDCDS user is able to make additional input to change the results.

As shown in FIG. 4 of U.S. application Ser. No. 09/724,541, the portable digital data capture and data/report distribution project 58 consists of one or more project schemas 100, or any other domain specific schemas. FIG. 6 of U.S. application Ser. No. 09/724,541 shows that in the preferred embodiment of the present invention, a project schema 100 consists of a set of project objects 114 that are relevant to a particular project or to a particular discipline existing in an object schema store 62. Multiple objects 114 integrated into multiple project schemas 100 as part of the object schema store 62 can be combined to form a portable digital data capture and data/report distribution project 58 as shown in FIG. 4 of U.S. application Ser. No. 09/724,541. FIG. 6 of U.S. application Ser. No. 09/724,541 shows these multiple project schemas 100 made of multiple project objects 114 located in an object schema store 62 where it is necessary to have the project objects 114 and the project schemas 100 available together for the purposes of consistency. Additional objects 114 can be built by programmers and made available in an object schema store 62 for the CDCDS user to integrate into new project schema 100 or existing project schema 100. This allows for easy expansion of the capabilities of the CDCDS and the portable digital data capture and data/report distribution project 58 (of FIG. 4 of U.S. application Ser. No. 09/724,541) without requiring a programmer to retool all of the already in use project schemas 100.

In the preferred embodiment of the present invention, the addition of answer tables 101 with the project schema, enable the translator 15 with query parameters when sending and retrieving data from the external databases. This greatly simplifies and speeds a query process in that the answer table 101 is recognized as belonging to a particular user with a particular project subset 116. The query response can therefore be returned to that particular project subset 116 and thus returned to the user field input interface 112 during the next connection through the framework 56. Then, the user can enter additional data that will define the query further.

Figure 5:
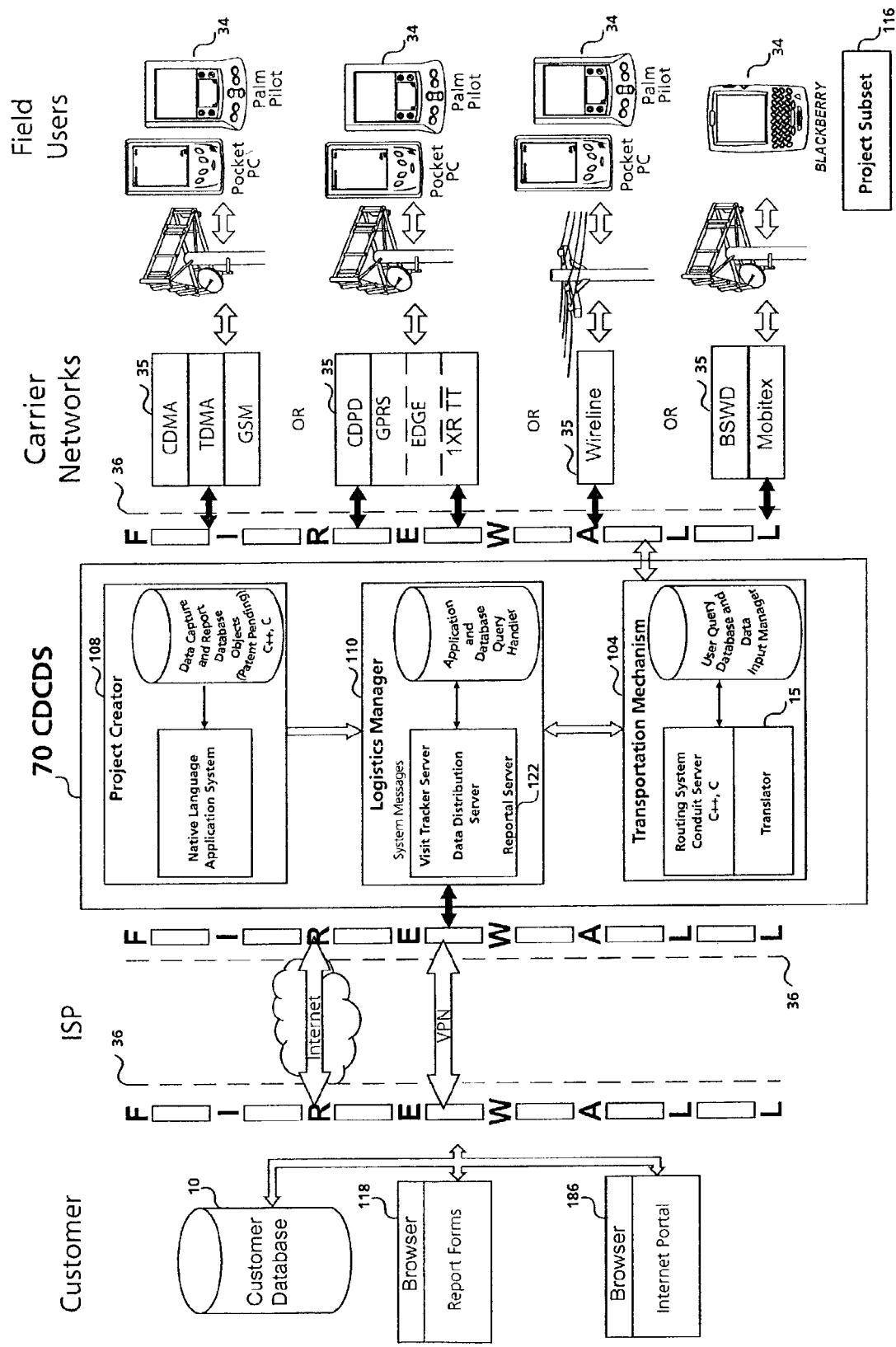
FIG. 5 is a network architecture diagram for one preferred embodiment of the invention wherein handheld computers connect through a communication network to the project database

FIG. 5 is a high level schematic diagram of a network configuration showing components of hardware 34, telecommunications network 35 and firewall software 36 that are suitable for use in the preferred embodiment of the present invention. A key factor of the present invention is its object-oriented nature in every aspect of the invention, enabling the easy insertion or deletion of combinations of hardware 34, software 36 and networks 35 that will offer the best possible benefits. For example, as the telecommunications networks expand to the use of 3G or if a customer requires a local wireless network to accommodate requirements outside the project such as the need to connect users within a setting where 3G service coverage is sporadic. Other changes in this configuration may include the change in hardware 34 from mobile computing devices such as PDAs to cellular phones, or the use of several different types of hardware 34 within one merchant application EDC System 58. In contrast to the present invention, U.S. Pat. No. 6,135,349 does not include a combination of objects that can be inserted or removed and managed when browser technology changes or if the Internet is not available.

FIGS. 6 and 7 are entity relationship diagrams showing all the tables 400 with their structures and attributes, as they are part of the object schema store 62 in the project database 60 shown in FIG. 3. These tables 400 show the characteristics and parameters of all the objects that are available for integrating into the project schema 100 of FIG. 4. The relationships shown in this diagram are a configuration of the present invention that enables a user to access the Merchant Application EDC system 58 by opening the project creator 108 in the framework 56 so that the user can choose items in these tables 400 to be part of a specific project schema 100. The relationships in these tables will automatically manage the relationships of the items in the project schema 100. It is here that the definitions and configurations are set for each of the project subset 116 with their attendant field input interface 112 shown in FIG. 4.

This management of the relationship between items in these tables 400 is referred to as "logistics management." Logistics management as used herein is the organization, tracking and delivery of the correct information to the correct people, accurately, and on time. For example, referring to FIG. 6 section a of the present invention, the user names the owner 300 and the surveys 220, the groups 394, and all the characteristics of each of the items in the related tables 400. This is similar to the way that logistics are managed in U.S. application Ser. No. 09/724,541 where the relationships are described in more detail below.

Section a of FIG. 7A in U.S. application Ser. No. 09/724,541 shows that owner 300 consists of a unique ownerID 402 (an automatically assigned number) and a name 404 (a short text description that signifies the CDCDS user or group 394 of users). Section a also includes the related survey 220 which consists of the SurveyID 284, OwnerID 402, a name 324 (a short text description that describes the set of field input forms 120), type 286 (either a FormDB 208 or a fixed 214), title 362 (a short text as it appears on the field input interface 112 on the hardware), howtosync 288 (signifies the way the data from this survey 220 is transported between the field and the server), nextsurvey 290 (signifies and identifies the survey 220 that is to follow this one), questionstocopy 294 (signifies all the field input form 120 marked key 322 whose input should be copied to the next instance of this survey 220), reservedone 370 (signifies the score group of the report that this survey 220 is part of), reserved two 372 (signifies the report group this survey 220 is part of for aggregation) in a not enforced, One-To-Many relationship.

Section b of FIG. 7A in U.S. application Ser. No. 09/724,541 has owner 300 (same as in section a) related to groups 394, which consists of ownerID 402, name 406 (a short text description that signifies the set of users that will be performing the specific type of data collection for an owner 300), groupID 420, and directoryID 410 in a not enforced, One-To-Many relationship.

Section c of FIG. 7A in U.S. application Ser. No. 09/724,541 has surveys 220 (same as in section a) related to directory entries 396 which consist of directoryID 410 (an automatically assigned number) and surveyID 284 in an enforced, One-To-Many relationship.

Section d of FIG. 7A in U.S. application Ser. No. 09/724,541 has surveys 220 (same as in section a) related to survey questions (known as field input forms 120) which consists of surveyID 284, FieldID 320 (a unique number assigned by the CDCDS user), Key 322 (set by the CDCDS user to designate status of the field), fieldname 356 (short text description of an individual field input form 120 that are referenced by other projects to aggregate normative information-unique for each field input form 120 that is part of a survey 220 but not unique across surveys 220), type 326 (signifies the nature of the field-input forms 120 referring to an example of a field types 114A supported), length 328 (denotes the number of character length for a text field-input form 120), format 330 (nature of field-input forms 120 that uses specific parameters) help 332 (denotes a section of the field-input form 120 that describes in some detail reference material shown on the screen for the field worker 36 to more easily make a decision on what input should be chosen), prompt 334 (a short text description of the input that is required in the field-input form 120), GUI 336 (denotes the design of the screen revealed to the user as field input form 120), Score 338 (signifies a weighted score value, signed byte), Score_value 340 (signifies the value needed for a Score 338), Score_method 342 (signifies under what circumstance an input is scored), Skip 344 (denotes the field-input form 120 to move to in a project schema 100), Skip_value 346 (signifies truth-value to skip), Skip_method 348 (signifies how the skip 344 is performed), Skip relative 354 (what field input form 120 the skip method 348 will reveal as the next appropriate one), Reserved_one 380 (where in a report of the input collected with this field input form 120 should this appear), Reserved_two 376 (in what group in a report of the input collected with this field-input form 120 should be aggregated), PrintOnReport 378 (as it appears). These tables are in an enforced, One-To-Many relationship.

Section e of FIG. 7B in U.S. application Ser. No. 09/724,541 has group 394 (as seen in section b) related to group membership 392 which consists of groupID 420 (as seen in section b) and a unique userID 412 (an assigned number that signifies a particular hardware) in a not enforced, One-To-Many relationship.

Section f of FIG. 7B in U.S. application Ser. No. 09/724,541 has directories 218 which consist of a directoryID 410 (as seen in section b) and a unique joinID 416 (an assigned number that signifies a connection between two items). This is related to group 394 (as seen in section b) in a not enforced, One-To-Many relationship.

Section g of FIG. 7B in U.S. application Ser. No. 09/724,541 has directories 218 (as seen in section f) and directory entries 396, which consists of directoryID 410 and surveyID 284 in an enforced, One-To-Many relationship.

Section h of FIG. 7B in U.S. application Ser. No. 09/724,541 has join entries 308 which consists of JoinID 416 (as seen in section f), survey1ID 284*b* (signifies the first survey 220 that will be connected to the second survey 220), field1ID 320*b* (signifies the connection point of the second survey 220), survey2ID 284*a* (signifies the second survey 220 that is connected), field2ID 320*a* (signifies the connection point of the second survey 220) related to directories 218 in an indeterminate relationship.

Section i of FIG. 7B in U.S. application Ser. No. 09/724,541 has mobile users 390 which consists of a userID 412 (as seen in section e) hardware name 428 (signifies the nature of a hardware 34 that will be connecting through the framework 56 into the project database 60), last name 422 (the surname of the field worker 36 that will be using this hardware 34), first name 424 (the field worker 36 first name), initials 426 of the field worker 36) related to group membership 392 (as seen in section e) in an enforced, One-To-Many relationship.

Figure 8:
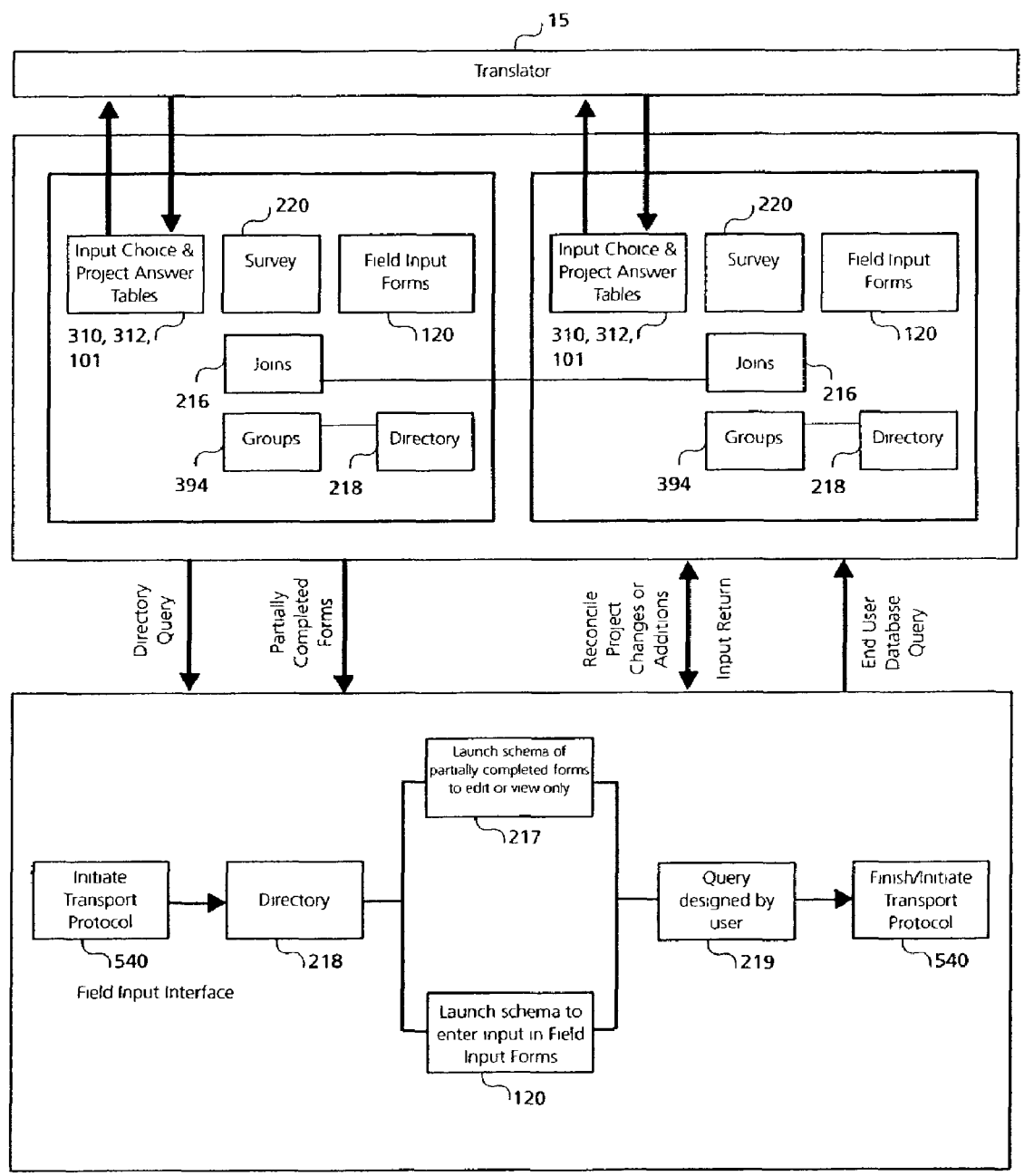
FIG. 8 is a detailed data level flowchart showing the movement of data and objects between the project subset.

In addition to the tables of U.S. application Ser. No. 09/724,541, there are included in the preferred embodiment of the present invention project answer tables 101 that relate to the project schema 100 of FIG. 4 and to the translator 15. The answer table 101 is part of the directory entries table 396, which has a relationship to the table survey 220, survey questions 120, and the distribution table 601 of the translator 15. The value 358 of each of the records in the table can be treated as an object that by relationship can be given a defined translation value 359 for a new field 600 within a table N 601 of any other database. With the answer table 101 storing incomplete records 602 (answer value is blank), these records are made available in the project database 60 to be forwarded in a project subset 116 during a directory query as shown in FIG. 8. This structure will ensure that the right user (established by the mobile user 390 belonging to a particular group membership 392 with a directory 218 of certain survey ID 284 and answer tables 10) gets the correct field input interface 112 with the right information. Treating the answers in the object-oriented way enables the Merchant Application EDC System 58 to process "cleaner" data. A user that is closest to the information in the field can mark the data to be changed or reviewed for correctness. This enables a data cleanup process during the collection of the data rather than a simple viewing of the data through a form that does not synchronize the data across the database.

FIG. 8 is a block diagram depicting a particular combination of configured elements in the tables of FIG. 6 and FIG. 7 that will combine as a particular project subset 116A. The translator 15 with a configured relationship marked in Table N 601 will use a stored procedure to retrieve or send data between DB 8 and DB 9 and the input 310 and project answer tables 101 that are part of a particular project subset 116A. The particular combination of joins 216, survey 220, field input forms 120 as part of the directory 218 of a group 394 will enable the delivery of the project subset 116A by means of a directory query along with the delivery of partially completed forms. Except for the forwarding of partially completed forms and the distribution of data through the translator 15, the functionality of the directory query to forward the project subset 116 to the hardware 34 is similar to that disclosed in U.S. application Ser. No. 09/724,541, and repeated below for completeness.

FIG. 14 of U.S. application Ser. No. 09/724,541 is a flow diagram showing the project subset 116 that is forwarded during connection with the hardware A 34. The CDCDS user designates the initial project design by signifying items in the groups 394 table (for logistics management) and designates items included in the directory 218 (information of what project schema 100 is included). The user will designate in the directory 218 details on the survey 220 (field input forms 120 not shown), the creation of the input tables 310 and choice tables 312, and the joins 216 (if included in the project). These designations made in the tables will be forwarded to the hardware A 34 by a query of the directory in the project subset A 116. A field worker 36 with a particular mobile user designation of a last name 422 and hardware name 428 (not shown) will connect to the project database 60 with certain hardware 34. The field worker 36 with this hardware 34 during the connection will be recognized by what group membership 392 is associated with this hardware 34 making it possible for the hardware 34 to be forwarded the appropriate project subset 116 of this field worker 36. This is performed using ODBC with the transport mechanism 104 (see FIG. 4 of U.S. application Ser. No. 09/724,541), and based on the designations group membership 392 and mobile user 390 (see FIG. 7A of U.S. application Ser. No. 09/724,541) related to owner 300 in a group 394, the appropriate project subset 116 is forwarded to the field worker 36. During the connection between the two, any manipulation of the project is reconciled between versions of the project. The hardware A 34 will have initiated the transport protocol 540 at which time the very specific directory 218 for this hardware A 34 will be available for a long-term transaction, disconnected from the project database 60. This allows the system of a queried directory available on the hardware 34 for the purpose of a long-term transaction since staying connected to the project database 60 may not be feasible with current hardware and data communication services. However, reconciliation occurs between the project database 60 and the project subset 116 regardless of the hardware 34 or how a user has changed the specifics of the project subset 116. As seen in FIG. 14 of U.S. application Ser. No. 09/724,541, the field-input interface 112 is what appears on the hardware 34. Data is entered into the field-input forms 120 and then the transport protocol 540 is initiated.

During connection to the project database 60, changes between the project subset 116 and the field input interface 112 is reconciled as requested by the CDCDS user. The field-input interface 112 is designed to reveal one field-input form 120 per screen with a limited but adequate number of input choices on that same screen. When the field worker 36 makes the input into the field-input form 120, the data is temporarily stored and a new field-input form 120 appears on the screen. If necessary, the logic is already programmed into the field input interface 112 so there is no chance of omitting a response or inputting a frivolous response. Once the field work is complete, the data is ready to be returned to the project database 60 through whatever transport mechanism 104 needed. Again, there is no need for the field worker 36 to make special commands during the transport, since all necessary work is performed for the field worker 36. It is important to realize that only the input is being transmitted to the project database 60 because the field-input interface 112 is still stored in the hardware 34.

FIG. 15 of U.S. application Ser. No. 09/724,541 is a block diagram providing more detail on the present invention as it forwards a project subset 116 from the project database 60 for transport to the specific hardware 34 of the field worker 36. This illustration shows the CDCDS user has designated the forwarding of a project subset 116 as the CDCDS user programmed it. Should the CDCDS user program the project subset 116 and its items differently, then the project would behave differently. An average project subset 116 consists of one or more schema 100. FIG. 8C and FIG. 8D of U.S. application Ser. No. 09/724,541 were examples of different project schema 100. A project schema 100 is built with the programming language 124 as shown in FIG. 8A of U.S. application Ser. No. 09/724,541 and consists of at least one owner 300 and one field worker 36. As seen in FIG. 8C of U.S. application Ser. No. 09/724,541, a project schema 100 also includes at least one survey 220 with all survey characteristics 520 designated and this survey 220 is related to an instance 532 of field input forms 120 with all of their characteristics designated. In addition, the project schema 100 includes at least one accompanying input table 310. The project schema 100 may or may not include joins 216, which will need one or more accompanying, join entries 308 and one or more choice tables 312 as seen in the illustration of a project schema 100 with a joinID 416 in FIG. 8D of U.S. application Ser. No. 09/724,541.

The object-oriented nature of the field input forms 120, as part of the field input interface 112 enable the schema to be launched for the purpose of edit and view 217 or the schema is launched to input data in the field input form 120. This structure enables the user to define a type of query 219 that will be exchanged with the project database 60 during transport. This query will be forwarded through the translator 15 and return additional data to the project subset 116A for return to the user either in the form of an approved merchant number or additional request for information. This is unlike U.S. Pat. No. 6,135,349 where the information is not automatically returned when the HTML page is completed. In the prior art, a user must make an additional request for that information, or after human intervention, the information will be forwarded to the user.

Figure 9:
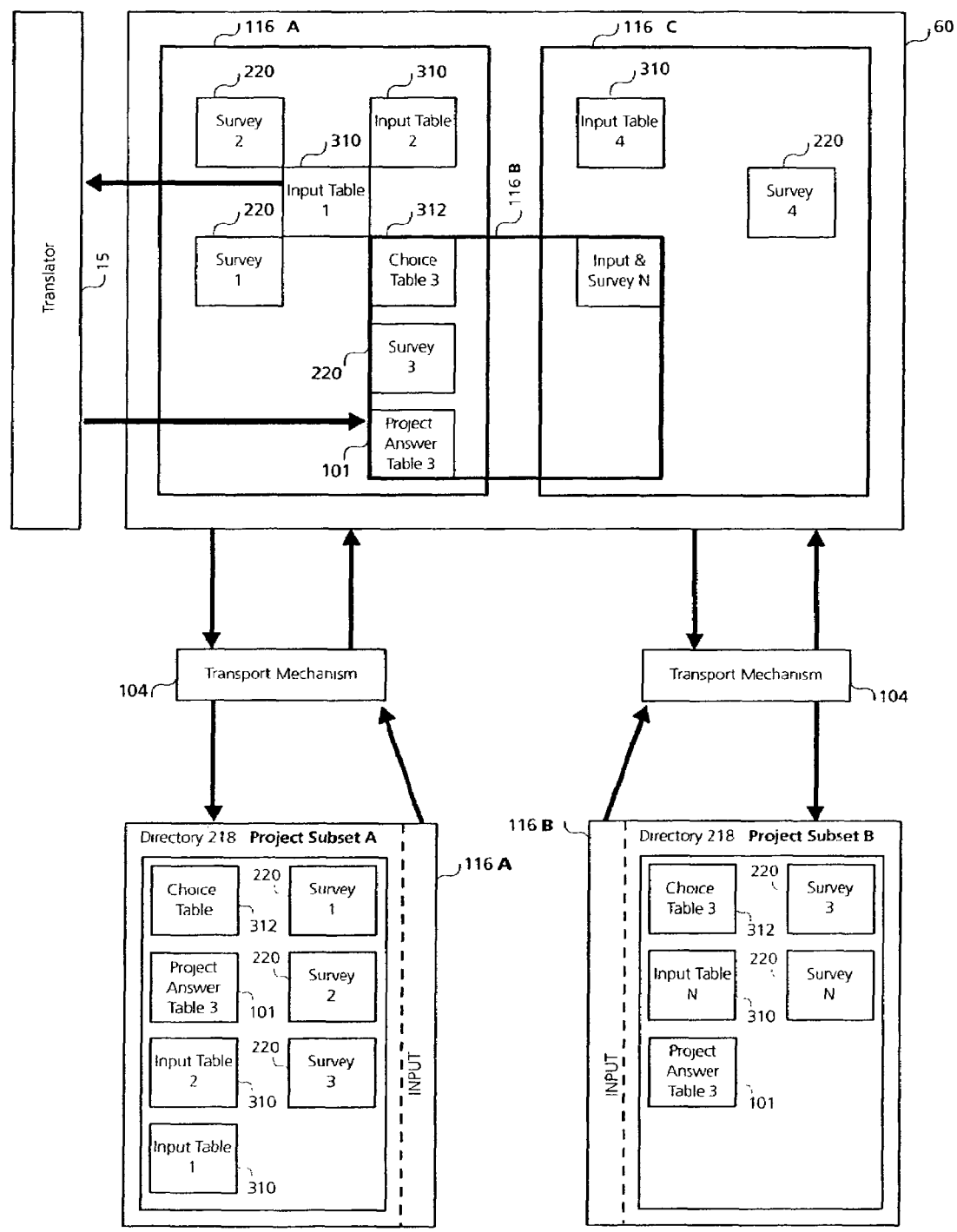
FIG. 9 is a block diagram illustrating the cycle of information flow from the translator, to the project subset to the hardware and back to the project subset for delivery through the translator.

FIG. 9 of the present invention depicts the project subset 116 in several different configurations of surveys 220 and tables 310, 312, 101 that will enable different users to receive very specific applications and forms that relate to the work of each of the individual users. The project subset 116 forwarded by means of the transport mechanism 104 assembles as an electronic form of the sections of a merchant credit card processing application. The electronic form is an interactive field input interface 112 on the handheld hardware 34. This interactive application guides the user through a set of input forms 120 only presenting the appropriate input form 120 based on input in a previous one. This removes a tremendous amount of error in data entry and reduces the time of data entry. In U.S. Pat. No. 6,135,349, the user must review all data entry fields shown in FIGS. 3-6 of this patent and make a decision about what requires input, or receive a message after the page has been delivered to the Internet server and returned with a message that the entry was not complete.

This electronic application may consist of several components such as an interface for the collection of "presales/sales encounter" data, an equipment calculator that enables the user to enter information about the merchant's equipment needs into the device and then receive an automatic estimation of the correct hardware and software choices for the merchant, and merchant information needed by the financial institution to make a decision about account approval. Other components may be easily added to accommodate the needs of the sales force or the bank. These components of the electronic application must also provide the user with the ability to navigate through the components or sections of the components, or through individual screens so that the electronic application does not hinder the process of merchant sign up. The handheld component must have the capabilities to provide GUIs with "touch screen" or "one button push" data entry.

The nature of the Financial Services and credit card industry is that security of data and transactions are vital to the safety of commerce using the Internet or wireless communications. The encryption that is added to the first and second platform aids in the security of data and information flow. In the preferred embodiment of the present invention, there is an additional type of security in that the delivery of project subsets 116 and the automatic management of the data through the mechanism of the table relationships eliminates the need for users to gain access to the database for retrieval of content information. Instead, only the relevant content is delivered to the user as part of the project subset 116 marked for that user.

Another important factor is the management of the addition and deletion of users within the project. Due to the object-oriented nature of the project, users can be added remotely without the on-site configuration of hardware and software for access to the project.

Figure 10:
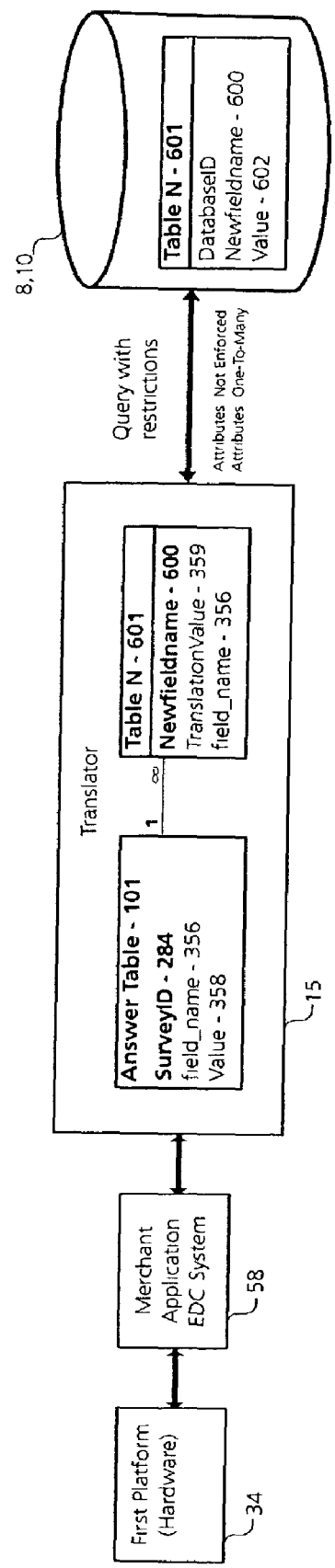
FIG. 10 is a data flow diagram illustrating the movement of data through the translator to other databases.

FIG. 10 illustrates the movement of data from the hardware 34 through the translator 15 to the external database 8 and 10. A mobile computing platform, such as a PDA or a mobile phone, is a non-physical connection and is unlike a desktop connection into a database. Therefore, a program must reside in the middle between the hardware and the database that will enable a connection and enable the transfer of data. This is not an unusual concept, but is often referred to as middleware. One important feature of the present invention is not to use middleware to push the database information onto the mobile computing platform or to not offer the middleware as a window into the database to review content. The present invention uses the middleware type program to translate the information between databases by a means of marking the data in tables to relate to other data in such a way as to deliver it into specific project subsets 116 that will then carry the data to the mobile computing hardware.

This concept has its roots in biogenetic theory. In biogenetics, gene fragments are connected in a very particular structure that is the result of a reconfigured combination that enable a skin cell to map its characteristics to a reproduced skin cell. This occurs in a complex transfer process between the strands of DNA within the cells. In a similar way, answers are mapped for distribution to a particular database outside the Merchant Application EDC System 58 by means of the configuration of the data elements set by the CDCDS 70 at the design of the project. In order to accomplish this, the program that resides in the CDCDS 70 builds a connection to the customer server to get a specific set of data, yet not have access to all data. The launch of the program can be set in particular time intervals or can synchronize at any time. Data is retrieved into a distribution database 601 with a value 359 and a new field name 600 that is configured in relationship to the answer table 101 where the data is now translated into a value 358 with a field name 356 that is known by the project database 60 (see FIGS. 6 and 7) that will forward it in a manner acceptable to the hardware 34. Conversions such as these can be simple or complex, can include multiple translations and will be set for automatic translation in the Merchant Application EDC System 58.

Figure 11:
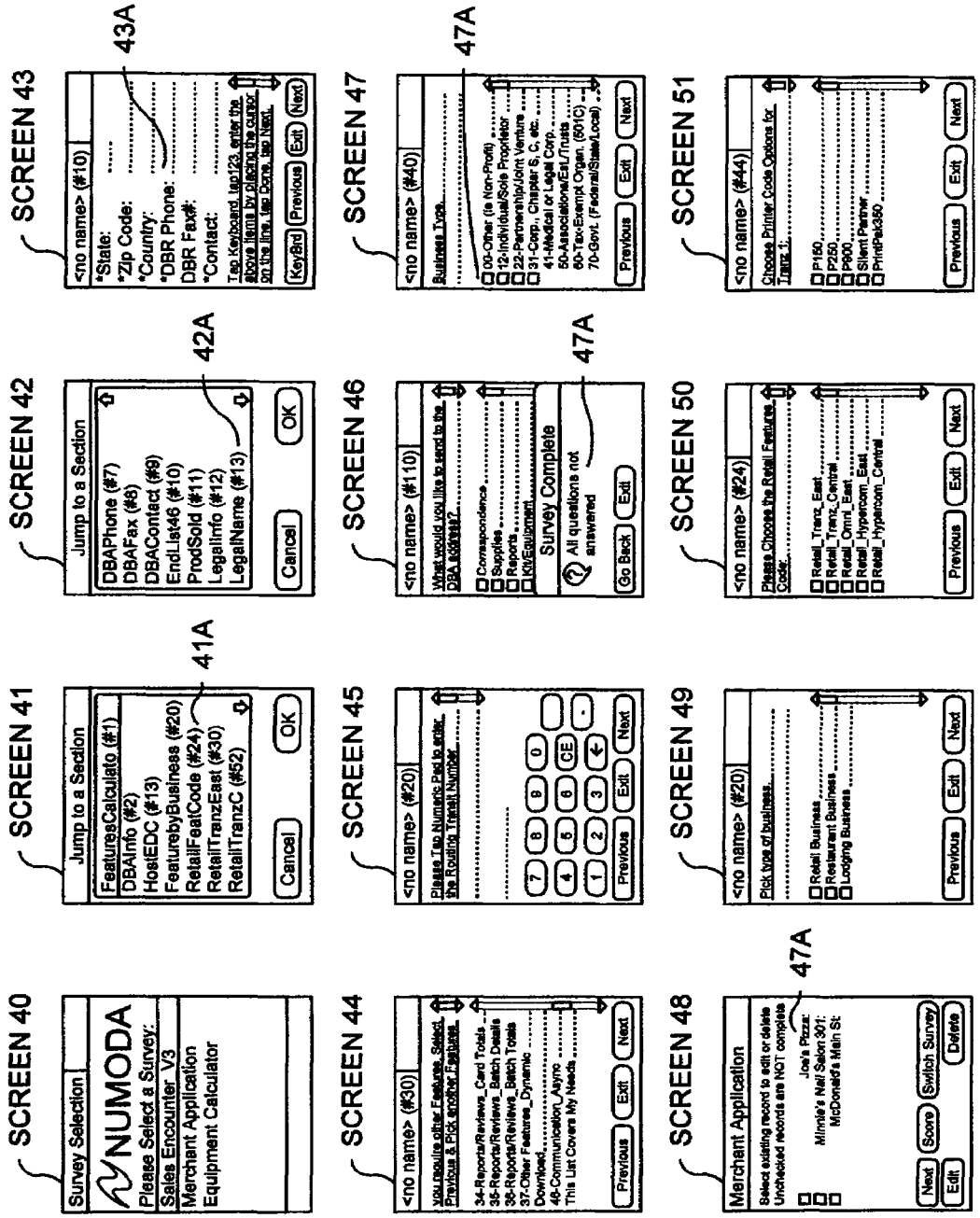
FIG. 11 is a set of screen shots that are the interface for data entry on a handheld computer or cellular phone.
Figure 12:
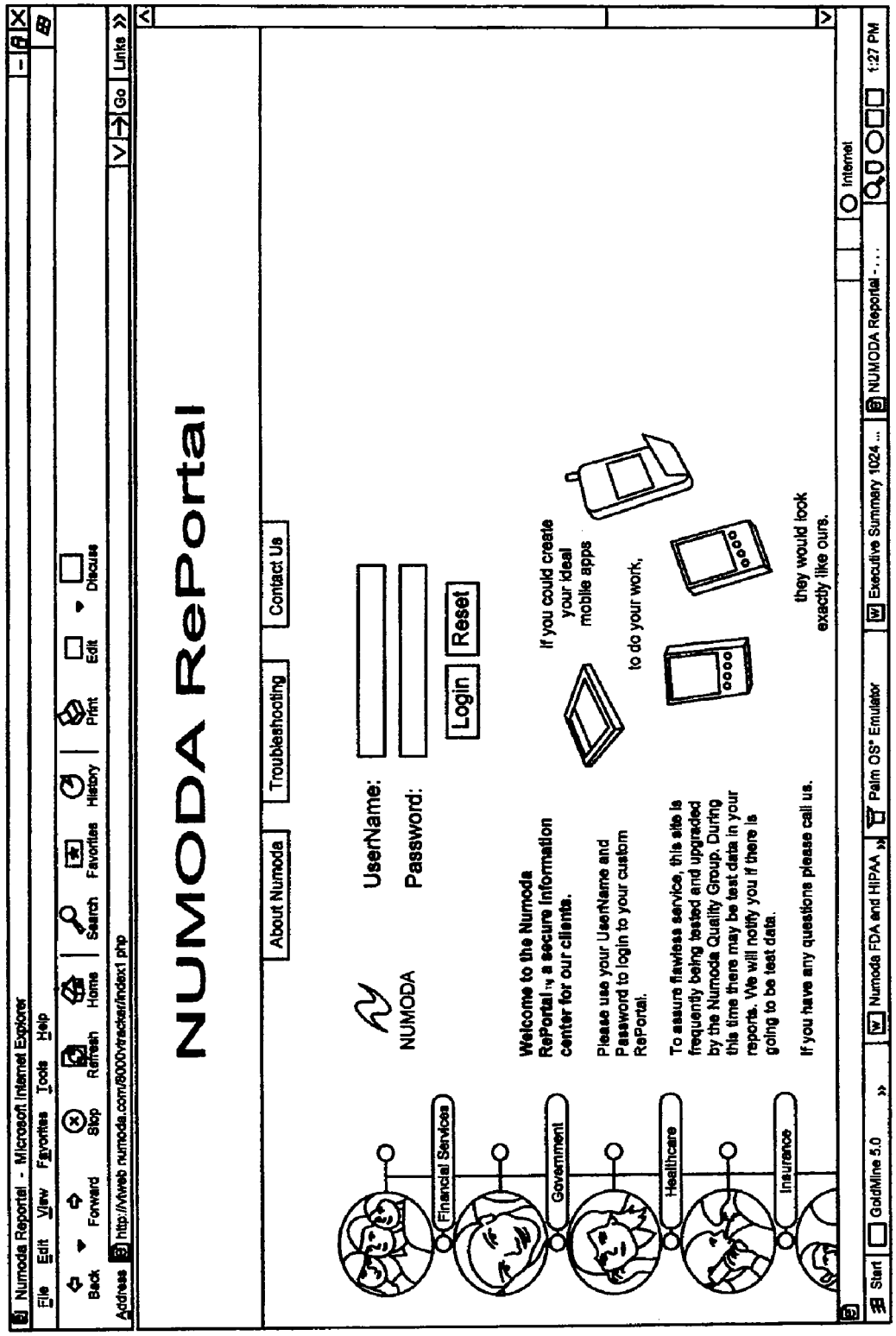
FIG. 12 is a screen shot of the portal interface where a user may access the reports from a desktop based on data collected by the handheld computer.

FIG. 11 is a screen shot of the first screen of the web interface Internet Portal 186 where a user given a set of permissions within the Merchant Application EDC System 58 can access the project database 60 to view report information, manage assignment logistics, and change list choices in the choice table 312 of the project subset. This interface gives users a chance to look into the palm of the sales representative 1 in order to manage the pipeline of customer hardware needs and service needs, which was not readily available prior to the present invention.

Case Study

The following is an example of how the preferred embodiment of the present invention was actually used in an organization to eliminate the complex and redundant processes for merchant application processing.

A Financial Services Company, ACME FS, using the prior art 18 that is depicted in FIG. 1, with 250 sales representatives completed thousands of yearly on-site applications for merchant credit and bankcard processing. The Sales representative 1 would start out at the office where they picked up merchant materials 2, consisting of leads that the telesales group had for them, copies of the blank applications, updated pricing models, hardware and software in inventory, requests from the banking institution for additional information from the merchant, requests from corporate headquarters for corrections on previously submitted applications, and information on merchant approval, which the sales rep will communicate with the merchant. Sales representative 1 who are new to the merchant materials 2 often have a difficult time getting familiarized with all the materials, while those with experience know how to complete the work in a more efficient manner. When the sales rep 2 complete all the merchant materials 2, they return to the office to key in data collected into the corporate database 7, or they key it in on their laptop, which connects to the corporate database 7.

All of this data is forwarded to the processing database 8 by the data processing staff 3. The data processing staff must forward the data to the inventory/solution delivery database 9, which generates warehouse-shipping materials 4. The data processing staff 3 will return all data that is incorrect or incomplete as rejected merchant materials 2, which will require completion by the sales representative 1. When all information is completed and the correct hardware configured, data is forwarded to the Banking database 10, where the bank processors 5 review the data. If all information was complete, and the merchant was approved for card processing, the Bank processors 5 forward the information to the approval database 11, where the approved merchant materials 6 are produced and sent to the Merchant 12. This entire process must be coordinated so that the warehouse-shipping materials 4 configured correctly for the merchant 12 arrive at nearly the same time as the approved merchant materials 6, so that a service rep might meet at the retail location of the merchant to set up the "card processing hardware." The financial services industry reports that their single biggest problem is to get the right hardware solution to the right customer in time. 21% of merchant materials 2 are reprocessed because they are incomplete, erroneous, or misread. Assigning the sales representative 1 to the task is a logistical nightmare of scheduling, with appointments requiring rescheduling 18% of the time due to coordination problems.

ACME FS decided to implement the preferred embodiment of the present invention 17 depicted in FIG. 1. A portable digital data capture and data distribution system described in U.S. application Ser. No. 09/724,541 was used to design and assemble an EDC System for a Merchant Credit Card Processing Application 58 as shown in FIG. 3 of the present invention. In FIG. 1, the sales representative 1 was given a piece of hardware with a project subset 116 with a subset of objects that formed an interface for entry into a Merchant Application schema, Sales Encounter, and Equipment calculator Schema 62 shown in FIG. 3. These schemas 62 were forwarded from the project database 60 to the device to be revealed to the user as field input interfaces 112 shown in FIG. 4. The sales representative 1 would view these as screen shots depicted in FIG. 11.

The main menu 40 screens depict the first screen of the electronic document formed by the project subset 116 in FIG. 1. Screen 41 shows the navigation functionality that would allow someone using the device to access in order to move through the sections 41A retail feature codes, during a meeting with the merchant 12. Screen 42 is what someone using the device would see if they wanted to jump to a specific question 42A legal name. Screen 43 illustrates a sample of how a field input interface 112 of the project schema 100 in FIG. 4 would appear to the user after they have been forwarded to the device by the transport mechanism 104. Each of the fields 43A represents an object that can be designated by the CDCDS 70 of FIG. 3. Screen 44 shows a field input interface 112 that will appear to the user as a list of items to choose from. This input interface 112 can be designated to appear to the sales representative 1 in a broad variety by entering parameters in the table survey questions 120 in FIG. 7A. For example screen 45 shows a numeric object that would be available as a field input interface 112 by entering a particular value for 330 in the survey questions table 120 through the Project creator 108 seen in FIG. 4. Not only can the individual input interface 112 be set with parameters but an entire set of these, such as the Merchant Application 40A, can be designated with functionality as seen in screen 46 that shows a message "All questions not answered" 46A that can be set with a functionality. This occurs by entering a value in the table Survey 220 through the Project creator 108. The sales representative 1 taps on the designated input section of the screen to answer the question. For example in screen 47, the box 47A is the input area which will record in the device a particular value that when transmitted to the project database 60 by the transport mechanism 104, is received as a value in the answer table 400 of FIG. 7A. From there, the value is changed and forwarded by the translator 15 to the appropriate corporate database 8 and the bank database 10.

When the bank database 10 records a merchant approval, a stored procedure in the translator 15 pulls the data from the bank database 10 and places it in the answer table 401. During the next directory query to the project subset 116A (seen in FIG. 14), a set of field input forms 120 are returned with a partially answered form 48A as seen on screen 48. This will contain the merchant number 21, or a message 22, or additional data needed 23.

The sales representative 1 can use the Equipment calculator 40B to establish and order the exact requirements of hardware and software 4 for the merchant 12 right during the same scheduled visit. Screens 44, and 49-51 shows some of the type of data collected by this project schema 3 100. These screens also show how the field input forms 120 will be revealed based on values in the table survey questions 120 in the fields skip 344, skip relative 354, skip value 346, and skip method 348. For example, screen 49 asks what type of business. If retail is chosen, screen 50 appears with the choices of retail feature codes. Based on the input here, screen 44 is shown with a list of features for this feature code chosen in screen 50. Based on the input in screen 44, screen 51 is revealed that has a list of printer code options for the features chosen in screen 44. All input is forwarded through the transport mechanism 104 as mentioned in the previous paragraph.

FIG. 11 is a screen shot of the Internet portal 186 where summary information and logistics information is available regarding the data and information in the merchant application EDC system 58.

The Appendix below is the Application Listing for the project database 60 of the Merchant Application EDC system 58.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

| NUMODA Application Listing | Date: | 10/08/2001 |
|---|---|---|
| | Title: | Sales Encounter_V2 |
| | Name: | S00001550_V2 |
| | SurveyID: | 1577 |
| | Questions to copy: | 0 |
| | Next Survey: | 0 -- No Survey |
| | How to Sync: | Sync by Group |
| | Type: | Survey |

Reviewed by:
Application: _____ Date: _____
QA: _____ Date: _____
Management: _____ Date: _____
Customer: _____ Date: _____

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXDBAInfo | *DBA Name* | Tap Keyboard, enter the Required Doing Business as (DBA) Name, tap Done, tap Next. | Text Form | | | | | | | | All_Information | Yes | Yes | 75 | Text |
| 2 | DBAAddress | *Address 1 DBA Location: | Tap Keyboard, tap 123, enter the Required Address of the 1 DBA Location, tap Done, tap Next. | Text Form | | | | | | | | All_Information | Yes | Yes | 75 | Text |
| 3 | DBACity | *City: | Tap Keyboard, enter the Required City, tap Done, tap Next. | Text Form | | | | | | | | All_Information | Yes | Yes | 75 | Text |
| 4 | DBAState | *State: | Tap Keyboard, tap 123, enter the above items by placing the cursor on the line, tap Done, tap Next. | Report | | | | | | | | All_Information | Yes | Yes | 4 | Text |
| | | | Tap Keyboard, tap 123, enter | | | | | | | | | | | | | |

A-1

| | | | | | | | | | | | | | | |
|---|---|---|---|---|---|---|---|---|---|---|---|---|---|---|
| 5 | DBAZip | *Zip Code: | the above items by placing the cursor on the line, tap Done, tap Next. | Text Form | | | | | | | All_Information | Yes | Yes 14 | Text |
| 6 | DBACountry | *Country: | Tap Keyboard, tap 123, enter the above items by placing the cursor on the line, tap Done, tap Next. | Text Form | | | | | | | All_Information | Yes | Yes 4 | Text |
| 7 | DBAPhone | *DBA Phone#: | Tap Keyboard, tap 123, enter the above items by placing the cursor on the line, tap Done, tap Next. | Text Form | | | | | | | All_Information | Yes | Yes 26 | Text |
| 8 | DBAFax | DBA Fax#: | Tap Keyboard, tap 123, enter the above items by placing the cursor on the line, tap Done, tap Next. | Text Form | | | | | | | All_Information | Yes | Yes 26 | Text |
| 9 | DBAContact | *Contact: | Tap Keyboard, tap 123, enter the above items by placing the cursor on the line, tap Done, tap Next. | Text Form | | | | | | | All_Information | Yes | Yes 26 | Text |
| 10 | ContactTitle | Contact Title: | Tap Keyboard, enter Contact Title, tap Done, tap Next. | Text Form | | | | | | | All_Information | Yes | 26 | Text |
| 11 | EndList6 | EndList | EndList | End List for GUI | | | | | | | | | 0 | Number |

*A-2*

| | | | 20 | | | | | | | | | | | |
|---|---|---|---|---|---|---|---|---|---|---|---|---|---|---|
| 12 | WebAdd | Web Site Address? | Tap Yes if you have a website address. | Yes/No Form | | | | | | | | | 0 | Number |
| 13 | WebAddress | Web Site Address: | Tap Keyboard, tap 123, enter the Web Site Address, tap Done, tap Next. | Text Form | | 12 | WebAdd | No | If Value Skip Over | All_Information | Yes | | 75 | Text |
| 14 | emailown2 | Email address: | Tap Keyboard, then 'abc' and enter the email address of this owner if there is no email address enter NA. Tap done then next. | Text Form | | | | | | All_Information | Yes | | 52 | Text |
| 15 | FedTaxID | 0000000000, 9999999999 | Please Tap Numeric Pad to enter the Federal Tax ID Number: | Number Form | | | | | | All_Information | Yes | | 11 | ntext |
| 16 | ControlNumber | Control Number: | Tap Keyboard, tap 123, enter the Control Number, tap Done, tap Next. | Text Form | | | | | | All_Information | Yes | | 40 | Text |
| 17 | AnnualMCV | 000000000000000, 999999999999999 | What is the customers Annual MC or Visa Sales Amount? | Number Form | | | | | | All_Information | Yes | | 16 | ntext |
| 18 | AvegTicket | 0000000000, 9999999999 | What is the customers Average Ticket Sales Amount? | Number Form | | | | | | All_Information | Yes | | 11 | ntext |
| 19 | SIC_NAICS | 0000, 9999 | Please Tap Numeric Pad to enter the SIC / NAICS: | Number Form | | | | | | All_Information | Yes | | 5 | ntext |
| 20 | NumLocation | 0000, 9999 | Please Tap Numeric Pad to enter the | Number | | | | | | All_Information | Yes | | 5 | ntext |

*A-3*

|    |           |                 | Number of Locations: | Form              |  |  |  |  |  |  |  | All_Information | Yes |    |        |
|----|-----------|-----------------|----------------------|-------------------|--|--|--|--|--|--|--|-----------------|-----|----|--------|
| 21 | Industry  | Industry:       | Retail               | Single MC         |  |  |  |  |  |  |  | All_Information | Yes | 26 | Number |
| 22 | Industry1 | Multiple Choice | Restaurant           | MC & Skip List    |  |  |  |  |  |  |  | All_Information | Yes | 0  | Number |
| 23 | Industry2 | Multiple Choice | Lodging              | MC & Skip List    |  |  |  |  |  |  |  | All_Information | Yes | 0  | Number |
| 24 | Industry3 | Multiple Choice | MOTO                 | MC & Skip List    |  |  |  |  |  |  |  | All_Information | Yes | 0  | Number |
| 25 | Industry4 | Multiple Choice | Car Rental           | MC & Skip List    |  |  |  |  |  |  |  | All_Information | Yes | 0  | Number |
| 26 | EndList7  | End List        | End List             | No GUI            |  |  |  |  |  |  |  |                 |     | 0  | Number |
| 27 | Service   | Services:       | Authorization        | MC & Skip List    |  |  |  |  |  |  |  | All_Information | Yes | 0  | Number |
| 28 | Service1  | Multiple Choice | Settlement           | MC & Skip List    |  |  |  |  |  |  |  | All_Information | Yes | 0  | Number |
| 29 | Service2  | Multiple Choice | Check                | MC & Skip List    |  |  |  |  |  |  |  | All_Information | Yes | 0  | Number |
| 30 | Service3  | Multiple Choice | Big Batch            | MC & Skip List    |  |  |  |  |  |  |  | All_Information | Yes | 0  | Number |
| 31 | Service4  | Multiple Choice | PC Hub               | MC & Skip List    |  |  |  |  |  |  |  | All_Information | Yes | 0  | Number |
| 32 | Service5  | Multiple Choice | Stored Value         | MC & Skip List    |  |  |  |  |  |  |  | All_Information | Yes | 0  | Number |

*A-4*

| | | | | | | | | | | | | | |
|---|---|---|---|---|---|---|---|---|---|---|---|---|---|
| 33 | EndList8 | End List | End List | No GUI | | | | | | | | 0 | Number |
| 34 | Equipment | Equipment: | Owned | Single MC | | 46 | Competitor | Yes | If Value Skip | All_Information | Yes | 26 | Number |
| 35 | Equipment1 | Multiple Choice | Purchase | MC & Skip List | | | | | | All_Information | Yes | 0 | Number |
| 36 | EndList | End List | End List | No GUI | | | | | | | | 0 | Number |
| 37 | PurchaseEquip | Type of Purchased Equipment | Tranz330 | Single MC | | | | | | All_Information | Yes | 26 | Number |
| 38 | PurchaseEquip1 | Multiple Choice | Tranz380 | MC & Skip List | | | | | | All_Information | Yes | 0 | Number |
| 39 | PurchaseEquip2 | Multiple Choice | Tranz460 | MC & Skip List | | | | | | All_Information | Yes | 0 | Number |
| 40 | PurchaseEquip3 | Multiple Choice | Omni396 | MC & Skip List | | | | | | All_Information | Yes | 0 | Number |
| 41 | PurchaseEquip4 | Multiple Choice | Omni3200 | MC & Skip List | | | | | | All_Information | Yes | 0 | Number |
| 42 | PurchaseEquip5 | Multiple Choice | HypercomT7 | MC & Skip List | | | | | | All_Information | Yes | 0 | Number |
| 43 | PurchaseEquip6 | Multiple Choice | HypercomT77 | MC & Skip List | | | | | | All_Information | Yes | 0 | Number |
| 44 | PurchaseEquip7 | Multiple Choice | HypercomT8 | MC & Skip List | | | | | | All_Information | Yes | 0 | Number |
| 45 | EndList1 | End List | End List | No GUI | | | | | | | | 0 | Number |
| 46 | Competitor | Competitor: | FDC | MC & Skip | | | | | | All_Information | Yes | 0 | Number |

*A-5*

| | | | List | | | | | | | | | | |
|---|---|---|---|---|---|---|---|---|---|---|---|---|---|
| 47 | Competitor1 | Multiple Choice | Nova | MC & Skip List | | | | | | | All_Information | Yes | 0 | Number |
| 48 | Competitor2 | Multiple Choice | Lynk | MC & Skip List | | | | | | | All_Information | Yes | 0 | Number |
| 49 | Competitor3 | Multiple Choice | Heartland | MC & Skip List | | | | | | | All_Information | Yes | 0 | Number |
| 50 | Competitor4 | Multiple Choice | Suntrust | MC & Skip List | | | | | | | All_Information | Yes | 0 | Number |
| 51 | Competitor5 | Multiple Choice | Other | MC & Skip List | | | | | | | All_Information | Yes | 0 | Number |
| 52 | EndList9 | End List | End List | No GUI | | | | | | | | | 0 | Number |
| 53 | OtrCompetitor | Enter the Other Competitor: | Tap Keyboard, enter the Other Competitor, tap Done, tap Next. | Text Form | | | 51 | Competitor5 | No | If Value Skip Over | All_Information | Yes | 75 | Text |
| 54 | Stage | Stage: | Initial Contact | Single MC | | | | | | | All_Information | Yes | 26 | Number |
| 55 | Stage1 | Multiple Choice | Add'l Statements | MC & Skip List | | | | | | | All_Information | Yes | 0 | Number |
| 56 | Stage2 | Multiple Choice | Statement Analysis | MC & Skip List | | | | | | | All_Information | Yes | 0 | Number |
| 57 | Stage3 | Multiple Choice | Presentation | MC & Skip List | | | | | | | All_Information | Yes | 0 | Number |
| 58 | Stage4 | Multiple Choice | Competitive Win | MC & Skip List | | | | | | | All_Information | Yes | 0 | Number |

*A-6*

| 59 | Stage5 | Multiple Choice | Closed / Won | MC & Skip List | | | | | | | All_Information | Yes | | 0 | Number |
|---|---|---|---|---|---|---|---|---|---|---|---|---|---|---|---|
| 60 | Stage6 | Multiple Choice | Lost Opportunity | MC & Skip List | | | | | | | All_Information | Yes | | 0 | Number |
| 61 | EndList10 | End List | End List | No GUI | | | | | | | | | | 0 | Number |
| 62 | LostOpportunity | Lost Opportunity: | Pricing | MC & Skip List | | | 60 | Stage6 | No | If Value Skip Over | All_Information | Yes | | 0 | Number |
| 63 | LostOpportunity1 | Multiple Choice | Trade Association | MC & Skip List | | | 60 | Stage6 | No | If Value Skip Over | All_Information | Yes | | 0 | Number |
| 64 | LostOpportunity2 | Multiple Choice | Bank Enticement | MC & Skip List | | | 60 | Stage6 | No | If Value Skip Over | All_Information | Yes | | 0 | Number |
| 65 | LostOpportunity3 | Multiple Choice | ISO | MC & Skip List | | | 60 | Stage6 | No | If Value Skip Over | All_Information | Yes | | 0 | Number |
| 66 | LostOpportunity4 | Multiple Choice | Partner / VAR | MC & Skip List | | | 60 | Stage6 | No | If Value Skip Over | All_Information | Yes | | 0 | Number |
| 67 | LostOpportunity5 | Multiple Choice | Equip not Certified | MC & Skip List | | | 60 | Stage6 | No | If Value Skip Over | All_Information | Yes | | 0 | Number |
| 68 | EndList11 | End List | End List | No GUI | | | 60 | Stage6 | No | If Value Skip Over | | | | 0 | Number |
| 69 | Opportunity | Opportunity: | New Business | Single MC | | | | | | | All_Information | Yes | | 26 | Number |
| 70 | Opportunity1 | Multiple Choice | Existing Customer | MC & Skip List | | | | | | | All_Information | Yes | | 0 | Number |
| 71 | Opportunity2 | Multiple Choice | Partner | MC & | | | | | | | All_Information | Yes | | 0 | Number |

*A-7*

| | | | Skip List | | | | | | | | | | | |
|---|---|---|---|---|---|---|---|---|---|---|---|---|---|---|
| 72 | Opportunity3 | Multiple Choice | Retail Chain | MC & Skip List | | | | | | | All_Information | Yes | 0 | Number |
| 73 | Opportunity4 | Multiple Choice | Competitive Bid | MC & Skip List | | | | | | | All_Information | Yes | 0 | Number |
| 74 | Opportunity5 | Multiple Choice | Special Pricing | MC & Skip List | | | | | | | All_Information | Yes | 0 | Number |
| 75 | EndList12 | End List | End List | No GUI | | | | | | | | | 0 | Number |
| 76 | Rating | Rating: | Cold | Single MC | | | | | | | All_Information | Yes | 26 | Number |
| 77 | Rating1 | Multiple Choice | Warm | MC & Skip List | | | | | | | All_Information | Yes | 0 | Number |
| 78 | Rating2 | Multiple Choice | Hot | MC & Skip List | | | | | | | All_Information | Yes | 0 | Number |
| 79 | EndList13 | End List | End List | No GUI | | | | | | | | | 0 | Number |
| 80 | SaleRegion | Sales Region: | List of Choices. | List Form | | | | | | | All_Information | Yes | 0 | V Text |
| 81 | Commt | Do you have any Comments? | Tap Yes if you have any Comments. | Yes/No Form | | | 83 | FollowUpDate | No | If Value Skip | | | 0 | Number |
| 82 | CommtTxt | Enter the Comments: | Tap Keyboard, enter the Comments, tap Done, tap Next. | Text Form | | | | | | | All_Information | Yes | 255 | Text |
| 83 | FollowUpDate | 0000000000, 9999999999 | Please Tap Numeric Pad to enter the Follow Up Date (MM-DD-YYYY): | Number Form | | | | | | | All_Information | Yes | 11 | ntext |
| | | | Tap Keyboard, tap 123, enter | | | | | | | | | | | |

*A-8*

| 84 | LeadSource | Enter the Lead Source: | the Lead Source, tap Done, tap Next. | Text Form | | | | | | | | All_Information | Yes | | 75 | Text |

Confidential Property of Numoda Corporation Engineering Department

| | Date: | 10/08/2001 | | |
|---|---|---|---|---|
| | Title: | LisSalesRegion | | |
| | Name: | S00001567_V1 | Reviewed by: | |
| | SurveyID: | 1567 | Application: _____ | Date:_____ |
| | Questions to copy: | 0 | QA: _____ | Date:_____ |
| | Next Survey: | 0 -- No Survey | Management: _____ | Date:_____ |
| Application Listing | How to Sync: | Desktop to Palm by User | Customer: _____ | Date:_____ |
| | Type: | List | | |

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | | | 0 | Date |
| 1 | SaleRegion | Sales Region: | List of Choices. | List Form | | | | | | | | | | | 0 | V Text |

| Mobile ID | SaleRegion |
|---|---|
| 0 | Northeast Region |
| 0 | Southeast Region |
| 0 | Northwest Region |
| 0 | Southwest Region |
| 0 | Middle Atlantic Region |
| 0 | Middle West Region |

Confidential Property of Numoda Corporation Engineering Department

*A-9*

| | Date: | 10/08/2001 | | | |
|---|---|---|---|---|---|
| | Title: | Merchant Application | | | |
| | Name: | S00001355_V2 | Reviewed by: | | |
| | SurveyID: | 1403 | Application: | | Date: |
| | Questions to copy: | 10 | QA: | | Date: |
| | Next Survey: | 1496 -- Equipment Calculator | Management: | | Date: |
| Application Listing | How to Sync: | Sync by Group | Customer: | | Date: |
| | Type: | Survey | | | |

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXDBAInfo | *DBA Name: | Tap Keyboard, enter the Required Doing Business as (DBA) Name, tap Done, tap Next. | Text Form | | | | | | | | | | Yes | 75 | Text |
| 2 | DBAAddress | *Address 1 DBA Location: | Tap Keyboard, tap 123, enter the Required Address of the 1 DBA Location, tap Done, tap Next. | Text Form | | | | | | | | | | Yes | 75 | Text |
| 3 | DBACity | *City: | Tap Keyboard, enter the Required City, tap Done, tap Next | Text Form | | | | | | | | | | Yes | 75 | Text |
| 4 | DBAState | *State: | Tap Keyboard, tap 123, enter the above items by placing the cursor on the line, tap Done, tap Next. | Report with Help | | | | | | | | | | Yes | 5 | Text |
| 5 | DBAZip | *Zip Code: | Tap Keyboard, tap 123, enter the above items by placing the cursor on the line, tap Done, tap Next | Text Form | | | | | | | | | | Yes | 14 | Text |
| 6 | DBACountry | *Country: | Tap Keyboard, tap 123, enter the above items by placing the cursor on the line, tap Done, tap Next. | Text Form | | | | | | | | | | Yes | 4 | Text |
| 7 | DBAPhone | *DBA Phone#: | Tap Keyboard, tap 123, enter the above items by placing the cursor on the line, tap Done, tap Next. | Text Form | | | | | | | | | | Yes | 26 | Text |
| 8 | DBAFax | DBA Fax#: | Tap Keyboard, tap 123, enter the above items by placing the cursor on the | Text Form | | | | | | | | | | Yes | 26 | Text |

A-10

| | | | line, tap Done, tap Next. | | | | | | | | | | | | | |
|---|---|---|---|---|---|---|---|---|---|---|---|---|---|---|---|---|
| 9 | DBAContact | *Contact: | Tap Keyboard, tap 123, enter the above items by placing the cursor on the line, tap Done, tap Next. | Text Form | | | | | | | | | | Yes | 26 | Text |
| 10 | EndList46 | End List | End List | End List for GUI 23 | | | | | | | | | | Yes | 0 | Num |
| 11 | ProdSold | Product Sold/Service Rendered: | Tap Keyboard, tap 123, enter the Product Sold or Service Rendered, tap Done, tap Next. | Text Form | | | | 0 | | | | | | | 75 | Text |
| 12 | XXLegalInfo | Legal Name Different? | Tap Yes if the legal name is different from the DBA name. | Yes/No Form | | | 20 | XXBusinessInfo | No | If Value Skip | | | | | 0 | Num |
| 13 | LegalName | Legal Name. | Tap Keyboard, enter the legal name, tap Done, tap Next. | Report | | | | 0 | | | | | | | 26 | Text |
| 14 | LegalAddr | Legal Address: | Tap Keyboard, tap abc to enter text, tap 123 to enter numbers, tap Done, tap Next. | Text Form | | | | 0 | | | | | | | 26 | Text |
| 15 | LegalCity | City: | Tap Keyboard, enter the city, tap Done, tap Next. | Text Form | | | | 0 | | | | | | | 26 | Text |
| 16 | LeaglState | State: | Tap Keyboard, enter the two letter abbreviation for the state, tap Done, tap Next | Text Form | | | | 0 | | | | | | | 5 | Text |
| 17 | LegalZip | Zip Code: | Tap Keyboard, tap 123, enter the zip code, tap Done, tap next. | Text Form | | | | 0 | | | | | | | 14 | Text |
| 18 | LegPhone | Legal Phone: | Tap Keyboard, tap 123, enter the legal phone number, tap Done, tap Next. | Text Form | | | | 0 | | | | | | | 26 | Text |
| 19 | EndList47 | End List | End List | End List for GUI 20 | | | | 0 | | | | | | | 0 | Num |
| 20 | XXBusinessInfo | 0000000000, 9999999999 | Please Tap Numeric Pad to enter the Routing Transit Number: | Number Form | | | | 0 | | | | | | | 11 | ntext |
| | | 00000000000000000000 | Tap the numbers to enter | Number | | | | | | | | | | | | |

A-11

| | | | | | | | | | | | | | |
|---|---|---|---|---|---|---|---|---|---|---|---|---|---|
| 21 | DDACheck | 9999999999999999999 | the DDA Checking Account number. | Form | | | | 0 | | | | 20 | ntext |
| 22 | FedTaxID | 000000000, 999999999 | Tap the numbers to enter the federal tax ID number. | Number Form | | | | 0 | | | | 10 | ntext |
| 23 | NumLoc | 0000, 9999 | Tap the numbers to enter the number of locations. | Number Form | | | | 0 | | | | 5 | ntext |
| 24 | YearsExist | Yrs in Existen.: | Tap Keyboard, tap 123, enter How many years this business has been in existence under the current management and/or ownership and How long a customer generally waits before receiving your product or services after being charged, tap Done, tap Next. | Report with Help | | | | 0 | | | | 26 | Text |
| 25 | ProdWait | Cust. wait time. | Tap Keyboard, tap 123, enter How many years this business has been in existence under the current management and/or ownership and How long a customer generally waits before receiving your product or services after being charged, tap Done, tap Next. | Text Form | | | | 0 | | | | 26 | Text |
| 26 | EndList48 | End List | End List | End List for GUI 23 | | | | | | | | 0 | Num |
| 27 | OffWarant | Offer Waranties? | Tap Yes if offer any warranties, subscriptions, or memberships are offered. | Yes/No Form | | | | 0 | | | | 0 | Num |
| 28 | XXCreditHistory | Previous Credit Plan? | Tap Yes if a Member of a Credit Card Plan under this Business Name or any other Business Name. | Yes/No Form | | | 39 | ControlNumber | No | If Value Skip | | 0 | Num |
| 29 | MemName | Plan Name: | Tap Keyboard, tap abc to enter text, tap 123 to enter numbers, tap Done, tap Next. | Report | | | | 0 | | | | 26 | Text |
| 30 | AcctNumb2 | Acct No : | Tap Keyboard, tap 123, enter the account number, tap Done, tap Next. | Text Form | | | | 0 | | | | 26 | Text |

*A-12*

| | | | | | | | | | | | | | |
|---|---|---|---|---|---|---|---|---|---|---|---|---|---|
| 31 | DepBank | BankDeposit: | Tap Keyboard, enter the bank that deposits are made, tap Done, tap Next. | Text Form | | | | 0 | | | | 26 | Text |
| 32 | EndList49 | End List | End List | End List for GUI 20 | | | | 0 | | | | 0 | Num |
| 33 | TermByPlan | Terminated by plan? | Tap Yes, if any of the Principals of the Company, or any Company Associated with in the past have been Terminated by any Credit Card Plan. | Yes/No Form | | | 37 | FileBankrupt | No | If Value Skip | | 0 | Num |
| 34 | Explain | Explain why: | Tap Keyboard, enter Explanation as to why Terminated by the Credit Card Plan, tap Done, tap Next. | Text Form | | | | 0 | | | | 75 | Text |
| 35 | MemOthComp | Officers of other company? | Tap Yes if any Principals, Partners, Proprietors, Officers, Majority Shareholders or Managing Agents of Company are Officers, Majority Shareholders, or Board Members of any other Company | Yes/No Form | | | 39 | ControlNumber | No | If Value Skip | | 0 | Num |
| 36 | OthCompany | List All Companies: | Tap Keyboard, enter all other companies, tap Done, tap Next. | Text Form | | | | 0 | | | | 75 | Text |
| 37 | FileBankrupt | Filed for Bankruptcy? | Tap Yes if any of the companies listed above have filed for bankruptcy. | Yes/No Form | | | 39 | ControlNumber | No | If Value Skip | | 0 | Num |
| 38 | bankruptco | Enter the company: | Tap Keyboard, tap 'abc', enter the name of the company(s) that declared bankruptcy, tap done, then next. | Text Form | | | | | | | | 75 | Text |
| 39 | ControlNumber | Control Number: | Tap Keyboard, tap 123, enter the Control Number, tap Done, tap Next. | Text Form | | | | | | | | 40 | Text |
| 40 | OtherBusType | Business Type: | 00 - Other (ie. Non-Profit) | Single MC | | | | | | | | 26 | Num |
| 41 | IndSolePart | Multiple Choice. | 12-Individual/Sole Proprietor. | MC & Skip | | | | 0 | | | | 0 | Num |

*A-13*

| | | | | | | | | | | | | | |
|---|---|---|---|---|---|---|---|---|---|---|---|---|---|
| | | | List | | | | | | | | | | |
| 42 | PartJointVent | Multiple Choice. | 22-Partnership/Joint Venture | MC & Skip List | | | | | | | | 0 | Num |
| 43 | CorpChapterSC | Multiple Choice. | 31 - Corp., Chapter S, C, etc. | MC & Skip List | | | | | | | | 0 | Num |
| 44 | MedLegalCorp | Multiple Choice. | 41 - Medical or Legal Corp. | MC & Skip List | | | | | | | | 0 | Num |
| 45 | AssEstTrusts | Multiple Choice. | 50 - Associations/Est./Trusts | MC & Skip List | | | | | | | | 0 | Num |
| 46 | TaxExOrg501C | Multiple Choice. | 60-Tax Exempt Organ. (501C) | MC & Skip List | | | | | | | | 0 | Num |
| 47 | GovFedStLocal | Multiple Choice. | 70-Govt. (Federal/State/Local) | MC & Skip List | | | | | | | | 0 | Num |
| 48 | InternationOrg | Multiple Choice. | 80 - International Organizations | MC & Skip List | | | | | | | | 0 | Num |
| 49 | LimitLiabilityCo | Multiple Choice. | 90 - Limited Liability Companies | MC & Skip List | | | | | | | | 0 | Num |
| 50 | EndList | End List | End List | No GUI | | | | | | | | 0 | Num |
| 51 | SolePropName | First Name: | Tap Keyboard, enter the Sole Proprietors First/Middle/Last Name, tap Done, tap Next | Report with Help | | | 41 | IndSolePart | No | If Value Skip Over | | 26 | Text |
| 52 | SolePropMI | Middle Initial: | Tap Keyboard, enter the Sole Proprietors First/Middle/Last Name, tap Done, tap Next. | Text Form | | | 41 | IndSolePart | No | If Value Skip Over | | 4 | Text |
| 53 | SolePropLast | Last Name: | Tap Keyboard, enter the Sole Proprietors First/Middle/Last Name, | Text Form | | | 41 | IndSolePart | No | If Value Skip | | 26 | Text |

*A-14*

| | | | | | | | | | | | | | | |
|---|---|---|---|---|---|---|---|---|---|---|---|---|---|---|
| | | | tap Done, tap Next. | | | | | | | Over | | | | |
| 54 | EndList63 | End List | End List | End List for GUI 23 | | | 41 | IndSolePart | No | If Value Skip Over | | | 0 | Num |
| 55 | MerchTaxID | 000000000, 999999999 | Tap the numbers to enter the merchant tax ID number. | Number Form | | | 43 | CorpChapterSC | No | If Value Skip Over | | | 10 | ntext |
| 56 | AnnualMCV | 000000000000000, 999999999999999 | What is the customers Annual MC or Visa Sales Amount? | Number Form | | | | | | | | | 16 | ntext |
| 57 | AvegTicket | 0000000000, 9999999999 | What is the customers Average Ticket Sales Amount? | Number Form | | | | | | | | | 11 | ntext |
| 58 | MultLocat | Multiple Locations Total: | If there are Multiple Locations, enter the Total Annual MC/V Sales Amount. If No Multiple Locations, enter NA. | Text Form | | | | | | | | | 75 | Text |
| 59 | XXBankInfo | Bank Ref.: | Tap Keyboard, tap abc to enter text, tap 123 to enter numbers of a current bank refference, tap Done, tap Next. | Report | | | 0 | | | | | | 26 | Text |
| 60 | BankContact | Contact: | Tap Keyboard, enter the contact, tap Done, tap Next. | Text Form | | | 0 | | | | | | 26 | Text |
| 61 | AcctNumb | Acct. Number: | Tap Keyboard, tap 123, enter the account number, tap Done, tap Next. | Text Form | | | 0 | | | | | | 26 | Text |
| 62 | TeleNumb | Phone No.: | Tap Keyboard, tap 123, enter the telephone number, tap Done, tap Next. | Text Form | | | 0 | | | | | | 26 | Text |
| 63 | EndList50 | End List | End List | End List for GUI 20 | | | 0 | | | | | | 0 | Num |
| 64 | XXTradeReference | Trade Ref : | Tap Keyboard, enter Largest Trade Reference, tap Done, tap Next. | Report | | | 0 | | | | | | 26 | Text |
| 65 | TradeContact | Contact: | Tap Keyboard, enter the contact, tap Done, tap Next. | Text Form | | | 0 | | | | | | 26 | Text |

*A-15*

| 66 | AcctNumb1 | Acct. Number: | Tap Keyboard, tap 123, enter the account number, tap Done, tap Next. | Text Form | | | | 0 | | | | | | 26 | Text |
| 67 | TeleNumb1 | Phone No.: | Tap Keyboard, tap 123, enter the telephone number, tap Done, tap Next. | Text Form | | | | 0 | | | | | | 26 | Text |
| 68 | EndList51 | End List | End List | End List for GUI 20 | | | | 0 | | | | | | 0 | Num |
| 69 | XXOwnerInfo | Owner Name: | Tap Keyboard, tap abc to enter the name of the company's owner or officer, tap Done, tap Next. | Report | | | | 0 | | | | | | 26 | Text |
| 70 | SSNumb | SS Number: | Tap Keyboard, tap 123, enter the social security number, tap Done, tap Next. | Text Form | | | | 0 | | | | | | 15 | Text |
| 71 | HomeTelNumb | Phone No : | Tap Keyboard, tap 123, enter the home telephone number, tap Done, tap Next. | Text Form | | | | 0 | | | | | | 26 | Text |
| 72 | HomeAddr | Home Address: | Tap Keyboard, enter the home address, tap Done, tap Next. | Text Form | | | | 0 | | | | | | 26 | Text |
| 73 | HomeCity | City: | Tap Keyboard, enter the city, tap Done, tap Next. | Text Form | | | | 0 | | | | | | 26 | Text |
| 74 | HomeState | State: | Tap Keyboard, enter the two digit abbreviation for the state, tap Done, tap Next. | Text Form | | | | 0 | | | | | | 5 | Text |
| 75 | HomeZipCode | Zip Code: | Tap Keyboard, tap 123, enter the zip code, tap Done, tap Next. | Text Form | | | | 0 | | | | | | 26 | Text |
| 76 | EndList52 | End List | End List | End List for GUI 20 | | | | 0 | | | | | | 0 | Num |
| 77 | emailown1 | Email address: | Tap Keyboard, tap 'abc', enter the Email Address of this officer/owner, tap Done, tap Next. | Text Form | | | | 0 | | | | | | 50 | Text |
| 78 | DOB | 00000000000, 99999999999 | Please Tap Numeric Pad to enter Date of Birth (MM- | Number Form | | | | 0 | | | | | | 12 | ntext |

*A-16*

| | | DD-19YY): | | | | | | | | | | | |
|---|---|---|---|---|---|---|---|---|---|---|---|---|---|
| 79 | YrsThere | 000, 999 | Please Tap Numeric Pad to enter Number of Years lived there. | Number Form | | | | 0 | | | | 4 | ntext |
| 80 | Own1 | Select the appropriate Ownership Status of Your Home from the list below | Own | Single MC | | | | 0 | | | | 26 | Num |
| 81 | Rent1 | Multiple Choice | Rent | MC & Skip List | | | | | | | | 0 | Num |
| 82 | EndList1 | End List | End List | No GUI | | | | | | | | 0 | Num |
| 83 | PersBankRef | Pers. Bank Ref: | Tap Keyboard, tap abc to enter text, tap 123 to enter numbers, tap Done, tap Next. | Report | | | | 0 | | | | 26 | Text |
| 84 | BankContact1 | Contact: | Tap Keyboard, enter the contact, tap Done, tap Next. | Text Form | | | | 0 | | | | 26 | Text |
| 85 | AcctNum | Acct. Number: | Tap Keyboard, tap 123, enter the account number, tap Done, tap Next. | Text Form | | | | 0 | | | | 26 | Text |
| 86 | TeleNumb2 | Phone No.: | Tap Keyboard, tap 123, enter the telephone number, tap Done, tap Next. | Text Form | | | | 0 | | | | 26 | Text |
| 87 | EndList53 | End List | End List | End List for GUI 20 | | | | 0 | | | | 0 | Num |
| 88 | AnotOffice | Another Owner of the Business? | Tap Yes if there is another Owner's/Officer's Information to fill out. | Yes/No Form | | | 108 | WebAdd | No | If Value Skip | | 0 | Num |
| 89 | OwnOffName | Owner Name: | Tap Keyboard, tap abc to enter text, tap 123 to enter numbers, tap Done, tap Next. | Report | | | | 0 | | | | 26 | Text |
| 90 | SSNumb1 | SS Number: | Tap Keyboard, tap 123, enter the social security number, tap Done, tap Next | Text Form | | | | 0 | | | | 15 | Text |
| 91 | HomeTeleNumb | Phone No.: | Tap Keyboard, tap 123, enter the home telephone number, tap Done, tap | Text Form | | | | 0 | | | | 26 | Text |

*A-17*

| # | Name | Label | Instructions | Type | | | | Default | | | | | | Size | DataType |
|---|------|-------|--------------|------|---|---|---|---------|---|---|---|---|---|------|----------|
| | | | Next. | | | | | | | | | | | | |
| 92 | HomeAddr1 | Home Address: | Tap Keyboard, enter the home address, tap Done, tap Next. | Text Form | | | | 0 | | | | | | 26 | Text |
| 93 | HomeCity1 | City: | Tap Keyboard, enter the city, tap Done, tap Next. | Text Form | | | | 0 | | | | | | 26 | Text |
| 94 | HomeState1 | State: | Tap Keyboard, enter the two digit abbreviation for the state, tap Done, tap Next | Text Form | | | | 0 | | | | | | 5 | Text |
| 95 | HomeZipCode1 | Zip Code: | Tap Keyboard, tap 123, enter the zip code, tap Done, tap Next. | Text Form | | | | 0 | | | | | | 26 | Text |
| 96 | EndList54 | End List | End List | End List for GUI 20 | | | | 0 | | | | | | 0 | Num |
| 97 | emailown2 | Email address: | Tap Keyboard, then 'abc' and enter the email address of this owner if there is no email address enter NA. Tap done then next. | Text Form | | | | 0 | | | | | | 52 | Text |
| 98 | DOB1 | 00000000000, 99999999999 | Please Tap Numeric Pad to enter Date of Birth (MM-DD-19YY): | Number Form | | | | 0 | | | | | | 12 | ntext |
| 99 | YrsThere1 | 000, 999 | Please Tap Numeric Pad to enter how many years you were there: | Number Form | | | | 0 | | | | | | 3 | ntext |
| 100 | OwnRent1 | Select the appropriate Ownership Status of Your Home from the list below : | Own | Single MC | | | | 0 | | | | | | 26 | Num |
| 101 | OwnRent | Multiple Choice | Rent | MC & Skip List | | | | | | | | | | 0 | Num |
| 102 | EndList2 | End List | End List | No GUI | | | | | | | | | | 0 | Num |
| 103 | PersBankRef1 | Pers. Bank Ref: | Tap Keyboard, tap abc to enter text, tap 123 to enter numbers, tap Done, tap Next. | Report | | | | 0 | | | | | | 26 | Text |
| 104 | BankContact2 | Contact. | Tap Keyboard, enter the contact, tap Done, tap Next. | Text Form | | | | 0 | | | | | | 26 | Text |

*A-18*

| 105 | EndList55 | End List | End List | End List for GUI 20 | | | | 0 | | | | | | | 0 | Num |
| 106 | AcctNum1 | 0000000000, 9999999999 | Tap the numbers to enter the account number. | Number Form | | | | 0 | | | | | | | 11 | ntext |
| 107 | TeleNumb3 | 0000000000, 9999999999 | Tap the numbers to enter the telephone number. | Number Form | | | | 0 | | | | | | | 11 | ntext |
| 108 | WebAdd | Web Site Address? | Tap Yes if you have a website address. | Yes/No Form | | | 110 | XXCorrespondence | No | If Value Skip | | | | | 0 | Num |
| 109 | WebAddress | Web Site Address: | Tap Keyboard, tap 123, enter the Web Site Address, tap Done, tap Next. | Text Form | | | | | | | | | | | 75 | Text |
| 110 | XXCorrespondence | What would you like to send to the DBA address? | Correspondence | MC & Skip List | | | | | | | | | | | 0 | Num |
| 111 | DBAadd2 | Multiple Choice | Supplies | MC & Skip List | | | | | | | | | | | 0 | Num |
| 112 | DBAadd3 | Multiple Choice | Reports | MC & Skip List | | | | | | | | | | | 0 | Num |
| 113 | DBAadd4 | Multiple Choice | Kit / Equipment | MC & Skip List | | | | | | | | | | | 0 | Num |
| 114 | DBAadd5 | Multiple Choice | None of the above | MC & Skip List | | | | | | | | | | | 0 | Num |
| 115 | EndList3 | End List | End List | No GUI | | | | | | | | | | | 0 | Num |
| 116 | OtAdd | Send to another address? | Tap Yes if you want to send to correspondence, supplies, reports, or the kit/equipment to another address. | Yes/No Form | | | 131 | XXUserDefined | No | If Value Skip | | | | | 0 | Num |
| 117 | CorpAdd | What would you like to send to the Corporate Address? | Correspondence | MC & Skip List | | | | | | | | | | | 0 | Num |

*A-19*

| 118 | CorpAdd1 | Multiple Choice | Supplies | MC & Skip List | | | | | | | | | | 0 | Num |
| 119 | CorpAdd2 | Multiple Choice | Reports | MC & Skip List | | | | | | | | | | 0 | Num |
| 120 | CorpAdd3 | Multiple Choice | Kit / Equipment | MC & Skip List | | | | | | | | | | 0 | Num |
| 121 | CorpAdd4 | Multiple Choice | None of the above | MC & Skip List | | | | | | | | | | 0 | Num |
| 122 | EndList4 | End List | End List | No GUI | | | | | | | | | | 0 | Num |
| 123 | OtAdd1 | Send to Another Address? | Tap Yes if Correspondence, Supplies, Reports, or the Kit/Equipment is to be sent to Another Address | Yes/No Form | | | 131 | XXUserDefined | No | If Value Skip | | | | 0 | Num |
| 124 | OtAdd2 | What would you like to send to the Other Address? | Correspondence | MC & Skip List | | | | | | | | | | 0 | Num |
| 125 | OtAdd3 | Multiple Choice | Supplies | MC & Skip List | | | | | | | | | | 0 | Num |
| 126 | OtAdd4 | Multiple Choice | Reports | MC & Skip List | | | | | | | | | | 0 | Num |
| 127 | OtAdd5 | Multiple Choice | Kit / Equipment | MC & Skip List | | | | | | | | | | 0 | Num |
| 128 | OtAdd6 | Multiple Choice | None of the above | MC & Skip List | | | | | | | | | | 0 | Num |
| 129 | EndList5 | End List | End List | No GUI | | | | | | | | | | 0 | Num |
| 130 | othadtxt | Enter the Other Address: | Tap Keyboard, tap abc, enter the Address where the | Text | | | | | | | | | | 75 | Text |

*A-20*

| | | | Correspondence should be Sent, tap Done, tap Next. | Form | | | | | | | | | | | |
|---|---|---|---|---|---|---|---|---|---|---|---|---|---|---|---|
| 131 | XXUserDefined | User Defined 1 - Vendor (This field indicates the method of authorization by vendor and whether the merchant is in compliance with MasterCard and Visa. The following is the list of authorization codes): | 00 = Global Payments Voice Authorization | Single MC | | | | | | | | | | 26 | Num |
| 132 | userdefltxt1 | Multiple Choice | 20 = Hypercom : Reverse PIP | MC & Skip List | | | | | | | | | | 0 | Num |
| 133 | userdefltxt2 | Multiple Choice | 21 = Hypercom : Straight PIP | MC & Skip List | | | | | | | | | | 0 | Num |
| 134 | userdefltxt3 | Multiple Choice | 22 = OMNI 380/390 | MC & Skip List | | | | | | | | | | 0 | Num |
| 135 | userdefltxt4 | Multiple Choice | 23 = Hypercom: AMEX capture via Global Payments | MC & Skip List | | | | | | | | | | 0 | Num |
| 136 | userdefltxt5 | Multiple Choice | 30 = Outside Vendor (i.e. AMEX) | MC & Skip List | | | | | | | | | | 0 | Num |
| 137 | userdefltxt6 | Multiple Choice | 40 = LAN Lodging(G.P. Atlanta Auth/Settle:TEI help desk) | MC & Skip List | | | | . | | | | | | 0 | Num |
| 138 | userdefltxt7 | Multiple Choice | 47 = OmniPak Reverse PIP | MC & Skip List | | | | | | | | | | 0 | Num |
| 139 | userdefltxt8 | Multiple Choice | 48 = OmniPak Split Dial | MC & Skip List | | | | | | | | | | 0 | Num |
| 140 | userdefltxt9 | Multiple Choice | 49 = OmniPak (Amex Auth/Settle via G.P. Atlanta) | MC & Skip List | | | | | | | | | | 0 | Num |

A-21

| 141 | userdefltxt10 | Multiple Choice | 50 = Global Payments Atlanta: Auth-Only | MC & Skip List | | | | | | | | | | 0 | Num |
| 142 | userdefltxt11 | Multiple Choice | 51 = Global Payments Atlanta: EDC | MC & Skip List | | | | | | | | | | 0 | Num |
| 143 | userdefltxt12 | Multiple Choice | 52 = Touch Tone Capture (TTC) | MC & Skip List | | | | | | | | | | 0 | Num |
| 144 | userdefltxt13 | Multiple Choice | 53 = Telemoney Auth-Only | MC & Skip List | | | | | | | | | | 0 | Num |
| 145 | userdefltxt14 | Multiple Choice | 54 = Telemoney EDC | MC & Skip List | | | | | | | | | | 0 | Num |
| 146 | userdefltxt15 | Multiple Choice | 56 = VISANet Auth-Only | MC & Skip List | | | | | | | | | | 0 | Num |
| 147 | userdefltxt16 | Multiple Choice | 57 = VISANet EDC | MC & Skip List | | | | | | | | | | 0 | Num |
| 148 | userdefltxt17 | Multiple Choice | 61 = Global Payments Complete | MC & Skip List | | | | | | | | | | 0 | Num |
| 149 | userdefltxt18 | Multiple Choice | 70 = BuyPass (AGI) Auth-Only | MC & Skip List | | | | | | | | | | 0 | Num |
| 150 | userdefltxt19 | Multiple Choice | 71 = BuyPass (AGI) EDC | MC & Skip List | | | | | | | | | | 0 | Num |
| 151 | userdefltxt20 | Multiple Choice | 72 = Global Payments St. Louis (MAPP) EDC | MC & Skip List | | | | | | | | | | 0 | Num |
| 152 | userdefltxt21 | Multiple Choice | 73 = Touch Tone IVR | MC & | | | | | | | | | | | |

A-22

| | | | (Global Payments) | Skip List | | | | | | | | | | | | |
|---|---|---|---|---|---|---|---|---|---|---|---|---|---|---|---|---|
| 153 | userdefltxt22 | Multiple Choice | 74 = Global Payments St. Louis (MAPP) Auth-Only | MC & Skip List | | | | | | | | | | | 0 | Num |
| 154 | userdefltxt23 | Multiple Choice | 75 = FDMS Nashville (Envoy) EDC | MC & Skip List | | | | | | | | | | | 0 | Num |
| 155 | userdefltxt24 | Multiple Choice | 76 = FDMS Nashville (Envoy) Auth-Only | MC & Skip List | | | | | | | | | | | 0 | Num |
| 156 | userdefltxt25 | Multiple Choice | 77 = Global Payments L.A. (MDI) Auth-Only | MC & Skip List | | | | | | | | | | | 0 | Num |
| 157 | userdefltxt26 | Multiple Choice | 78 = Global Payments L.A. (MDI) EDC | MC & Skip List | | | | | | | | | | | 0 | Num |
| 158 | userdefltxt27 | Multiple Choice | 80 = PC Hub | MC & Skip List | | | | | | | | | | | 0 | Num |
| 159 | userdefltxt28 | Multiple Choice | 81 = PC Retail for Windows East | MC & Skip List | | | | | | | | | | | 0 | Num |
| 160 | userdefltxt29 | Multiple Choice | 86 = Mainframe | MC & Skip List | | | | | | | | | | | 0 | Num |
| 161 | userdefltxt30 | Multiple Choice | 87 = VAR | MC & Skip List | | | | | | | | | | | 0 | Num |
| 162 | userdefltxt31 | Multiple Choice | 98 = FDR (Omaha) etc. | MC & Skip List | | | | | | | | | | | 0 | Num |
| 163 | userdefltxt32 | Multiple Choice | None of the above / Other | MC & Skip List | | | | | | | | | | | 0 | Num |

*A-23*

| | | | | | | | | | | | | | | |
|---|---|---|---|---|---|---|---|---|---|---|---|---|---|---|
| 164 | EndList6 | End List | End List | No GUI | | | | | | | | | 0 | Num |
| 165 | userdef2txt | User Defined 2 - Earn Out Status (This field indicates the earn out status which is used by the finance department to pay the partner banks. The below listed codes are based on the date the portfolio was sold and the merchant's opening date.): | N = Account Opened After Portfolio Acquisition | Single MC | | | | | | | | | 26 | Num |
| 166 | userdef2txt1 | Multiple Choice | B = Account Opened Prior to Portfolio Acquisition | MC & Skip List | | | | | | | | | 0 | Num |
| 167 | userdef2txt2 | Multiple Choice | R = Referred by Partner Bank after Portfolio Acquisition | MC & Skip List | | | | | | | | | 0 | Num |
| 168 | userdef2txt3 | Multiple Choice | None of the above / Other | MC & Skip List | | | | | | | | | 0 | Num |
| 169 | EndList7 | End List | End List | No GUI | | | | | | | | | 0 | Num |
| 170 | userdef3txt | User Defined 3 - Region / Site (This field indicates the electronic capture vendor and the length of the original reference number. The indicators are as follows.): | 1000 = Northeast | Single MC | | | | | | | | | 26 | Num |
| 171 | userdef3txt1 | Multiple Choice | 3000 = Southest | MC & Skip List | | | | | | | | | 0 | Num |
| 172 | userdef3txt2 | Multiple Choice | 5000 = West | MC & Skip List | | | | | | | | | 0 | Num |
| 173 | userdef3txt3 | Multiple Choice | 7000 = Central | MC & Skip List | | | | | | | | | 0 | Num |

A-24

| | | | | | | | | | | | | | | | | | |
|---|---|---|---|---|---|---|---|---|---|---|---|---|---|---|---|---|---|
| 174 | userdef3txt4 | Multiple Choice | 9000 = Comerica | MC & Skip List | | | | | | | | | | | | 0 | Num |
| 175 | userdef3txt5 | Multiple Choice | None of the above / Other | MC & Skip List | | | | | | | | | | | | 0 | Num |
| 176 | EndList8 | End List | End List | No GUI | | | | | | | | | | | | 0 | Num |
| 177 | userdef4txt | User Defined 4 : (Position 1 - Indicates Account Type/Owner) | A = Account Manager | Single MC | | | | | | | | | | | | 26 | Num |
| 178 | userdef4txt1 | Multiple Choice | B = I/C Program Merchants | MC & Skip List | | | | | | | | | | | | 0 | Num |
| 179 | userdef4txt2 | Multiple Choice | E = Agent Banks | MC & Skip List | | | | | | | | | | | | 0 | Num |
| 180 | userdef4txt3 | Multiple Choice | I = ISO Merchant | MC & Skip List | | | | | | | | | | | | 0 | Num |
| 181 | userdef4txt4 | Multiple Choice | K = Key Account/National Account | MC & Skip List | | | | | | | | | | | | 0 | Num |
| 182 | userdef4txt5 | Multiple Choice | P = Purchase Card Merchant | MC & Skip List | | | | | | | | | | | | 0 | Num |
| 183 | userdef4txt6 | Multiple Choice | T = Trade Association Merchant | MC & Skip List | | | | | | | | | | | | 0 | Num |
| 184 | userdef4txt7 | Multiple Choice | Z = Major/National Account Purchase Card Program | MC & Skip List | | | | | | | | | | | | 0 | Num |
| 185 | userdef4txt8 | Multiple Choice | None of the above / Other | MC & Skip List | | | | | | | | | | | | 0 | Num |
| 186 | EndList9 | End List | End List | No | | | | | | | | | | | | 0 | Num |

*A-25*

| | | | | GUI | | | | | | | | | | | | |
|---|---|---|---|---|---|---|---|---|---|---|---|---|---|---|---|---|
| 187 | userdef4txt9 | User Defined 4 : (Position 2 - Indicates Commission Percentages) | H = 20 | Single MC | | | | | | | | | | | 26 | Num |
| 188 | userdef4txt10 | Multiple Choice | J = 15 | MC & Skip List | | | | | | | | | | | 0 | Num |
| 189 | userdef4txt11 | Multiple Choice | K = 12 | MC & Skip List | | | | | | | | | | | 0 | Num |
| 190 | userdef4txt12 | Multiple Choice | L = 1 | MC & Skip List | | | | | | | | | | | 0 | Num |
| 191 | userdef4txt13 | Multiple Choice | M = 2 | MC & Skip List | | | | | | | | | | | 0 | Num |
| 192 | userdef4txt14 | Multiple Choice | N = 3 | MC & Skip List | | | | | | | | | | | 0 | Num |
| 193 | userdef4txt15 | Multiple Choice | O = 4 | MC & Skip List | | | | | | | | | | | 0 | Num |
| 194 | userdef4txt16 | Multiple Choice | P = 5 | MC & Skip List | | | | | | | | | | | 0 | Num |
| 195 | userdef4txt17 | Multiple Choice | X = 10 | MC & Skip List | | | | | | | | | | | 0 | Num |
| 196 | userdef4txt18 | Multiple Choice | Y = 7 | MC & Skip List | | | | | | | | | | | 0 | Num |
| 197 | userdef4txt19 | Multiple Choice | Z = 14 | MC & Skip List | | | | | | | | | | | 0 | Num |
| | | | | MC | | | | | | | | | | | | |

A-26

| | | | | | | | | | | | | | | |
|---|---|---|---|---|---|---|---|---|---|---|---|---|---|---|
| 198 | userdef4txt20 | Multiple Choice | None of the above / Other | & Skip List | | | | | | | | | 0 | Num |
| 199 | EndList10 | End List | End List | No GUI | | | | | | | | | 0 | Num |
| 200 | userdef5txt | User Defined 5 : (District) | 1100 = Buffalo | Single MC | | | | | | | | | 26 | Num |
| 201 | userdef5txt1 | Multiple Choice | 1200 = Jericho | MC & Skip List | | | | | | | | | 0 | Num |
| 202 | userdef5txt2 | Multiple Choice | 1300 = MD / VA | MC & Skip List | | | | | | | | | 0 | Num |
| 203 | userdef5txt3 | Multiple Choice | 1400 = New England | MC & Skip List | | | | | | | | | 0 | Num |
| 204 | userdef5txt4 | Multiple Choice | 1500 = Philadelphia | MC & Skip List | | | | | | | | | 0 | Num |
| 205 | userdef5txt5 | Multiple Choice | 3100 = Alabama | MC & Skip List | | | | | | | | | 0 | Num |
| 206 | userdef5txt6 | Multiple Choice | 3200 = Atlanta | MC & Skip List | | | | | | | | | 0 | Num |
| 207 | userdef5txt7 | Multiple Choice | 3300 = Charlotte | MC & Skip List | | | | | | | | | 0 | Num |
| 208 | userdef5txt8 | Multiple Choice | 3400 = Florida | MC & Skip List | | | | | | | | | 0 | Num |
| 209 | userdef5txt9 | Multiple Choice | 3500 = New Orleans | MC & Skip List | | | | | | | | | 0 | Num |
| 210 | userdef5txt10 | Multiple Choice | 5100 = Denver | MC & Skip | | | | | | | | | 0 | Num |

A-27

| | | | | | | | | | | | | | | |
|---|---|---|---|---|---|---|---|---|---|---|---|---|---|---|
| | | | List | | | | | | | | | | | |
| 211 | userdef5txt11 | Multiple Choice | 5200 = Los Angeles | MC & Skip List | | | | | | | | | 0 | Num |
| 212 | userdef5txt12 | Multiple Choice | 5300 = Phoenix | MC & Skip List | | | | | | | | | 0 | Num |
| 213 | userdef5txt13 | Multiple Choice | 5400 = San Diego | MC & Skip List | | | | | | | | | 0 | Num |
| 214 | userdef5txt14 | Multiple Choice | 5500 = San Francisco | MC & Skip List | | | | | | | | | 0 | Num |
| 215 | userdef5txt15 | Multiple Choice | 5600 = Seattle | MC & Skip List | | | | | | | | | 0 | Num |
| 216 | userdef5txt16 | Multiple Choice | 7100 = Austin | MC & Skip List | | | | | | | | | 0 | Num |
| 217 | userdef5txt17 | Multiple Choice | 7200 = Chicago | MC & Skip List | | | | | | | | | 0 | Num |
| 218 | userdef5txt18 | Multiple Choice | 7300 = Cincinnati | MC & Skip List | | | | | | | | | 0 | Num |
| 219 | userdef5txt19 | Multiple Choice | 7400 = Cleveland | MC & Skip List | | | | | | | | | 0 | Num |
| 220 | userdef5txt20 | Multiple Choice | 7500 = El Paso | MC & Skip List | | | | | | | | | 0 | Num |
| 221 | userdef5txt21 | Multiple Choice | 7600 = Houston | MC & Skip List | | | | | | | | | 0 | Num |
| | | | | MC | | | | | | | | | | |

*A-28*

| 222 | userdef5txt22 | Multiple Choice | 7700 = Indianapolis | MC & Skip List | | | | | | | | | | | 0 | Num |
| --- | --- | --- | --- | --- | --- | --- | --- | --- | --- | --- | --- | --- | --- | --- | --- | --- | --- |
| 223 | userdef5txt23 | Multiple Choice | 7800 = Kansas City | MC & Skip List | | | | | | | | | | | 0 | Num |
| 224 | userdef5txt24 | Multiple Choice | 7900 = St. Louis | MC & Skip List | | | | | | | | | | | 0 | Num |
| 225 | userdef5txt25 | Multiple Choice | 8000 = Texas | MC & Skip List | | | | | | | | | | | 0 | Num |
| 226 | userdef5txt26 | Multiple Choice | 9100 = Comerica - Dallas | MC & Skip List | | | | | | | | | | | 0 | Num |
| 227 | userdef5txt27 | Multiple Choice | 9200 = Comerica - Detroit | MC & Skip List | | | | | | | | | | | 0 | Num |
| 228 | userdef5txt28 | Multiple Choice | 9300 = Comerica - Michigan | MC & Skip List | | | | | | | | | | | 0 | Num |
| 229 | userdef5txt29 | Multiple Choice | 9400 = Comerica - San Jose | MC & Skip List | | | | | | | | | | | 0 | Num |
| 230 | userdef5txt30 | Multiple Choice | None of the above / Other | MC & Skip List | | | | | | | | | | | 0 | Num |
| 231 | EndList11 | End List | End List | No GUI | | | | | | | | | | | 0 | Num |
| 232 | userdef6txt | User Defined 6 : (Branch Number) | Tap Keyboard, tap 123, enter the Branch Number (Old, may not be used), tap Done, tap Next. If NO Branch Number, please enter NA. | Text Form | | | | | | | | | | | 26 | Text |
| 233 | userdef7txt | User Defined 7 : (Distribution Channel) | REG = Regional | Single MC | | | | | | | | | | | 0 | Num |
| | | | | MC | | | | | | | | | | | | |

| 234 | userdef7txt1 | Multiple Choice | ISO = ISO | & Skip List | | | | | | | | | 0 | Num |
| --- | --- | --- | --- | --- | --- | --- | --- | --- | --- | --- | --- | --- | --- | --- |
| 235 | userdef7txt2 | Multiple Choice | TEL = Telesales | MC & Skip List | | | | | | | | | 0 | Num |
| 236 | userdef7txt3 | Multiple Choice | NAT = National Sales | MC & Skip List | | | | | | | | | 0 | Num |
| 237 | userdef7txt4 | Multiple Choice | BUS = Business to Business | MC & Skip List | | | | | | | | | 0 | Num |
| 238 | userdef7txt5 | Multiple Choice | None of the above / Other | MC & Skip List | | | | | | | | | 0 | Num |
| 239 | EndList12 | End List | End List | No GUI | | | | | | | | | 0 | Num |
| 240 | usdef8P1txt | User Defined 8 ; (Position 1 - Indicates who CLOSED the deal) | D = Business Development | Single MC | | | | | | | | | 26 | Num |
| 241 | usdef8P1txt1 | Multiple Choice | H = Healthcare | MC & Skip List | | | | | | | | | 0 | Num |
| 242 | usdef8P1txt2 | Multiple Choice | I = IPS | MC & Skip List | | | | | | | | | 0 | Num |
| 243 | usdef8P1txt3 | Multiple Choice | N = National Sales Office | MC & Skip List | | | | | | | | | 0 | Num |
| 244 | usdef8P1txt4 | Multiple Choice | R = Regional Sales Office | MC & Skip List | | | | | | | | | 0 | Num |
| 245 | usdef8P1txt5 | Multiple Choice | S = Reserved for Seasonal Indicator | MC & Skip List | | | | | | | | | 0 | Num |
| 246 | usdef8P1txt6 | Multiple Choice | T = Territory Manager | MC & | | | | | | | | | 0 | Num |

A-30

| | | Sales | Skip List | | | | | | | | | | |
|---|---|---|---|---|---|---|---|---|---|---|---|---|---|
| 247 | usdef8P1txt7 | Multiple Choice | None of the above / Other | MC & Skip List | | | | | | | | | 0 | Num |
| 248 | EndList13 | End List | End List | No GUI | | | | | | | | | 0 | Num |
| 249 | usdef8P2txt | User Defined 8 : (Position 2 - Indicates who SOURCED the lead) | A = Account Management | Single MC | | | | | | | | | 26 | Num |
| 250 | usdef8P2txt1 | Multiple Choice | B = BankCard Assn (MC / Visa) | MC & Skip List | | | | | | | | | 0 | Num |
| 251 | usdef8P2txt2 | Multiple Choice | C = Customer Service | MC & Skip List | | | | | | | | | 0 | Num |
| 252 | usdef8P2txt3 | Multiple Choice | D = Business Development | MC & Skip List | | | | | | | | | 0 | Num |
| 253 | usdef8P2txt4 | Multiple Choice | E = Agent Bank | MC & Skip List | | | | | | | | | 0 | Num |
| 254 | usdef8P2txt5 | Multiple Choice | G = GPS | MC & Skip List | | | | | | | | | 0 | Num |
| 255 | usdef8P2txt6 | Multiple Choice | H = Healthcare | MC & Skip List | | | | | | | | | 0 | Num |
| 256 | usdef8P2txt7 | Multiple Choice | I = IPS | MC & Skip List | | | | | | | | | 0 | Num |
| 257 | usdef8P2txt8 | Multiple Choice | I = Internet (Email) | MC & Skip List | | | | | | | | | 0 | Num |
| 258 | usdef8P2txt9 | Multiple Choice | K = Customer Referral | MC & | | | | | | | | | 0 | Num |

*A-31*

| | | | | | | | | | | | | | | | |
|---|---|---|---|---|---|---|---|---|---|---|---|---|---|---|---|
| | | | Skip List | | | | | | | | | | | | |
| 259 | usdef8P2txt10 | Multiple Choice | M = Marketing | MC & Skip List | | | | | | | | | | 0 | Num |
| 260 | usdef8P2txt11 | Multiple Choice | N = National Sales Office | MC & Skip List | | | | | | | | | | 0 | Num |
| 261 | usdef8P2txt12 | Multiple Choice | P = Partner Bank | MC & Skip List | | | | | | | | | | 0 | Num |
| 262 | usdef8P2txt13 | Multiple Choice | R = Regional Sales Office | MC & Skip List | | | | | | | | | | 0 | Num |
| 263 | usdef8P2txt14 | Multiple Choice | S = Reserved for seasonal Indicator | MC & Skip List | | | | | | | | | | 0 | Num |
| 264 | usdef8P2txt15 | Multiple Choice | T = Trade Association | MC & Skip List | | | | | | | | | | 0 | Num |
| 265 | usdef8P2txt16 | Multiple Choice | U = Unknown | MC & Skip List | | | | | | | | | | 0 | Num |
| 266 | usdef8P2txt17 | Multiple Choice | V = Vendor / Trade Show | MC & Skip List | | | | | | | | | | 0 | Num |
| 267 | usdef8P2txt18 | Multiple Choice | None of the above / Other | MC & Skip List | | | | | | | | | | 0 | Num |
| 268 | EndList14 | End List | End List | No GUI | | | | | | | | | | 0 | Num |
| 269 | usdef8P3txt | User Defined 8 - (Position 3 - 8 Will Identify Accounts $1MM and over with an Account Manager.) | CAMBUF | Single MC | | | | | | | | | | 26 | Num |
| | | | | MC | | | | | | | | | | | |

*A-32*

| | | | | | | | | | | | | | | | |
|---|---|---|---|---|---|---|---|---|---|---|---|---|---|---|---|
| 270 | usdef8P3txt1 | Multiple Choice | CAMBOS | MC & Skip List | | | | | | | | | | 0 | Num |
| 271 | usdef8P3txt2 | Multiple Choice | CAMAL | MC & Skip List | | | | | | | | | | 0 | Num |
| 272 | usdef8P3txt3 | Multiple Choice | CAMCA | MC & Skip List | | | | | | | | | | 0 | Num |
| 273 | usdef8P3txt4 | Multiple Choice | CAMCT | MC & Skip List | | | | | | | | | | 0 | Num |
| 274 | usdef8P3txt5 | Multiple Choice | CAMMD | MC & Skip List | | | | | | | | | | 0 | Num |
| 275 | usdef8P3txt6 | Multiple Choice | CAMNYM | MC & Skip List | | | | | | | | | | 0 | Num |
| 276 | usdef8P3txt7 | Multiple Choice | CAMPA | MC & Skip List | | | | | | | | | | 0 | Num |
| 277 | usdef8P3txt8 | Multiple Choice | CAMTX | MC & Skip List | | | | | | | | | | 0 | Num |
| 278 | usdef8P3txt9 | Multiple Choice | CAMVA | MC & Skip List | | | | | | | | | | 0 | Num |
| 279 | usdef8P3txt10 | Multiple Choice | FAMBUF | MC & Skip List | | | | | | | | | | 0 | Num |
| 280 | usdef8P3txt11 | Multiple Choice | FAMBOS | MC & Skip List | | | | | | | | | | 0 | Num |
| 281 | usdef8P3txt12 | Multiple Choice | FAMAL | MC & Skip | | | | | | | | | | 0 | Num |

A-33

| | | | | List | | | | | | | | | | | | | |
|---|---|---|---|---|---|---|---|---|---|---|---|---|---|---|---|---|---|
| 282 | usdef8P3txt13 | Multiple Choice | FAMCA | MC & Skip List | | | | | | | | | | | | 0 | Num |
| 283 | usdef8P3txt14 | Multiple Choice | FAMCT | MC & Skip List | | | | | | | | | | | | 0 | Num |
| 284 | usdef8P3txt15 | Multiple Choice | FAMMD | MC & Skip List | | | | | | | | | | | | 0 | Num |
| 285 | usdef8P3txt16 | Multiple Choice | FAMNYM | MC & Skip List | | | | | | | | | | | | 0 | Num |
| 286 | usdef8P3txt17 | Multiple Choice | FAMPA | MC & Skip List | | | | | | | | | | | | 0 | Num |
| 287 | usdef8P3txt18 | Multiple Choice | FAMTX | MC & Skip List | | | | | | | | | | | | 0 | Num |
| 288 | usdef8P3txt19 | Multiple Choice | FAMVA | MC & Skip List | | | | | | | | | | | | 0 | Num |
| 289 | usdef8P3txt20 | Multiple Choice | SAMAL | MC & Skip List | | | | | | | | | | | | 0 | Num |
| 290 | usdef8P3txt21 | Multiple Choice | SAMCT | MC & Skip List | | | | | | | | | | | | 0 | Num |
| 291 | usdef8P3txt22 | Multiple Choice | SAMMD | MC & Skip List | | | | | | | | | | | | 0 | Num |
| 292 | usdef8P3txt23 | Multiple Choice | SAMNYM | MC & Skip List | | | | | | | | | | | | 0 | Num |
| | | | | MC | | | | | | | | | | | | | |

*A-34*

| 293 | usdef8P3txt24 | Multiple Choice | SAMPA | & Skip List | | | | | | | | | | | 0 | Num |
| 294 | usdef8P3txt25 | Multiple Choice | SAMTX | MC & Skip List | | | | | | | | | | | 0 | Num |
| 295 | usdef8P3txt26 | Multiple Choice | SAMVA | MC & Skip List | | | | | | | | | | | 0 | Num |
| 296 | usdef8P3txt27 | Multiple Choice | None of the above / Other | MC & Skip List | | | | | | | | | | | 0 | Num |
| 297 | EndList15 | End List | End List | No GUI | | | | | | | | | | | 0 | Num |
| 298 | userdef9txt | User Defined 9 - Portfolio (This field is used by Bank 0468 & 0167 only. Bank 0468 uses this field to indicate Allfirst DRP (Bank Product). The store number is put in this field allowing merchants with multiple locations to identify each store location. Bank 0167 uses this field to indicate the Agent Bank number associated with the merchants.): | 1089 = Unidentified | Single MC | | | | | | | | | | | 26 | Num |
| 299 | userdef9txt1 | Multiple Choice | None of the above / Other | MC & Skip List | | | | | | | | | | | 0 | Num |
| 300 | EndList16 | End List | End List | No GUI | | | | | | | | | | | 0 | Num |
| 301 | usedef10txt | User Defined 10-Service Merchant No. | Tap Keyboard, tap 123, enter the Check Services Merchant Number (This field is used to indicate the merchant's NDC eCommerce Check Services account number.), tap Done, tap Next. | Text Form | | | | | | | | | | | 26 | Text |

*A-35*

| | | | | | | | | | | | | | | |
|---|---|---|---|---|---|---|---|---|---|---|---|---|---|---|
| 302 | TapeID | 000, 999 | Please Tap Numeric Pad to enter Tape ID: | Number Form | | | | | | | | | 4 | ntext |
| 303 | HoldStamt | Select if you need any of the following: | Hold Statement | MC & Skip List | | | | | | | | | 0 | Num |
| 304 | DailyAch | Multiple Choice | Daily Ach | MC & Skip List | | | | | | | | | 0 | Num |
| 305 | WinDsct | Multiple Choice | Window (Daily) Discount | MC & Skip List | | | | | | | | | 0 | Num |
| 306 | PaperReports | Multiple Choice | 257 Paper Reports | MC & Skip List | | | | | | | | | 0 | Num |
| 307 | PaperReports1 | Multiple Choice | 258 Paper Reports | MC & Skip List | | | | | | | | | 0 | Num |
| 308 | NoneOfAbove | Multiple Choice | None of the above | MC & Skip List | | | | | | | | | 0 | Num |
| 309 | EndList17 | End List | End List | No GUI | | | | | | | | | 0 | Num |
| 310 | XXAuthorization | Pick ONE or BOTH Interchanges: | VISA I/C | MC & Skip List | | | | | | | | | 0 | Num |
| 311 | PaymentFees | Multiple Choice | MC I/C | MC & Skip List | | | | 356 | MCOptions | Yes | If Value Skip | | 0 | Num |
| 312 | EndList18 | End List | End List | No GUI | | | | | | | | | 0 | Num |
| 313 | VisaOptions | Select one of the Visa Interchange Items below: | CPS | Single MC | | | 0 | | | | | | 26 | Num |
| 314 | VisaOptions1 | Multiple Choice | EIRF | MC & Skip List | | | | | | | | | 0 | Num |
| | | | | MC | | | | | | | | | | |

| | | | | | | | | | | | | | |
|---|---|---|---|---|---|---|---|---|---|---|---|---|---|
| 315 | VisaOptions2 | Multiple Choice | STD | & Skip List | | | | | | | | 0 | Num |
| 316 | VisaOptions3 | Multiple Choice | SMKT | MC & Skip List | | | | | | | | 0 | Num |
| 317 | VisaOptions4 | Multiple Choice | None of the above | MC & Skip List | | | | | | | | 0 | Num |
| 318 | EndList19 | End List | End List | No GUI | | | | | | | | 0 | Num |
| 319 | VisaPlanSttmt | Pick the Plan Settlement Types your customer needs: (VISA) | VISA | MC & Skip List | | | | 0 | | | | 0 | Num |
| 320 | VisaPlanSttmt1 | Multiple Choice | VISA / BC | MC & Skip List | | | | 0 | | | | 0 | Num |
| 321 | VisaPlanSttmt2 | Multiple Choice | VS Supermarket | MC & Skip List | | | | 0 | | | | 0 | Num |
| 322 | VisaPlanSttmt3 | Multiple Choice | VISA Debit | MC & Skip List | | | | 0 | | | | 0 | Num |
| 323 | EndList20 | End List | End List | No GUI | | | | 0 | | | | 0 | Num |
| 324 | AutEdcVisaFees1 | Check Box for ONE or BOTH of the following for VISA Plan Type: | Authorization | MC & Skip List | | | 319 | VisaPlanSttmt | Yes | If Not Value Skip Over | | 0 | Num |
| 325 | AutEdcVisaFees2 | Multiple Choice | Electronic Data Capture | MC & Skip List | | | 319 | VisaPlanSttmt | Yes | If Not Value Skip Over | | 0 | Num |
| 326 | EndList21 | End List | End List | No GUI | | | 319 | VisaPlanSttmt | Yes | If Not Value Skip Over | | 0 | Num |

A-37

| 327 | VisaFees1 | Per Item$ | Tap Keyboard, tap 123, enter the Amount of each Fee for the VISA Plan, tap Done, tap Next. | Report with Help | | | | 319 | VisaPlanSttmt | Yes | If Not Value Skip Over | | | | 26 | Text |
|---|---|---|---|---|---|---|---|---|---|---|---|---|---|---|---|---|
| 328 | VisaFees2 | Gross Disc.% | Tap Keyboard, tap 123, enter the Amount of each Fee for the VISA Plan, tap Done, tap Next. | Text Form | | | | 319 | VisaPlanSttmt | Yes | If Not Value Skip Over | | | | 26 | Text |
| 329 | VisaFees3 | Summary | Tap Keyboard, tap 123, enter the Amount of each Fee for the VISA Plan, tap Done, tap Next. | Text Form | | | | 319 | VisaPlanSttmt | Yes | If Not Value Skip Over | | | | 26 | Text |
| 330 | VisaFees4 | Rebate Rate% | Tap Keyboard, tap 123, enter the Amount of each Fee for the VISA Plan, tap Done, tap Next. | Text Form | | | | 319 | VisaPlanSttmt | Yes | If Not Value Skip Over | | | | 26 | Text |
| 331 | EndList56 | End List | End List | End List for GUI 23 | | | | 319 | VisaPlanSttmt | Yes | If Not Value Skip Over | | | | 0 | Num |
| 332 | AutEdcVisaBc1 | Check Box for ONE or BOTH of the following for VISA/BC Plan Type: | Authorization | MC & Skip List | | | | 320 | VisaPlanSttmt1 | Yes | If Not Value Skip Over | | | | 0 | Num |
| 333 | AutEdcVisaBc2 | Multiple Choice | Electronic Data Capture | MC & Skip List | | | | 320 | VisaPlanSttmt1 | Yes | If Not Value Skip Over | | | | 0 | Num |
| 334 | EndList22 | End List | End List | No GUI | | | | 320 | VisaPlanSttmt1 | Yes | If Not Value Skip Over | | | | 0 | Num |
| 335 | VisaBcSettmt1 | Per Item$ | Tap Keyboard, tap 123, enter the Amount of each Fee for the VISA/BC Plan, tap Done, tap Next. | Report with Help | | | | 320 | VisaPlanSttmt1 | Yes | If Not Value Skip Over | | | | 26 | Text |
| | | | Tap Keyboard, tap 123, | | | | | | | | If Not | | | | | |

A-38

| 336 | VisaBcSettmt2 | Gross Disc.% | enter the Amount of each Fee for the VISA/BC Plan, tap Done, tap Next. | Text Form | | | 320 | VisaPlanSttmt1 | Yes | Value Skip Over | | | 26 | Text |
|---|---|---|---|---|---|---|---|---|---|---|---|---|---|---|
| 337 | VisaBcSettmt3 | Summary | Tap Keyboard, tap 123, enter the Amount of each Fee for the VISA/BC Plan, tap Done, tap Next. | Text Form | | | 320 | VisaPlanSttmt1 | Yes | If Not Value Skip Over | | | 26 | Text |
| 338 | VisaBcSettmt4 | Rebate Rate% | Tap Keyboard, tap 123, enter the Amount of each Fee for the VISA/BC Plan, tap Done, tap Next. | Text Form | | | 320 | VisaPlanSttmt1 | Yes | If Not Value Skip Over | | | 26 | Text |
| 339 | EndList57 | End List | End List | End List for GUI 23 | | | 320 | VisaPlanSttmt1 | Yes | If Not Value Skip Over | | | 0 | Num |
| 340 | AutEdcVSSuper1 | Check Box for ONE or BOTH of the following for VS SUPERMARKET Plan Type: | Authorization | MC & Skip List | | | 321 | VisaPlanSttmt2 | Yes | If Not Value Skip Over | | | 0 | Num |
| 341 | AutEdcVisaFees6 | Multiple Choice | Electronic Data Capture | MC & Skip List | | | 321 | VisaPlanSttmt2 | Yes | If Not Value Skip Over | | | 0 | Num |
| 342 | EndList23 | End List | End List | No GUI | | | 321 | VisaPlanSttmt2 | Yes | If Not Value Skip Over | | | 0 | Num |
| 343 | VSSuper1 | Per Item$ | Tap Keyboard, tap 123, enter the Amount of each Fee for the VS SUPERMARKET Plan, tap Done, tap Next. | Report with Help | | | 321 | VisaPlanSttmt2 | Yes | If Not Value Skip Over | | | 26 | Text |
| 344 | VSSuper2 | Gross Disc.% | Tap Keyboard, tap 123, enter the Amount of each Fee for the VS SUPERMARKET Plan, tap Done, tap Next. | Text Form | | | 321 | VisaPlanSttmt2 | Yes | If Not Value Skip Over | | | 26 | Text |
| 345 | VSSuper3 | Summary | Tap Keyboard, tap 123, enter the Amount of each Fee for the VS SUPERMARKET Plan, tap | Text Form | | | 321 | VisaPlanSttmt2 | Yes | If Not Value Skip | | | 26 | Text |

A-39

| | | | Done, tap Next. | | | | | | | Over | | | | |
|---|---|---|---|---|---|---|---|---|---|---|---|---|---|---|
| 346 | VSSuper4 | Rebate Rate% | Tap Keyboard, tap 123, enter the Amount of each Fee for the VS SUPERMARKET Plan, tap Done, tap Next. | Text Form | | | | 321 | VisaPlanSttmt2 | Yes | If Not Value Skip Over | | 26 | Text |
| 347 | EndList58 | End List | End List | End List for GUI 23 | | | | 321 | VisaPlanSttmt2 | Yes | If Not Value Skip Over | | 0 | Num |
| 348 | AutEdcVisaDebit1 | Check Box for ONE or BOTH of the following for VISA DEBIT Plan Type: | Authorization | MC & Skip List | | | | 322 | VisaPlanSttmt3 | Yes | If Not Value Skip Over | | 0 | Num |
| 349 | AutEdcVisaDebit2 | Multiple Choice | Electronic Data Capture | MC & Skip List | | | | 322 | VisaPlanSttmt3 | Yes | If Not Value Skip Over | | 0 | Num |
| 350 | EndList24 | End List | End List | No GUI | | | | 322 | VisaPlanSttmt3 | Yes | If Not Value Skip Over | | 0 | Num |
| 351 | VisaDebit1 | Per Item$ | Tap Keyboard, tap 123, enter the Amount of each Fee for the VISA DEBIT Plan, tap Done, tap Next. | Report with Help | | | | 322 | VisaPlanSttmt3 | Yes | If Not Value Skip Over | | 26 | Text |
| 352 | VisaDebit2 | Gross Disc.% | Tap Keyboard, tap 123, enter the Amount of each Fee for the VISA DEBIT Plan, tap Done, tap Next. | Text Form | | | | 322 | VisaPlanSttmt3 | Yes | If Not Value Skip Over | | 26 | Text |
| 353 | VisaDebit3 | Summary | Tap Keyboard, tap 123, enter the Amount of each Fee for the VISA DEBIT Plan, tap Done, tap Next. | Text Form | | | | 322 | VisaPlanSttmt3 | Yes | If Not Value Skip Over | | 26 | Text |
| 354 | VisaDebit4 | Rebate Rate% | Tap Keyboard, tap 123, enter the Amount of each Fee for the VISA DEBIT Plan, tap Done, tap Next. | Text Form | | | | 322 | VisaPlanSttmt3 | Yes | If Not Value Skip Over | | 26 | Text |
| | | | | End | | | | | | | If | | | |

A-40

| 355 | EndList59 | End List | End List | List for GUI 23 | | | | 322 | VisaPlanSttmt3 | Yes | Not Value Skip Over | | | | 0 | Num |
| --- | --- | --- | --- | --- | --- | --- | --- | --- | --- | --- | --- | --- | --- | --- | --- | --- |
| 356 | MCOptions | Select one of the MasterCard Interchange Items below: | MT3 | Single MC | | | | 311 | PaymentFees | No | If Value Skip Over | | | | 26 | Num |
| 357 | MCOptions1 | Multiple Choice | MT1 | MC & Skip List | | | | 311 | PaymentFees | No | If Value Skip Over | | | | 0 | Num |
| 358 | MCOptions2 | Multiple Choice | STD | MC & Skip List | | | | 311 | PaymentFees | No | If Value Skip Over | | | | 0 | Num |
| 359 | MCOptions3 | Multiple Choice | SMKT | MC & Skip List | | | | 311 | PaymentFees | No | If Value Skip Over | | | | 0 | Num |
| 360 | MCOptions4 | Multiple Choice | None of the above | MC & Skip List | | | | 311 | PaymentFees | No | If Value Skip Over | | | | 0 | Num |
| 361 | EndList25 | End List | End List | No GUI | | | | 311 | PaymentFees | No | If Value Skip Over | | | | 0 | Num |
| 362 | MCPlanSttmt | Pick the Plan Settlement Types your customer needs: (MasterCard) | MC | MC & Skip List | | | | 311 | PaymentFees | No | If Value Skip Over | | | | 0 | Num |
| 363 | MCPlanSttmt1 | Multiple Choice | MC / BC | MC & Skip List | | | | 311 | PaymentFees | No | If Value Skip Over | | | | 0 | Num |
| 364 | MCPlanSttmt2 | Multiple Choice | MC Supermarket | MC & Skip List | | | | 311 | PaymentFees | No | If Value Skip Over | | | | 0 | Num |
| 365 | EndList26 | End List | End List | No GUI | | | | 311 | PaymentFees | No | If Value Skip Over | | | | 0 | Num |
| | | Check Box for ONE or | | MC & | | | | | | | If Not | | | | | |

*A-41*

| | | | | | | | | | | | | | |
|---|---|---|---|---|---|---|---|---|---|---|---|---|---|
| 366 | AutEdcMCFees1 | BOTH of the following for MC Plan Type: | Authorization | Skip List | | | 362 | MCPlanSttmt | Yes | Value Skip Over | | | 0 | Num |
| 367 | AutEdcMCFees2 | Multiple Choice | Electronic Data Capture | MC & Skip List | | | 362 | MCPlanSttmt | Yes | If Not Value Skip Over | | | 0 | Num |
| 368 | EndList27 | End List | End List | No GUI | | | 362 | MCPlanSttmt | Yes | If Not Value Skip Over | | | 0 | Num |
| 369 | MCFees1 | Per Item$ | Tap Keyboard, tap 123, enter the Amount of each Fee for the MC Plan, tap Done, tap Next. | Report with Help | | | 362 | MCPlanSttmt | Yes | If Not Value Skip Over | | | 26 | Text |
| 370 | MCFees2 | Gross Disc.% | Tap Keyboard, tap 123, enter the Amount of each Fee for the MC Plan, tap Done, tap Next. | Text Form | | | 362 | MCPlanSttmt | Yes | If Not Value Skip Over | | | 26 | Text |
| 371 | MCFees3 | Summary | Tap Keyboard, tap 123, enter the Amount of each Fee for the MC Plan, tap Done, tap Next. | Text Form | | | 362 | MCPlanSttmt | Yes | If Not Value Skip Over | | | 26 | Text |
| 372 | MCFees4 | Rebate Rate% | Tap Keyboard, tap 123, enter the Amount of each Fee for the MC Plan, tap Done, tap Next. | Text Form | | | 362 | MCPlanSttmt | Yes | If Not Value Skip Over | | | 26 | Text |
| 373 | EndList60 | End List | End List | End List for GUI 23 | | | 362 | MCPlanSttmt | Yes | If Not Value Skip Over | | | 0 | Num |
| 374 | AutEdcMcBcSttmt1 | Check Box for ONE or BOTH of the following for MC/BC Plan Type: | Authorization | MC & Skip List | | | 363 | MCPlanSttmt1 | Yes | If Not Value Skip Over | | | 0 | Num |
| 375 | AutEdcMcBcSttmt2 | Multiple Choice | Electronic Data Capture | MC & Skip | | | 363 | MCPlanSttmt1 | Yes | If Not Value Skip | | | | |

| | | | | | | | | | | | | | | |
|---|---|---|---|---|---|---|---|---|---|---|---|---|---|---|
| | | | List | | | | | | Over | | | | | |
| 376 | EndList28 | End List | End List | No GUI | | | 363 | MCPlanSttmt1 | Yes | If Not Value Skip Over | | | 0 | Num |
| 377 | MCBcSttmt1 | Per Item$ | Tap Keyboard, tap 123, enter the Amount of each Fee for the MC/BC Plan, tap Done, tap Next. | Report with Help | | | 363 | MCPlanSttmt1 | Yes | If Not Value Skip Over | | | 26 | Text |
| 378 | MCBcSttmt2 | Gross Disc.% | Tap Keyboard, tap 123, enter the Amount of each Fee for the MC/BC Plan, tap Done, tap Next. | Text Form | | | 363 | MCPlanSttmt1 | Yes | If Not Value Skip Over | | | 26 | Text |
| 379 | MCBcSttmt3 | Summary | Tap Keyboard, tap 123, enter the Amount of each Fee for the MC/BC Plan, tap Done, tap Next. | Text Form | | | 363 | MCPlanSttmt1 | Yes | If Not Value Skip Over | | | 26 | Text |
| 380 | MCBcSttmt4 | Rebate Rate% | Tap Keyboard, tap 123, enter the Amount of each Fee for the MC/BC Plan, tap Done, tap Next. | Text Form | | | 363 | MCPlanSttmt1 | Yes | If Not Value Skip Over | | | 26 | Text |
| 381 | EndList61 | End List | End List | End List for GUI 23 | | | 363 | MCPlanSttmt1 | Yes | If Not Value Skip Over | | | 0 | Num |
| 382 | AutEdcMCSuper1 | Check Box for ONE or BOTH of the following for MC SUPERMARKET Plan Type: | Authorization | MC & Skip List | | | 364 | MCPlanSttmt2 | Yes | If Not Value Skip Over | | | 0 | Num |
| 383 | AutEdcMCSuper2 | Multiple Choice | Electronic Data Capture | MC & Skip List | | | 364 | MCPlanSttmt2 | Yes | If Not Value Skip Over | | | 0 | Num |
| 384 | EndList29 | End List | End List | No GUI | | | 364 | MCPlanSttmt2 | Yes | If Not Value Skip Over | | | 0 | Num |
| | | | Tap Keyboard, tap 123, | | | | | | | If | | | | |

A-43

| | | | | | | | | | | | | | | |
|---|---|---|---|---|---|---|---|---|---|---|---|---|---|---|
| 385 | MCSuper1 | Per ItemS | enter the Amount of each Fee for the MC SUPERMARKET Plan, tap Done, tap Next. | Report with Help | | | | 364 | MCPlanSttmt2 | Yes | Not Value Skip Over | | | 26 | Text |
| 386 | MCSuper2 | Gross Disc.% | Tap Keyboard, tap 123, enter the Amount of each Fee for the MC SUPERMARKET Plan, tap Done, tap Next. | Text Form | | | | 364 | MCPlanSttmt2 | Yes | If Not Value Skip Over | | | 26 | Text |
| 387 | MCSuper3 | Summary | Tap Keyboard, tap 123, enter the Amount of each Fee for the MC SUPERMARKET Plan, tap Done, tap Next. | Text Form | | | | 364 | MCPlanSttmt2 | Yes | If Not Value Skip Over | | | 26 | Text |
| 388 | MCSuper4 | Rebate Rate% | Tap Keyboard, tap 123, enter the Amount of each Fee for the MC SUPERMARKET Plan, tap Done, tap Next. | Text Form | | | | 364 | MCPlanSttmt2 | Yes | If Not Value Skip Over | | | 26 | Text |
| 389 | EndList62 | End List | End List | End List for GUI 23 | | | | 364 | MCPlanSttmt2 | Yes | If Not Value Skip Over | | | 0 | Num |
| 390 | XXDebitNetwork | Choose the Debit Networks needed: | Money Station - 1_$0.06 | MC & Skip List | | | | 0 | | | | | | 0 | Num |
| 391 | DebNetWk1 | Multiple Choice. | Tyme - 2_$0.08 | MC & Skip List | | | | 0 | | | | | | 0 | Num |
| 392 | DebNetWk2 | Multiple Choice. | Cash Station - 3_$0.095 | MC & Skip List | | | | 0 | | | | | | 0 | Num |
| 393 | DebNetWk3 | Multiple Choice. | Accel - 4_$0.105 | MC & Skip List | | | | 0 | | | | | | 0 | Num |
| 394 | DebNetWk4 | Multiple Choice. | Maestro - 5_$0.125 | MC & Skip List | | | | 0 | | | | | | 0 | Num |
| 395 | DebNetWk5 | Multiple Choice. | Pulse - 6_$0.13 | MC & Skip | | | | 0 | | | | | | 0 | Num |

*A-44*

| | | | | List | | | | | | | | | | | | |
|---|---|---|---|---|---|---|---|---|---|---|---|---|---|---|---|---|
| 396 | DebNetWk6 | Multiple Choice. | MAC - 7_$0.13 | MC & Skip List | | | | 0 | | | | | | 0 | Num |
| 397 | DebNetWk7 | Multiple Choice | AFFN - 8_$0.14 | MC & Skip List | | | | 0 | | | | | | 0 | Num |
| 398 | DebNetWk8 | Multiple Choice | NYCE - 9_$0.04+45% | MC & Skip List | | | | 0 | | | | | | 0 | Num |
| 399 | DebNetWk9 | Multiple Choice. | Honor - 10_$0.05+4% | MC & Skip List | | | | 0 | | | | | | 0 | Num |
| 400 | DebNetWk10 | Multiple Choice. | Star - 11_$0.45+4% | MC & Skip List | | | | 0 | | | | | | 0 | Num |
| 401 | DebNetWk11 | Multiple Choice. | InterLink - 12_$0.045+0.45% | MC & Skip List | | | | 0 | | | | | | 0 | Num |
| 402 | DebNetWk12 | Multiple Choice | Other 1 | MC & Skip List | | | | 0 | | | | | | 0 | Num |
| 403 | DebNetWk13 | Multiple Choice. | Other 2 | MC & Skip List | | | | 0 | | | | | | 0 | Num |
| 404 | DebNetWk14 | Multiple Choice. | Other 3 | MC & Skip List | | | | 0 | | | | | | 0 | Num |
| 405 | EndList30 | End List | End List | No GUI | | | | | | | | | | 0 | Num |
| 406 | ChgSeq | Change the Sequence/Acq. Fees? | Tap Yes if you would like to change the Sequence and Acquirer Fees of the selected debit networks? | Yes/No Form | | | | | 456 | XXNonBankCards | No | If Value Skip | | | 0 | Num |
| 407 | Accel1 | Choose the Debit Network that you need to change the sequence and | Accel | MC & Skip | | | | 0 | | | | | | | 0 | Num |

*A-45*

| | | aquirer fees for: | | List | | | | | | | | | | |
|---|---|---|---|---|---|---|---|---|---|---|---|---|---|---|
| 408 | AFFN1 | Multiple Choice | AFFN | MC & Skip List | | | | 0 | | | | | 0 | Num |
| 409 | CashStation1 | Multiple Choice. | Cash Station | MC & Skip List | | | | 0 | | | | | 0 | Num |
| 410 | Honor1 | Multiple Choice. | Honor | MC & Skip List | | | | 0 | | | | | 0 | Num |
| 411 | InterLink1 | Multiple Choice. | InterLink | MC & Skip List | | | | 0 | | | | | 0 | Num |
| 412 | Maestro1 | Multiple Choice. | Maestro | MC & Skip List | | | | 0 | | | | | 0 | Num |
| 413 | MAC1 | Multiple Choice. | MAC | MC & Skip List | | | | 0 | | | | | 0 | Num |
| 414 | MoneyStation1 | Multiple Choice | Money Station | MC & Skip List | | | | 0 | | | | | 0 | Num |
| 415 | NYCE1 | Multiple Choice. | NYCE | MC & Skip List | | | | 0 | | | | | 0 | Num |
| 416 | Pulse1 | Multiple Choice. | Pulse | MC & Skip List | | | | 0 | | | | | 0 | Num |
| 417 | Star1 | Multiple Choice. | Star | MC & Skip List | | | | 0 | | | | | 0 | Num |
| 418 | Tyme1 | Multiple Choice. | Tyme | MC & Skip List | | | | 0 | | | | | 0 | Num |
| | | | | MC | | | | | | | | | | |

A-46

| 419 | Other1 | Multiple Choice | Other 1 | & Skip List | | | | 0 | | | | | 0 | Num |
|---|---|---|---|---|---|---|---|---|---|---|---|---|---|---|
| 420 | Other2 | Multiple Choice. | Other 2 | MC & Skip List | | | | 0 | | | | | 0 | Num |
| 421 | Other3 | Multiple Choice | Other 3 | MC & Skip List | | | | | | | | | 0 | Num |
| 422 | EndList31 | End List | End List | No GUI | | | | | | | | | 0 | Num |
| 423 | AccelSeq | 000000000, 999999999 | Please Tap Numeric Pad to enter the Accel Sequence: | Number Form | | | 407 | Accel1 | Yes | If Not Value Skip Over | | | 10 | ntext |
| 424 | AccelAcq | 000000000, 999999999 | Please Tap Numeric Pad to enter the Acquirer Fees for Accel: | Number Form | | | 407 | Accel1 | Yes | If Not Value Skip Over | | | 10 | ntext |
| 425 | AFFNSeq | 000000000, 999999999 | Please Tap Numeric Pad to enter the AFFN Sequence: | Number Form | | | 408 | AFFN1 | Yes | If Not Value Skip Over | | | 10 | ntext |
| 426 | AFFNAcq | 000000000, 999999999 | Please Tap Numeric Pad to enter the Acquirer Fees for AFFN: | Number Form | | | 408 | AFFN1 | Yes | If Not Value Skip Over | | | 10 | ntext |
| 427 | CashStatSeq | 000000000, 999999999 | Please Tap Numeric Pad to enter the Cash Station Sequence: | Number Form | | | 409 | CashStation1 | Yes | If Not Value Skip Over | | | 10 | ntext |
| 428 | CashStatAcq | 000000000, 999999999 | Please Tap Numeric Pad to enter the Acquirer Fees for Cash Station: | Number Form | | | 409 | CashStation1 | Yes | If Not Value Skip Over | | | 10 | ntext |
| 429 | HonorSeq | 000000000, 999999999 | Please Tap Numeric Pad to enter the Honor Sequence: | Number Form | | | 410 | Honor1 | Yes | If Not Value Skip | | | 10 | ntext |

*A-47*

| | | | | | | | | | | | | | | |
|---|---|---|---|---|---|---|---|---|---|---|---|---|---|---|
| | | | | | | | | | | Over | | | | |
| 430 | HonorAcq | 000000000, 999999999 | Please Tap Numeric Pad to enter the Acquirer Fees for Honor: | Number Form | | | | 410 | Honor1 | Yes | If Not Value Skip Over | | | 10 | ntext |
| 431 | InterlinkSeq | 000000000, 999999999 | Please Tap Numeric Pad to enter the Interlink Sequence: | Number Form | | | | 411 | InterLink1 | Yes | If Not Value Skip Over | | | 10 | ntext |
| 432 | InterlinkAcq | 000000000, 999999999 | Please Tap Numeric Pad to enter the Acquirer Fees for Interlink: | Number Form | | | | 411 | InterLink1 | Yes | If Not Value Skip Over | | | 10 | ntext |
| 433 | MaestroSeq | 000000000, 999999999 | Please Tap Numeric Pad to enter the Maestro Sequence: | Number Form | | | | 412 | Maestro1 | Yes | If Not Value Skip Over | | | 10 | ntext |
| 434 | MaestroAcq | 000000000, 999999999 | Please Tap Numeric Pad to enter the Acquirer Fees for Maestro: | Number Form | | | | 412 | Maestro1 | Yes | If Not Value Skip Over | | | 10 | ntext |
| 435 | MACSeq | 000000000, 999999999 | Please Tap Numeric Pad to enter the MAC Sequence: | Number Form | | | | 413 | MAC1 | Yes | If Not Value Skip Over | | | 10 | ntext |
| 436 | MACAcq | 000000000, 999999999 | Please Tap Numeric Pad to enter the Acquirer Fees for MAC: | Number Form | | | | 413 | MAC1 | Yes | If Not Value Skip Over | | | 10 | ntext |
| 437 | MoneyStatSeq | 000000000, 999999999 | Please Tap Numeric Pad to enter the Money Station Sequence: | Number Form | | | | 414 | MoneyStation1 | Yes | If Not Value Skip Over | | | 10 | ntext |
| 438 | MoneyStatAcq | 000000000, 999999999 | Please Tap Numeric Pad to enter the Acquirer Fees for Money Station: | Number Form | | | | 414 | MoneyStation1 | Yes | If Not Value Skip Over | | | 10 | ntext |
| | | | | | | | | | | | If | | | | |

*A-48*

| 439 | NYCESeq | 000000000, 999999999 | Please Tap Numeric Pad to enter the NYCE Sequence: | Number Form | | | 415 | NYCE1 | Yes | Not Value Skip Over | | | 10 | ntext |
|---|---|---|---|---|---|---|---|---|---|---|---|---|---|---|
| 440 | NYCEAcq | 000000000, 999999999 | Please Tap Numeric Pad to enter the Acquirer Fees for NYCE: | Number Form | | | 415 | NYCE1 | Yes | If Not Value Skip Over | | | 10 | ntext |
| 441 | PulseSeq | 000000000, 999999999 | Please Tap Numeric Pad to enter the Pulse Sequence: | Number Form | | | 416 | Pulse1 | Yes | If Not Value Skip Over | | | 10 | ntext |
| 442 | PulseAcq | 000000000, 999999999 | Please Tap Numeric Pad to enter the Acquirer Fees for Pulse: | Number Form | | | 416 | Pulse1 | Yes | If Not Value Skip Over | | | 10 | ntext |
| 443 | StarSeq | 000000000, 999999999 | Please Tap Numeric Pad to enter the Star Sequence: | Number Form | | | 417 | Star1 | Yes | If Not Value Skip Over | | | 10 | ntext |
| 444 | StarAcq | 000000000, 999999999 | Please Tap Numeric Pad to enter the Acquirer Fees for Star: | Number Form | | | 417 | Star1 | Yes | If Not Value Skip Over | | | 10 | ntext |
| 445 | TymeSeq | 000000000, 999999999 | Please Tap Numeric Pad to enter the Tyme Sequence: | Number Form | | | 418 | Tyme1 | Yes | If Not Value Skip Over | | | 10 | ntext |
| 446 | TymeAcq | 000000000, 999999999 | Please Tap Numeric Pad to enter the Acquirer Fees for Tyme. | Number Form | | | 418 | Tyme1 | Yes | If Not Value Skip Over | | | 10 | ntext |
| 447 | Oth1DebitNet | Other Debit Network: | Tap Keyboard, enter the other Debit Network, tap Done, tap Next. | Text Form | | | 419 | Other1 | Yes | If Not Value Skip Over | | | 26 | Text |
| 448 | Other1Seq | 000000000, 999999999 | Please Tap Numeric Pad to Number | | | | 419 | Other1 | Yes | If Not Value | | | 10 | ntext |

| | | | enter the Other Sequence: | Form | | | | | | Skip Over | | | | |
|---|---|---|---|---|---|---|---|---|---|---|---|---|---|---|
| 449 | Other1Acq | 000000000, 999999999 | Please Tap Numeric Pad to enter the Acquirer Fees for Other: | Number Form | | | 419 | Other1 | Yes | If Not Value Skip Over | | | 10 | ntext |
| 450 | Oth2DebitNet | Other Debit Network: | Tap Keyboard, enter the Other Debit Network, tap Done, tap Next. | Text Form | | | 420 | Other2 | Yes | If Not Value Skip Over | | | 75 | Text |
| 451 | Other2Seq | 000000000, 999999999 | Please Tap Numeric Pad to enter the Other Sequence: | Number Form | | | 420 | Other2 | Yes | If Not Value Skip Over | | | 10 | ntext |
| 452 | Other2Acq | 000000000, 999999999 | Please Tap Numeric Pad to enter the Acquirer Fees for Other: | Number Form | | | 420 | Other2 | Yes | If Not Value Skip Over | | | 10 | ntext |
| 453 | Oth3DebitNet | Other Debit Network: | Tap Keyboard, enter the Other Debit Network, tap Done, tap Next. | Text Form | | | 421 | Other3 | Yes | If Not Value Skip Over | | | 75 | Text |
| 454 | Other3Seq | 000000000, 999999999 | Please Tap Numeric Pad to enter the Other Sequence: | Number Form | | | 421 | Other3 | Yes | If Not Value Skip Over | | | 10 | ntext |
| 455 | Other3Acq | 000000000, 999999999 | Please Tap Numeric Pad to enter the Acquirer Fees for Other: | Number Form | | | 421 | Other3 | Yes | If Not Value Skip Over | | | 10 | ntext |
| 456 | XXNonBankCards | Check Services? | Tap Yes if you need the Check Services. | Yes/No Form | | | 462 | Amex | No | If Value Skip | | | 0 | Num |
| 457 | Chck | Choose the Items that you need: | NDC Check | MC & Skip List | | | | | | | | | 0 | Num |
| 458 | Chck1 | Multiple Choice | Other Check | MC & Skip | | | | | | | | | 0 | Num |

| | | | | List | | | | | | | | | | | |
|---|---|---|---|---|---|---|---|---|---|---|---|---|---|---|---|
| 459 | EndList32 | End List | End List | No GUI | | | | | | | | | | 0 | Num |
| 460 | NDCPerItem | 000000000, 999999999 | Please Tap Numeric Pad to enter the NDC Check per Item Amount: | Number Form | | | 457 | Chck | No | If Value Skip Over | | | | 10 | ntext |
| 461 | OtherPerItem | 000000000, 999999999 | Please Tap Numeric Pad to enter the Other Check per Item Amount: | Number Form | | | 458 | Chck1 | No | If Value Skip Over | | | | 10 | ntext |
| 462 | Amex | Pick Non Bank Card with Settlement your Customers needs: (Plan Type) | AMEX | MC & Skip List | | | | | | | | | | 0 | Num |
| 463 | Discover | Multiple Choice. | Discover | MC & Skip List | | | | | | | | | | 0 | Num |
| 464 | JCB | Multiple Choice. | JCB | MC & Skip List | | | | | | | | | | 0 | Num |
| 465 | DinerClub1 | Multiple Choice. | Diners Club | MC & Skip List | | | | | | | | | | 0 | Num |
| 466 | NoAnsbnkcd | Multiple choice | None of the above | MC & Skip List | | | | | | | | | | 0 | Num |
| 467 | EndList33 | End List | End List | No GUI | | | | | | | | | | 0 | Num |
| 468 | AutEdcAmex | Check Box for ONE or BOTH of the following for AMEX: | Authorization | MC & Skip List | | | 462 | Amex | Yes | If Not Value Skip Over | | | | 0 | Num |
| 469 | AutEdcAmex1 | Multiple Choice | Electronic Data Capture | MC & Skip List | | | 462 | Amex | Yes | If Not Value Skip Over | | | | 0 | Num |
| 470 | EndList34 | End List | End List | No GUI | | | 462 | Amex | Yes | If Not Value | | | | 0 | Num |

A-51

| | | | | | | | | | | | | | | |
|---|---|---|---|---|---|---|---|---|---|---|---|---|---|---|
| | | | | | | | | | Skip Over | | | | | |
| 471 | ReversePIP | Type of PIP for AMEX: (If Customers are using Amex Equipment, Choose Straight PIP; If Customers are NOT using Amex Equipment, Choose Reverse PIP) | Reverse PIP | Single MC | | | | 462 | Amex | Yes | If Not Value Skip Over | | 26 | Num |
| 472 | StraightPIP | Multiple Choice. | Straight PIP | MC & Skip List | | | | 462 | Amex | Yes | If Not Value Skip Over | | 0 | Num |
| 473 | EndList35 | End List. | End List | No GUI | | | | 462 | Amex | Yes | If Not Value Skip Over | | 0 | Num |
| 474 | AmexPerItem | 000000000, 999999999 | Please Tap Numeric Pad to enter the AMEX per Item Amount: | Number Form | | | | 462 | Amex | Yes | If Not Value Skip Over | | 10 | ntext |
| 475 | AmexMerctNo1 | AMEX Plan Type: | Merchant Number Applied For | Single MC | | | | 462 | Amex | Yes | If Not Value Skip Over | | 26 | Num |
| 476 | AmexMerctNo2 | Multiple Choice | Merchant No. Available | MC & Skip List | | | | 462 | Amex | Yes | If Not Value Skip Over | | 0 | Num |
| 477 | EndList36 | End List | End List | No GUI | | | | 462 | Amex | Yes | If Not Value Skip Over | | 0 | Num |
| 478 | AmexMerctSeNo | 000000000000000, 999999999999999 | Please Tap Numeric Pad to enter the AMEX Merchant (SE No.): | Number Form | | | | 475 | AmexMerctNo1 | No | If Not Value Skip Over | | 16 | ntext |
| 479 | AmexTidNo | 0000000000000000, | Please Tap Numeric Pad to enter the AMEX TID | Number | | | | 476 | AmexMerctNo2 | No | If Not Value | | 17 | ntext |

A-52

| | | 9999999999999999 | Number. | Form | | | | | Skip Over | | | | | |
|---|---|---|---|---|---|---|---|---|---|---|---|---|---|---|
| 480 | AutEdcDiscvr1 | Check Box for ONE or BOTH of the following for Discover: | Authorization | MC & Skip List | | | | 463 | Discover | Yes | If Not Value Skip Over | | | 0 | Num |
| 481 | AutEdcDiscvr2 | Multiple Choice | Electronic Data Capture | MC & Skip List | | | | 463 | Discover | Yes | If Not Value Skip Over | | | 0 | Num |
| 482 | EndList37 | End List | End List | No GUI | | | | 463 | Discover | Yes | If Not Value Skip Over | | | 0 | Num |
| 483 | DiscvrPerItem | 000000000, 999999999 | Please Tap Numeric Pad to enter the Discover per Item Amount: | Number Form | | | | 463 | Discover | Yes | If Not Value Skip Over | | | 10 | ntext |
| 484 | DiscvrMerctNo1 | Discover Plan Type: | Merchant Number Applied For | Single MC | | | | 463 | Discover | Yes | If Not Value Skip Over | | | 26 | Num |
| 485 | DiscvrMerctNo2 | Multiple Choice | Merchant No. Available | MC & Skip List | | | | 463 | Discover | Yes | If Not Value Skip Over | | | 0 | Num |
| 486 | EndList38 | End List | End List | No GUI | | | | 463 | Discover | Yes | If Not Value Skip Over | | | 0 | Num |
| 487 | DiscvrMerctNo | 000000000000000, 999999999999999 | Please Tap Numeric Pad to enter the Discover Merchant Number: | Number Form | | | | 484 | DiscvrMerctNo1 | No | If Not Value Skip Over | | | 16 | ntext |
| 488 | AutEdcJCB1 | Check Box for ONE or BOTH of the following for JCB: | Authorization | MC & Skip List | | | | 464 | JCB | Yes | If Not Value Skip Over | | | 0 | Num |

A-53

| 489 | AutEdcJCB2 | Multiple Choice | Electronic Data Capture | MC & Skip List | | | 464 | JCB | Yes | If Not Value Skip Over | | | 0 | Num |
| 490 | EndList39 | End List | End List | No GUI | | | 464 | JCB | Yes | If Not Value Skip Over | | | 0 | Num |
| 491 | JCBPerItem | 0000000000, 9999999999 | Please Tap Numeric Pad to enter the JCB Per Item Amount: | Number Form | | | 464 | JCB | Yes | If Not Value Skip Over | | | 11 | ntext |
| 492 | JCBGrosDis | 0000000000, 9999999999 | Please Tap Numeric Pad to enter the Gross Discount % for the JCB Plan: | Number Form | | | 464 | JCB | Yes | If Not Value Skip Over | | | 11 | ntext |
| 493 | AutEdcDinerCb1 | Check Box for ONE or BOTH of the following for Diner's Club: | Authorization | MC & Skip List | | | 465 | DinerClub1 | Yes | If Not Value Skip Over | | | 0 | Num |
| 494 | AutEdcDinerCb2 | Multiple Choice | Electronic Data Capture | MC & Skip List | | | 465 | DinerClub1 | Yes | If Not Value Skip Over | | | 0 | Num |
| 495 | EndList40 | End List | End List | No GUI | | | 465 | DinerClub1 | Yes | If Not Value Skip Over | | | 0 | Num |
| 496 | DinerPerItem | 0000000000, 9999999999 | Please Tap Numeric Pad to enter the Diner's Club Per Item Amount: | Number Form | | | 465 | DinerClub1 | Yes | If Not Value Skip Over | | | 11 | ntext |
| 497 | DinerGrosDis | 0000000000, 9999999999 | Please Tap Numeric Pad to enter the Gross Discount % for the Diner's Club Plan: | Number Form | | | 465 | DinerClub1 | Yes | If Not Value Skip Over | | | 11 | ntext |
| | | | | | | | | | | If Not | | | | |

| 498 | DinerMerctNo1 | Diner's Club Plan Type: | Merchant Number Applied For | Single MC | | | 465 | DinerClub1 | Yes | Value Skip Over | | | 26 | Num |
|---|---|---|---|---|---|---|---|---|---|---|---|---|---|---|
| 499 | DinerMerctNo2 | Multiple Choice | Merchant No. Available | MC & Skip List | | | 465 | DinerClub1 | Yes | If Not Value Skip Over | | | 0 | Num |
| 500 | EndList41 | End List | End List | No GUI | | | 465 | DinerClub1 | Yes | If Not Value Skip Over | | | 0 | Num |
| 501 | DinerMerctNo | 000000000000000, 999999999999999 | Please Tap Numeric Pad to enter the Diner's Club Merchant Number: | Number Form | | | 498 | DinerMerctNo1 | No | If Not Value Skip Over | | | 16 | ntext |
| 502 | XXOtherFees | Check all other fees that apply for this customer: | Non-Refundable Application Fee | MC & Skip List | | | | | | | | | 0 | Num |
| 503 | OtherFees2 | Multiple Choice | Annual Membership Fee | MC & Skip List | | | | | | | | | 0 | Num |
| 504 | OtherFees3 | Multiple Choice | Monthly Fee Membership | MC & Skip List | | | | | | | | | 0 | Num |
| 505 | OtherFees4 | Multiple Choice | Monthly Fee Statement | MC & Skip List | | | | | | | | | 0 | Num |
| 506 | OtherFees5 | Multiple Choice | Minimum Monthly Discount | MC & Skip List | | | | | | | | | 0 | Num |
| 507 | OtherFees6 | Multiple Choice | Minimum Monthly Debit Fee | MC & Skip List | | | | | | | | - | 0 | Num |
| 508 | OtherFees8 | Multiple Choice | Training | MC & Skip List | | | | | | | | | 0 | Num |

A-55

| | | | | | | | | | | | | |
|---|---|---|---|---|---|---|---|---|---|---|---|---|
| 509 | OtherFees9 | Multiple Choice | Starter Kit Economy | MC & Skip List | | | | | | | 0 | Num |
| 510 | OtherFees10 | Multiple Choice | Starter Kit Standard | MC & Skip List | | | | | | | 0 | Num |
| 511 | OtherFees11 | Multiple Choice | Starter Kit Value | MC & Skip List | | | | | | | 0 | Num |
| 512 | OtherFees12 | Multiple Choice | Installation/Programming Fee | MC & Skip List | | | | | | | 0 | Num |
| 513 | OtherFees13 | Multiple Choice | POS Warranty & Help Desk Fee | MC & Skip List | | | | | | | 0 | Num |
| 514 | OtherFees14 | Multiple Choice | Help Desk Fee Only | MC & Skip List | | | | | | | 0 | Num |
| 515 | OtherFees15 | Multiple Choice | Debit Transaction Fee | MC & Skip List | | | | | | | 0 | Num |
| 516 | OtherFees1 | Multiple Choice | POS Supplies | MC & Skip List | | | | | | | 0 | Num |
| 517 | OtherFees16 | Multiple Choice | Other 1 | MC & Skip List | | | | | | | 0 | Num |
| 518 | OtherFees17 | Multiple Choice | Other 2 | MC & Skip List | | | | | | | 0 | Num |
| 519 | OtherFees7 | Multiple Choice | None on the list | MC & Skip List | | | 541 | XXStandardFee | Yes | If Value Skip | 0 | Num |
| 520 | EndList42 | End List | End List | No GUI | | | | | | | 0 | Num |

*A-56*

| 521 | NonRefundAmt | 0000000000, 9999999999 | Please Tap Numeric Pad to enter the Non-Refundable Application Fee Amount: | Number Form | | | 502 | XXOtherFees | Yes | If Not Value Skip Over | | | 11 | ntext |
|---|---|---|---|---|---|---|---|---|---|---|---|---|---|---|
| 522 | AnnMemberAmt | 0000000000, 9999999999 | Please Tap Numeric Pad to enter the Annual Membership Fee Amount: | Number Form | | | 503 | OtherFees2 | Yes | If Not Value Skip Over | | | 11 | ntext |
| 523 | BillingCycle | Billing Cycle? | Tap Keyboard, enter the Billing Cycle, tap Done, tap Next. | Text Form | | | 503 | OtherFees2 | Yes | If Not Value Skip Over | | | 30 | Text |
| 524 | MonthMemberAmt | 0000000000, 9999999999 | Please Tap Numeric Pad to enter the Monthly Fee Membership Amount: | Number Form | | | 504 | OtherFees3 | Yes | If Not Value Skip Over | | | 11 | ntext |
| 525 | MonthStatmtAmt | 0000000000, 9999999999 | Please Tap Numeric Pad to enter the Monthly Fee Statement Amount: | Number Form | | | 505 | OtherFees4 | Yes | If Not Value Skip Over | | | 11 | ntext |
| 526 | MinMonDiscAmt | 0000000000, 9999999999 | Please Tap Numeric Pad to enter the Minimum Monthly Discount Amount: | Number Form | | | 506 | OtherFees5 | Yes | If Not Value Skip Over | | | 11 | ntext |
| 527 | MinDebitAmt | 0000000000, 9999999999 | Please Tap Numeric Pad to enter the Minimum Monthly Debit Fee Amount: | Number Form | | | 507 | OtherFees6 | Yes | If Not Value Skip Over | | | 11 | ntext |
| 528 | TrainAmt | 0000000000, 9999999999 | Please Tap Numeric Pad to enter the Training Amount: | Number Form | | | 508 | OtherFees8 | Yes | If Not Value Skip Over | | | 11 | ntext |
| 529 | StartKitEconAmt | 0000000000, 9999999999 | Please Tap Numeric Pad to enter the Starter Kit Economy Amount: | Number Form | | | 509 | OtherFees9 | Yes | If Not Value Skip Over | | | 11 | ntext |
| | | | Please Tap Numeric Pad to | | | | | | | If Not | | | | |

A-57

| | | | | | | | | | | | | | |
|---|---|---|---|---|---|---|---|---|---|---|---|---|---|
| 530 | StartKitStaddAmt | 0000000000, 9999999999 | enter the Starter Kit Standard Amount: | Number Form | | | | 510 | OtherFees10 | Yes | Value Skip Over | | 11 | ntext |
| 531 | StartKitValAmt | 0000000000, 9999999999 | Please Tap Numeric Pad to enter the Starter Kit Value Amount: | Number Form | | | | 511 | OtherFees11 | Yes | If Not Value Skip Over | | 11 | ntext |
| 532 | InstallProgAmt | 0000000000, 9999999999 | Please Tap Numeric Pad to enter the Installation/Programming Fee Amount: | Number Form | | | | 512 | OtherFees12 | Yes | If Not Value Skip Over | | 11 | ntext |
| 533 | POSWarAmt | 0000000000, 9999999999 | Please Tap Numeric Pad to enter the POS Warranty (Maintenance/Replacement) and Help Desk Fee (Per Piece of Equipment) Amount: | Number Form | | | | 513 | OtherFees13 | Yes | If Not Value Skip Over | | 11 | ntext |
| 534 | HelpDeskAmt | 0000000000, 9999999999 | Please Tap Numeric Pad to enter the Help Desk Fee Only Amount: | Number Form | | | | 514 | OtherFees14 | Yes | If Not Value Skip Over | | 11 | ntext |
| 535 | DebTransAmt | 0000000000, 9999999999 | Please Tap Numeric Pad to enter the Debit Transaction Fee Amount: | Number Form | | | | 515 | OtherFees15 | Yes | If Not Value Skip Over | | 11 | ntext |
| 536 | PosSupAmt | 0000000000, 9999999999 | Please Tap Numeric Pad to enter the POS Supplies Amount: | Number Form | | | | 516 | OtherFees1 | Yes | If Not Value Skip Over | | 11 | ntext |
| 537 | Other1Txt | What is the Other 1? | Tap Keyboard, tap 123, enter the Other 1, tap Done, tap Next. | Text Form | | | | 517 | OtherFees16 | Yes | If Not Value Skip Over | | 26 | Text |
| 538 | Other1Amt | 0000000000, 9999999999 | Please Tap Numeric Pad to enter the Other 1 Amount: | Number Form | | | | 517 | OtherFees16 | Yes | If Not Value Skip Over | | 11 | ntext |
| 539 | Other2Txt | What is the Other 2? | Tap Keyboard, tap 123, enter the Other 2, tap Done, | Text | | | | 518 | OtherFees17 | Yes | If Not Value | | 26 | Text |

*A-58*

| | | | | | | | | | | | | | |
|---|---|---|---|---|---|---|---|---|---|---|---|---|---|
| | | tap Next. | Form | | | | | | Skip Over | | | | |
| 540 | Other2Amt | 0000000000, 9999999999 | Please Tap Numeric Pad to enter the Other 2 Amount: | Number Form | | | 518 | OtherFees17 | Yes | If Not Value Skip Over | | 11 | ntext |
| 541 | XXStandardFee | (Select the Items that you want to change) These are the Standard Fees that will apply to your customer: | Chargeback Fee - $15.00 | MC & Skip List | | | | | | | | 0 | Num |
| 542 | NonSuffFund2 | Multiple Choice | Non-Sufficient Funds - $15.00 | MC & Skip List | | | | | | | | 0 | Num |
| 543 | AnnPostShipFee | Multiple Choice | Annual Post & Ship - $50.00 | MC & Skip List | | | | | | | | 0 | Num |
| 544 | VoiceAVS | Multiple Choice | Voice AVS Fee - $1.25 | MC & Skip List | | | | | | | | 0 | Num |
| 545 | VoiceAuthFee | Multiple Choice | Voice Authorization Fee - $0.60 | MC & Skip List | | | | | | | | 0 | Num |
| 546 | NoFee | Multiple Choice | None on the list | MC & Skip List | | | 553 | XXSiteSurvey | Yes | If Value Skip | | 0 | Num |
| 547 | EndList43 | End List | End List | No GUI | | | | | | | | 0 | Num |
| 548 | ChargebackAmt | 0000000000, 9999999999 | Please Tap Numeric Pad to enter the Chargeback Fee Amount: | Number Form | | | 541 | XXStandardFee | Yes | If Not Value Skip Over | | 11 | ntext |
| 549 | NonSuffFundAmt | 0000000000, 9999999999 | Please Tap Numeric Pad to enter the Non-Sufficient Funds Amount: | Number Form | | | 542 | NonSuffFund2 | Yes | If Not Value Skip Over | | 11 | ntext |
| | | 0000000000, | Please Tap Numeric Pad to | Number | | | | | | If Not | | | |

A-59

| | | | | | | | | | | | | | |
|---|---|---|---|---|---|---|---|---|---|---|---|---|---|
| 550 | AnnPostAmt | 9999999999 | enter the Annual Postage and Shipping Fee Amount: | Form | | | | 543 | AnnPostShipFee | Yes | Value Skip Over | | 11 | ntext |
| 551 | VoiceAvsAmt | 0000000000, 9999999999 | Please Tap Numeric Pad to enter the Voice AVS Fee Amount: | Number Form | | | | 544 | VoiceAVS | Yes | If Not Value Skip Over | | 11 | ntext |
| 552 | VoiceAuthAmt | 0000000000, 9999999999 | Please Tap Numeric Pad to enter the Voice Authorization Fee Amount: | Number Form | | | | 545 | VoiceAuthFee | Yes | If Not Value Skip Over | | 11 | ntext |
| 553 | XXSiteSurvey | Merchant Location: | Store Front | Single MC | | | | | | | | | 26 | Num |
| 554 | OfficeBuilding | Multiple Chocie. | Office Building | MC & Skip List | | | | | | | | | 0 | Num |
| 555 | Warehouse | Multiple Chocie. | Warehouse | MC & Skip List | | | | | | | | | 0 | Num |
| 556 | Residence | Multiple Choice. | Residence | MC & Skip List | | | | | | | | | 0 | Num |
| 557 | Internet | Multiple Choice. | Internet | MC & Skip List | | | | | | | | | 0 | Num |
| 558 | Other | Multiple Choice. | Other | MC & Skip List | | | | | | | | | 0 | Num |
| 559 | EndList44 | End List | End List | No GUI | | | | | | | | | 0 | Num |
| 560 | EOther | Enter the Other: | Tap Keyboard, enter the Other, tap Done, tap Next. | Text Form | | | | 558 | Other | No | If Value Skip Over | | 255 | Text |
| 561 | Owns | The Merchant: | Owns | Single MC | | | | | | | | | 26 | Num |
| 562 | LeaseBusinessPremi | Multiple Choice. | Leases the business premises | MC & Skip | | | | | | | | | 0 | Num |

A-60

| | | | | | | | | | | | | | |
|---|---|---|---|---|---|---|---|---|---|---|---|---|---|
| 563 | EndList45 | End List | End List | List No GUI | | | | | | | | 0 | Num |
| 564 | LandlordName | Enter the Landlord Name: | Tap Keyboard, enter the Landlord Name, tap Done, tap Next. | Text Form | | | 562 | LeaseBusinessPremi | Yes | If Not Value Skip Over | | 55 | Text |
| 565 | ELandlordTelep | 000000000000, 999999999999 | Please Tap Numeric Pad to enter the Landlord Telephone Number: | Number Form | | | 562 | LeaseBusinessPremi | Yes | If Not Value Skip Over | | 12 | ntext |
| 566 | Inspectedby | Inspected by: | Tap Keyboard, enter Inspected by who, tap Done, tap Next. | Text Form | | | | | | | | 50 | Text |
| 567 | DateInspected | Date Inspected: | Tap Select Date, select Year, Month and Date of Inspected, tap Next. | Date Form | | | | | | | | 0 | Date |
| 568 | XXHierarchy | 0000, 9999 | Please Tap Numeric Pad to enter the SIC Code: | Number Form | | | | | | | | 5 | ntext |
| 569 | BankNo | Bank No.: | Tap Keyboard, tap 123, enter the above items by placing the cursor on the line, tap Done, tap Next. | Report with Help | | | | | | | | 5 | Text |
| 570 | CompNo | Company No.: | Tap Keyboard, tap 123, enter the above items by placing the cursor on the line, tap Done, tap Next. | Text Form | | | | | | | | 7 | Text |
| 571 | ICANo | ICA No.: | Tap Keyboard, tap 123, enter the above items by placing the cursor on the line, tap Done, tap Next. | Text Form | | | | | | | | 7 | Text |
| 572 | BranchNo | Branch No : | Tap Keyboard, tap 123, enter the above items by placing the cursor on the line, tap Done, tap Next. | Text Form | | | | | | | | 7 | Text |
| 573 | EndList65 | End List | End List | End List for GUI 23 | | | | | | | | 0 | Num |
| 574 | StoreNo | Store No.: | Tap Keyboard, tap 123, enter the above items by placing the cursor on the line, tap Done, tap Next. | Report with Help | | | | | | | | 7 | Text |

*A-61*

| 575 | Region | Region: | Tap Keyboard, tap 123, enter the above items by placing the cursor on the line, tap Done, tap Next | Text Form | | | | | | | | | | 3 | Text |
|---|---|---|---|---|---|---|---|---|---|---|---|---|---|---|---|---|
| 576 | PRIN | PRIN: | Tap Keyboard, tap 123, enter the above items by placing the cursor on the line, tap Done, tap Next. | Text Form | | | | | | | | | | 4 | Text |
| 577 | Assoc | Assoc: | Tap Keyboard, tap 123, enter the above items by placing the cursor on the line, tap Done, tap Next. | Text Form | | | 0 | | | | | | | 4 | Text |
| 578 | Chain1 | Chain: | Tap Keyboard, tap 123, enter the above items by placing the cursor on the line, tap Done, tap Next | Text Form | | | | | | | | | | 4 | Text |
| 579 | EndList66 | End List | End List | End List for GUI 23 | | | | | | | | | | 0 | Num |
| 580 | VoidedCheck | Voided Check? | Tap Yes if you have a copy of a voided check. | Yes/No Form | | | | | | | | | | 0 | Num |
| 581 | Commt | Do you have any Comments? | Tap Yes if you have any Comments. | Yes/No Form | | | 583 | CompleteApp | No | If Value Skip | | | | 0 | Num |
| 582 | CommtTxt | Enter the Comments: | Tap Keyboard, enter the Comments, tap Done, tap Next. | Text Form | | | 581 | Commt | No | If Value Skip Over | | | 255 | Text |
| 583 | CompleteApp | Complete Application? | Tap Yes to acknowledge that you MUST Complete the following survey Equipment Calculator to make a complete application. | Yes/No Form | | | | | | | | | | 0 | Num |

Confidential Property of Numoda Corporation Engineering Department

| | | Date: | 10/08/2001 | | | | |
|---|---|---|---|---|---|---|---|
| | | Title: | Equipment Calculator | Reviewed by: | | | |
| | | Name: | S00001357_V3 | Application: | | Date: | |
| | | SurveyID: | 1496 | QA: | | Date: | |
| | | Questions to copy: | 10 | Management: | | Date: | |
| | | Next Survey: | 0 -- No Survey | Customer: | | Date: | |
| Application Listing | | How to Sync: | Sync by Group | | | | |
| | | Type: | Survey | | | | |

| FldID | Field Name | Prompt | Help | GUI | Score | Score Method | Score Value | Skip | Skip Relative | Skip Value | Skip Method | Group | Print On Repo |
|---|---|---|---|---|---|---|---|---|---|---|---|---|---|
| 0 | Complete | Complete | Complete | No GUI | | | | | | | | | Yes |
| 1 | XXFeaturesCalculator | Just using Features Calculator? | If you tap Yes you will not able to enter the Customer Name but will go right to the Features Calculator | Yes/No Form | | | | 20 | XXFeaturebyBusiness | Yes | If Value Skip | | |
| 2 | XXDBAInfo | *DBA Name: | Tap Keyboard, enter the Required Doing Business as (DBA) Name, tap Done, tap Next. | Text Form | | | | | | | | | |
| 3 | DBAAddress | *Address 1 DBA Location: | Tap Keyboard, tap 123, enter the Required Address of the 1 DBA Location, tap Done, tap Next. | Text Form | | | | | | | | | |
| 4 | DBACity | *City: | Tap Keyboard, enter the Required City, tap Done, tap Next. | Text Form | | | | | | | | | |
| 5 | DBAState | *State: | Tap Keyboard, tap 123, enter the above items by placing the cursor on the line, tap Done, tap Next. | Report with Help | | | | | | | | | |
| 6 | DBAZip | *Zip Code: | Tap Keyboard, tap 123, enter the above items by placing the cursor on the line, tap Done, tap Next. | Text Form | | | | | | | | | |
| 7 | DBACountry | *Country: | Tap Keyboard, tap 123, enter the above items by placing the cursor on the line, tap Done, tap Next. | Text Form | | | | | | | | | |
| 8 | DBAPhone | *DBA Phone#: | Tap Keyboard, tap 123, enter above items by placing cursor on line, tap Done, tap Next | Text Form | | | | | | | | | |

A-63

| | | | | | | | | | | | |
|---|---|---|---|---|---|---|---|---|---|---|---|
| 9 | DBAFax | DBA Fax#: | Tap Keyboard, tap 123, enter above items by placing cursor on line, tap Done, tap Next. | Text Form | | | | | | | |
| 10 | DBAContact | *Contact: | Tap Keyboard, tap 123, enter above items by placing cursor on line, tap Done, tap Next. | Text Form | | | | | | | |
| 11 | EndList | EndList | EndList | End List for GUI 23 | | | | | | | |
| 12 | TermIDNumb | 000000000000000, 999999999999999 | Tap Numeric Pad to enter Terminal ID Number or Store Number. | Number Form | | | 0 | | | | |
| 13 | XXHostEDC | Pick the one that applies to customer. | Host EDC | MC & Skip List | | | 0 | | | | |
| 14 | TermEDC | Multiple Choice | Terminal EDC | MC & Skip List | | | | | | | |
| 15 | BatchData | Multiple Choice | Batch Data Transmission | MC & Skip List | | | | | | | |
| 16 | VAR1 | Multiple Choice | VAR | MC & Skip List | | | | | | | |
| 17 | EndList1 | End List | End List | No GUI | | | | | | | |
| 18 | VARName | Enter the VAR Name: | Enter VAR name. | Text Form | | 16 | VAR1 | | Yes | If Not Value Skip Over | |
| 19 | VARWelKit | VAR Welcome Kit? | Tap Yes if a VAR welcome kit is needed. | Yes/No Form | | 16 | VAR1 | | Yes | If Not Value Skip Over | |
| 20 | XXFeaturebyBusiness | Pick type of business: | Retail Business | Single MC | | | 0 | | | | |

*A-64*

| | | | | | | | | | | | |
|---|---|---|---|---|---|---|---|---|---|---|---|
| 21 | BusRestaur2 | Multiple Choice | Restaurant Business | MC & Skip List | | | 123 | XXRestaurFeatCode | Yes | If Value Skip | |
| 22 | BusLodging2 | Multiple Choice | Lodging Business | MC & Skip List | | | 228 | XXLodgingFeatCode | Yes | If Value Skip | |
| 23 | EndList34 | EndList | EndList | No GUI | | | | | | | |
| 24 | XXRetailFeatCode | Please Choose the Retail Features Code: | Retail_Tranz_East | Single MC | | | | | | | |
| 25 | RetailFeatCode1 | Multiple Choice | Retail_Tranz_Central | MC & Skip List | | | 52 | XXRetailTranzC | Yes | If Value Skip | |
| 26 | RetailFeatCode2 | Multiple Choice | Retail_Omni_East | MC & Skip List | | | 71 | XXRetailOmniE | Yes | If Value Skip | |
| 27 | RetailFeatCode3 | Multiple Choice | Retail_Hypercom_East | MC & Skip List | | | 86 | XXRetailHypcomE | Yes | If Value Skip | |
| 28 | RetailFeatCode4 | Multiple Choice | Retail_Hypercom_Central | MC & Skip List | | | 106 | XXRetailHypcomC | Yes | If Value Skip | |
| 29 | EndList2 | End List | End List | No GUI | | | | | | | |
| 30 | XXRetailTranzEast | Retail Tranz East Features Set, pick "This List Covers My Needs" or if you require other Features, Select Previous & Pick another Features Set.) | List of Choices. | List Form | | | 0 | | | | |
| 31 | ParmtrAmtCeil | Amt Ceiling: | Enter Feature Parameter. (Setup Options: 19 - Amount Ceiling ; 22 - Optional Data Fields ; 23 - Cust Discretionary Data ; 24 - Product Code) | Report with Help | | | 0 | | | | |
| 32 | ParmtrOptData | Opt Data Fld: | Enter Feature Parameter. (Setup Options: 19 - Amount Ceiling ; 22 - | Text | | | 0 | | | | |

A-65

| | | | | | | | | | | | | |
|---|---|---|---|---|---|---|---|---|---|---|---|---|
| | | | Optional Data Fields ; 23 - Cust Discretionary Data ; 24 - Product Code) | Form | | | | | | | | |
| 33 | ParmtrCusDisc | Cust Discret Dt: | Enter Feature Parameter. (Setup Options: 19 - Amount Ceiling ; 22 - Optional Data Fields ; 23 - Cust Discretionary Data ; 24 - Product Code) | Text Form | | | | 0 | | | | |
| 34 | ParmtrProdCode | Prod Code: | Enter Feature Parameter. (Setup Options: 19 - Amount Ceiling ; 22 - Optional Data Fields ; 23 - Cust Discretionary Data ; 24 - Product Code) | Text Form | | | | 0 | | | | |
| 35 | EndList4 | End List | End List | End List for GUI 23 | | | | 0 | | | | |
| 36 | ParmtrClerkPmt | Clerk Prompt: | Enter Feature Parameter. (Setup Options: 25 - Clerk Prompt ; 26 - Clerk ID Table ; 28 - AVS / MOTO) | Report with Help | | | | 0 | | | | |
| 37 | ParmtrClerkID | Clerk ID Table: | Enter Feature Parameter. (Setup Options: 25 - Clerk Prompt ; 26 - Clerk ID Table ; 28 - AVS / MOTO) | Text Form | | | | 0 | | | | |
| 38 | ParmtrAvsMoto | AVS/MOTO: | Enter Feature Parameter. (Setup Options: 25 - Clerk Prompt ; 26 - Clerk ID Table ; 28 - AVS / MOTO) | Text Form | | | | 0 | | | | |
| 39 | EndList3 | End List | End List | End List for GUI 23 | | | | 0 | | | | |
| 40 | RetTrzEastTPC | Choose One Solutions for Feature Set with Terminal / Printer / Capacity: | Tranz330 / Tranz1 / 125 | Single MC | | | | | | | | |
| 41 | RetTrzEastTPC1 | Multiple Choice | Tranz 380 / Tranz1 / 300 | MC & Skip List | | | | | | | | |
| | | | | MC & | | | | | | | | |

| | | | | | | | | | | |
|---|---|---|---|---|---|---|---|---|---|---|
| 42 | RetTrzEastTPC2 | Multiple Choice | Tranz460 / Integrated / 230 | Skip List | | | | | | |
| 43 | EndList9 | End List | End List | No GUI | | | | | | |
| 44 | Tranz1CodeOpt | Choose Printer Code Options for Tranz 1: | P150 | Single MC | | 42 | RetTrzEastTPC2 | Yes | If Value Skip Over | |
| 45 | Tranz1CodeOpt1 | Multiple Choice | P250 | MC & Skip List | | 42 | RetTrzEastTPC2 | Yes | If Value Skip Over | |
| 46 | Tranz1CodeOpt2 | Multiple Choice | P900 | MC & Skip List | | 42 | RetTrzEastTPC2 | Yes | If Value Skip Over | |
| 47 | Tranz1CodeOpt3 | Multiple Choice | Silent Partner | MC & Skip List | | 42 | RetTrzEastTPC2 | Yes | If Value Skip Over | |
| 48 | Tranz1CodeOpt4 | Multiple Choice | PrintPak350 | MC & Skip List | | 42 | RetTrzEastTPC2 | Yes | If Value Skip Over | |
| 49 | EndList10 | End List | End List | No GUI | | 42 | RetTrzEastTPC2 | Yes | If Value Skip Over | |
| 50 | CheckReader | Do you want Check_Reader? | Tap Yes if you want Check_Reader. | Yes/No Form | | | | | | |
| 51 | Pin_Pads | Do you want the Pin Pads? | Tap Yes if you want the Pin Pads. | Yes/No Form | | 302 | RetTrz1Nr3moda | 2 | If Less Skip | |
| 52 | XXRetailTranzC | Retail Tranz Center Features Set, pick "This List Covers My Needs" or if you require other Features, Select Previous & Pick another Features Set.) | List of Choices. | List Form | | 0 | | | | |
| 53 | ParmtrOptData1 | Opt Data Fld. | Enter Features Parameter. (Setup Options: 22 - Optional Data Fields ; 23 - Cust Discretionary Data ; 24 - Product Code ; 25 - Clerk Prompt ; 26 - Clerk ID | Report with Help | | 0 | | | | |

A-67

| | | | Table ; 28 - AVS / MOTO) | | | | | | | | | |
|---|---|---|---|---|---|---|---|---|---|---|---|---|
| 54 | ParmtrCusDisc1 | Cust Discret Dt: | Enter Features Parameter. (Setup Options: 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 55 | ParmtrProdCode1 | Prod Code: | Enter Features Parameter. (Setup Options: 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 56 | ParmtrClerkPmt1 | Clerk Prompt: | Enter Features Parameter. (Setup Options: 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 57 | ParmtrClerkID1 | Clerk ID Table: | Enter Features Parameter. (Setup Options: 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 58 | ParmtrAvsMoto1 | AVS/MOTO: | Enter Features Parameter. (Setup Options: 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 59 | EndList6 | End List | End List | End List for GUI 23 | | | | 0 | | | | |
| 60 | RetTrzCenTPC | Choose One Solutions for Feature Set with Terminal / Printer / Capacity: | Tranz330 / Tranz2 / 200 | Single MC | | | | | | | | |
| | | | | MC & | | | | | | | | |

A-68

| 61 | RetTrzCenTPC1 | Multiple Choice | Tranz380 / Tranz2 / 500+ | Skip List | | | | | | | |
|---|---|---|---|---|---|---|---|---|---|---|---|
| 62 | RetTrzCenTPC2 | Multiple Choice | Tranz460 / Integrated / 500+ | MC & Skip List | | | | | | | |
| 63 | EndList12 | End List | End List | No GUI | | | | | | | |
| 64 | Tranz2CodeOpt | Choose Printer Code Options for Tranz 2: | P150 | Single MC | | | 62 | RetTrzCenTPC2 | Yes | If Value Skip Over | |
| 65 | Tranz2CodeOpt1 | Multiple Choice | P200 | MC & Skip List | | | 62 | RetTrzCenTPC2 | Yes | If Value Skip Over | |
| 66 | Tranz2CodeOpt2 | Multiple Choice | P250 | MC & Skip List | | | 62 | RetTrzCenTPC2 | Yes | If Value Skip Over | |
| 67 | Tranz2CodeOpt3 | Multiple Choice | P900 | MC & Skip List | | | 62 | RetTrzCenTPC2 | Yes | If Value Skip Over | |
| 68 | EndList13 | End List | End List | No GUI | | | 62 | RetTrzCenTPC2 | Yes | If Value Skip Over | |
| 69 | CheckReader1 | Do you want Check_Reader? | Tap Yes if you want Check_Reader. | Yes/No Form | | | | | | | |
| 70 | Pin_Pads2 | Do you want the Pin Pads? | Tap Yes if you want the Pin Pads. | Yes/No Form | | | 305 | RetTrz2Mdbp5 | 2 | If Less Skip | |
| 71 | XXRetailOmniE | Retail Omni East Features Set, pick "This List Covers My Needs" or if you require other Features, Select Previous & Pick another Features Set. | List of Choices. | List Form | | | | | 0 | | |
| 72 | ParmtrProdCode2 | Prod Code: | Enter Features Parameter. (Setup Options: 24 - Product Code ; 25 - Clerk Prompt ; 26 - Clerk ID Table ; 28 - AVS / MOTO) | Report with Help | | | | | 0 | | |
| | | | Enter Features Parameter. | | | | | | | | |

| # | Name | Prompt | Description/Options | Type | | | Val | Ref# | RefName | | Condition |
|---|---|---|---|---|---|---|---|---|---|---|---|
| 73 | ParmtrClerkPmt2 | Clerk Prompt: | (Setup Options: 24 - Product Code , 25 - Clerk Prompt ; 26 - Clerk ID Table ; 28 - AVS / MOTO) | Text Form | | | 0 | | | | |
| 74 | ParmtrClerkID2 | Clerk ID Table: | Enter Features Parameter. (Setup Options: 24 - Product Code , 25 - Clerk Prompt ; 26 - Clerk ID Table ; 28 - AVS / MOTO) | Text Form | | | 0 | | | | |
| 75 | ParmtrAvsMoto2 | AVS/MOTO: | Enter Features Parameter. (Setup Options: 24 - Product Code , 25 - Clerk Prompt ; 26 - Clerk ID Table ; 28 - AVS / MOTO) | Text Form | | | 0 | | | | |
| 76 | EndList7 | End List | End List | End List for GUI 23 | | | 0 | | | | |
| 77 | RetOmniEstTPC | Choose One Solutions for Feature Set with Terminal / Printer / Capacity: | Omni396 / Omni1 / 300+ | Single MC | | | | | | | |
| 78 | RetOmniEstTPC1 | Multiple Choice | Omni3200 / None / 300+ | MC & Skip List | | | | | | | |
| 79 | EndList15 | End List | End List | No GUI | | | | | | | |
| 80 | Omni1CodeOpt | Choose Printer Code Options for Omni1: | P250 | Single MC | | | | 77 | RetOmniEstTPC | No | If Value Skip Over |
| 81 | Omni1CodeOpt1 | Multiple Choice | P900 | MC & Skip List | | | | 77 | RetOmniEstTPC | No | If Value Skip Over |
| 82 | Omni1CodeOpt2 | Multiple Choice | PrintPak350 | MC & Skip List | | | | 77 | RetOmniEstTPC | No | If Value Skip Over |
| 83 | EndList16 | End List | End List | No GUI | | | | 77 | RetOmniEstTPC | No | If Value Skip Over |
| 84 | CheckReader2 | Do you want | Tap Yes if you want | Yes/No | | | | | | | |

A-70

| | | | Check_Reader? | Check_Reader. | Form | | | | | | | | | | |
|---|---|---|---|---|---|---|---|---|---|---|---|---|---|---|---|
| 85 | Pin_Pads4 | | Do you want the Pin Pads? | Tap Yes if you want the Pin Pads. | Yes/No Form | | | | 308 | RetOmni1Soft21 | 2 | If Less Skip | | | |
| 86 | XXRetailHypcomE | | Retail Hypercom East Features Set, pick "This List Covers My Needs" or if you requireother Features, Select Previous & Pick another Features Set. | List of Choices. | List Form | | | | | | 0 | | | | |
| 87 | ParmtrOptData2 | | Opt Data Fld: | Enter Feature Parameter. (Setup Options: 22 - Optional Data Fields ; 25 - Clerk Prompt ; 28 - AVS / MOTO) | Report with Help | | | | | | 0 | | | | |
| 88 | ParmtrClerkPmt3 | | Clerk Prompt: | Enter Feature Parameter. (Setup Options: 22 - Optional Data Fields ; 25 - Clerk Prompt ; 28 - AVS / MOTO) | Text Form | | | | | | 0 | | | | |
| 89 | ParmtrAvsMoto3 | | AVS/MOTO: | Enter Features Parameter. (Setup Options: 22 - Optional Data Fields ; 25 - Clerk Prompt ; 28 - AVS / MOTO) | Text Form | | | | | | 0 | | | | |
| 90 | EndList5 | | End List | End List | End List for GUI 23 | | | | | | 0 | | | | |
| 91 | RetHypEstTPC | | Choose One Solutions for Features Set with Terminal / Printer / Capacity | HypercomT7 / T7P / 300 | Single MC | | | | | | | | | | |
| 92 | RetHypEstTPC1 | | Multiple Choice | HypercomT77 / T77 / 300 | MC & Skip List | | | | | | | | | | |
| 93 | RetHypEstTPC2 | | Multiple Choice | HypercomT8 / T8 / 300 | MC & Skip List | | | | | | | | | | |
| 94 | EndList18 | | End List | End List | No GUI | | | | | | | | | | |
| | | | | | | | | | | | | | If | | |

A-71

| | | | | | | | | | | | |
|---|---|---|---|---|---|---|---|---|---|---|---|
| 95 | T7PCodeOpt | Choose Printer Code Options for T7P: | Impact | Single MC | | | | 91 | RetHypEstTPC | No | Value Skip Over |
| 96 | T7PCodeOpt1 | Multiple Choice | Thermal | MC & Skip List | | | | 91 | RetHypEstTPC | No | If Value Skip Over |
| 97 | EndList19 | End List | End List | No GUI | | | | 91 | RetHypEstTPC | No | If Value Skip Over |
| 98 | T77CodeOpt | Choose Printer Code Options for T77: | Friction | Single MC | | | | 92 | RetHypEstTPC1 | No | If Value Skip Over |
| 99 | T77CodeOpt1 | Multiple Choice | Slip | MC & Skip List | | | | 92 | RetHypEstTPC1 | No | If Value Skip Over |
| 100 | T77CodeOpt2 | Multiple Choice | Thermal | MC & Skip List | | | | 92 | RetHypEstTPC1 | No | If Value Skip Over |
| 101 | EndList20 | End List | End List | No GUI | | | | 92 | RetHypEstTPC1 | No | If Value Skip Over |
| 102 | T8CodeOpt | Choose Printer Code Options for T8: | P250 | MC & Skip List | | | | 93 | RetHypEstTPC2 | No | If Value Skip Over |
| 103 | EndList21 | End List | End List | No GUI | | | | 93 | RetHypEstTPC2 | No | If Value Skip Over |
| 104 | CheckReader3 | Do you want Check_Reader? | Tap Yes if you want Check_Reader. | Yes/No Form | | | | | | | |
| 105 | Pin_Pads6 | Do you want the Pin Pads? | Tap Yes if you want the Pin Pads. | Yes/No Form | | | | 310 | RetT7pT7ndci8 | 2 | If Less Skip |
| 106 | XXRetailHypcomC | Retail Hypercom Central Features Set, pick "This List Covers My Needs" or if you require other Features, Select Previous & Pick another Features | List of Choices. | List Form | | | | | | 0 | |

A-72

| | | Set. | | | | | | | | | | |
|---|---|---|---|---|---|---|---|---|---|---|---|---|
| 107 | ParmtrOptData3 | Opt Data Fld: | Enter Feature Parameter. (Setup Options: 22 - Optional Data Fields ; 23 - Cust Discretionary Data ; 24 - Product Code ; 25 - Clerk Prompt ; 26 - Clerk ID Table ; 28 - AVS / MOTO) | Report with Help | | | | | | | | |
| 108 | ParmtrCusDisc2 | Cust Discret Dt: | Enter Feature Parameterfor. (Setup Options 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 109 | ParmtrProdCode3 | Prod Code: | Enter Feature Parameter. (Setup Options. 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 110 | ParmtrClerkPmt4 | Clerk Prompt: | Enter Feature Parameter. (Setup Options. 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 111 | ParmtrClerkID3 | Clerk ID Table: | Enter Feature Parameter. (Setup Options: 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 112 | ParmtrAvsMoto4 | AVS/MOTO: | Enter Feature Parameter. (Setup Options: 22 - Optional Data Fields ; 23 - Cust Discretionary Data ; 24 - Product Code ; 25 - Clerk Prompt ; 26 - Clerk ID Table ; 28 - AVS / MOTO) | Text Form | | | | 0 | | | | |
| 113 | EndList8 | End List | End List | End List for GUI | | | | 0 | | | | |

A-73

| | | | | 23 | | | | | | | | |
|---|---|---|---|---|---|---|---|---|---|---|---|---|
| 114 | RetHypCenTPC | Choose One Solutions for Feature Set with Terminal / Printer / Capacity: | HypercomT7 / Integrated / 380 | Single MC | | | | | | | | |
| 115 | RetHypCenTPC1 | Multiple Choice | HypercomT77 / T77 / 380 | MC & Skip List | | | | | | | | |
| 116 | EndList23 | End List | End List | No GUI | | | | | | | | |
| 117 | T77CodeOpt3 | Choose Printer Code Options for T77: | Friction | Single MC | | | 115 | RetHypCenTPC1 | No | If Value Skip Over | | |
| 118 | T77CodeOpt4 | Multiple Choice | Slip | MC & Skip List | | | 115 | RetHypCenTPC1 | No | If Value Skip Over | | |
| 119 | T77CodeOpt5 | Multiple Choice | Thermal | MC & Skip List | | | 115 | RetHypCenTPC1 | No | If Value Skip Over | | |
| 120 | EndList24 | End List | End List | No GUI | | | 115 | RetHypCenTPC1 | No | If Value Skip Over | | |
| 121 | CheckReader4 | Do you want Check_Reader? | Tap Yes if you want Check_Reader | Yes/No Form | | | | | | | | |
| 122 | Pin_Pads8 | Do you want the Pin Pads? | Tap Yes if you want the Pin Pads. | Yes/No Form | | | 313 | RetIntegT7mappp8 | 2 | If Less Skip | | |
| 123 | XXRestaurFeatCode | Please Choose the Restaurant Features Code: | Restaurant_T330_East | Single MC | | | | | | | | |
| 124 | RestaurFeatCode1 | Multiple Choice | Restaurant_T460_East | MC & Skip List | | | 147 | XXRestauT460E | Yes | If Value Skip | | |
| 125 | RestaurFeatCode2 | Multiple Choice | Restaurant_Omni_East | MC & Skip List | | | 165 | XXRestauOmniE | Yes | If Value Skip | | |
| 126 | RestaurFeatCode3 | Multiple Choice | Restaurant_Hypercom_East | MC & Skip | | | 180 | XXRestauHypcmE | Yes | If Value Skip | | |

*A-74*

| # | Name | Label | Description | Type | | | Col8 | Col9 | | If |
|---|---|---|---|---|---|---|---|---|---|---|
| 127 | RestaurFeatCode4 | Multiple Choice | Restaurant_T330_Central | MC & Skip List | | | 201 | XXRestauT330C | Yes | If Value Skip |
| 128 | RestaurFeatCode5 | Multiple Choice | Restaurant_T380_Central | MC & Skip List | | | 215 | XXRestauT380C | Yes | If Value Skip |
| 129 | EndList26 | End List | End List | No GUI | | | | | | |
| 130 | XXRestauT330E | Restaurant T330 East Features Set, pick "This List Covers My Needs" or if you requireother Features, Select Previous & Pick another Features Set. | List of Choices. | List Form | | | | | | |
| 131 | ParmtrProdCode4 | Prod Code: | Enter Feature Parameter. (Setup Options 21 - Product Code ; 22 - Server Prompt ; 23 - Waiter Banking , 25 - Additional Auth % , 28 - Tip Table) | Report with Help | | | | | | |
| 132 | ParmtrServerPmt | Server Prompt: | Enter Feature Parameter. (Setup Options. 21 - Product Code ; 22 - Server Prompt ; 23 - Waiter Banking ; 25 - Additional Auth % ; 28 - Tip Table) | Text Form | | | | | | |
| 133 | ParmtrWaitBank | Waiter Bank: | Enter Feature Parameter. (Setup Options: 21 - Product Code ; 22 - Server Prompt ; 23 - Waiter Banking ; 25 - Additional Auth % ; 28 - Tip Table) | Text Form | | | | | | |
| 134 | ParmtrAddAuth | Add. Auth %: | Enter Feature Parameter. (Setup Options: 21 - Product Code ; 22 - Server Prompt ; 23 - Waiter Banking ; 25 - Additional Auth % ; 28 - Tip Table) | Text Form | | | | | | |
| 135 | ParmtrTipTable | Tip Table: | Enter Feature Parameter. (Setup Options: 21 - Product Code ; 22 - Server Prompt ; 23 - Waiter Banking ; 25 - Additional | Text Form | | | | | | |

A-75

| | | | Auth % ; 28 - Tip Table) | | | | | | | | | |
|---|---|---|---|---|---|---|---|---|---|---|---|---|
| 136 | EndList28 | End List | End List | End List for GUI 23 | | | | | | | | |
| 137 | ResT330EstTPC | Choose One Solutions for Features Set with Terminal / Printer / Capacity: | Tranz330 / Tranz1 / 125 | MC & Skip List | | | | | | | | |
| 138 | EndList29 | End List | End List | No GUI | | | | | | | | |
| 139 | Tranz1CodeOpt5 | Choose Printer Code Options for Tranz 1: | P150 | Single MC | | | | | | | | |
| 140 | Tranz1CodeOpt6 | Multiple Choice | P250 | MC & Skip List | | | | | | | | |
| 141 | Tranz1CodeOpt7 | Multiple Choice | P900 | MC & Skip List | | | | | | | | |
| 142 | Tranz1CodeOpt8 | Multiple Choice | Silent Partner | MC & Skip List | | | | | | | | |
| 143 | Tranz1CodeOpt9 | Multiple Choice | PrintPak350 | MC & Skip List | | | | | | | | |
| 144 | EndList30 | End List | End List | No GUI | | | | | | | | |
| 145 | CheckReader5 | Do you want Check_Reader? | Tap Yes if you want Check_Reader. | Yes/No Form | | | | | | | | |
| 146 | Pin_Pads10 | Do you want the Pin Pads? | Tap Yes if you want the Pin Pads | Yes/No Form | | | 315 | ResTrz1Ndt3460 | 2 | If Less Skip | | |
| 147 | XXRestauT460E | Restaurant T460 East Features Set, pick "This List Covers My Needs" or if you require other Features, Select Previous & Pick another Features Set. | List of Choices. | List Form | | | | | | | | |
| | | | Enter Feature Parameter. (Setup Options: 21 - | Report | | | | | | | | |

A-76

| | | | | | | | | | | | |
|---|---|---|---|---|---|---|---|---|---|---|---|
| 148 | ParmtrProdCode5 | Prod Code: | Product Code ; 22 - Server Prompt ; 23 - Waiter Banking ; 25 - Additional Auth % ; 28 - Tip Table) | with Help | | | | | | | |
| 149 | ParmtrServerPmt1 | Server Prompt: | Enter Feature Parameter. (Setup Options: 21 - Product Code ; 22 - Server Prompt ; 23 - Waiter Banking ; 25 - Additional Auth % ; 28 - Tip Table) | Text Form | | | | | | | |
| 150 | ParmtrWaitBank1 | Waiter Bank: | Enter Feature Parameter. (Setup Options: 21 - Product Code ; 22 - Server Prompt ; 23 - Waiter Banking ; 25 - Additional Auth % ; 28 - Tip Table) | Text Form | | | | | | | |
| 151 | ParmtrAddAuth1 | Add. Auth %: | Enter Feature Parameter. (Setup Options: 21 - Product Code ; 22 - Server Prompt ; 23 - Waiter Banking ; 25 - Additional Auth % ; 28 - Tip Table) | Text Form | | | | | | | |
| 152 | ParmtrTipTable1 | Tip Table: | Enter Feature Parameter. (Setup Options: 21 - Product Code ; 22 - Server Prompt ; 23 - Waiter Banking ; 25 - Additional Auth % ; 28 - Tip Table) | Text Form | | | | | | | |
| 153 | EndList32 | End List | End List | End List for GUI 23 | | | | | | | |
| 154 | ResT460EstTPC | Choose One Solutions for Features Set with Terminal / Printer / Capacity | Tranz380 / Tranz1 / 300 | Single MC | | | | | | | |
| 155 | ResT460EstTPC1 | Multiple Choice | Tranz460 / Integrated / 300 | MC & Skip List | | | | | | | |
| 156 | EndList33 | End List | End List | No GUI | | | | | | | |
| 157 | Tranz1CodeOpt10 | Choose Printer Code Options for Tranz 1: | P150 | Single MC | | | 154 | ResT460EstTPC | No | If Value Skip Over | |

A-77

| 158 | Tranz1CodeOpt11 | Multiple Choice | P250 | MC & Skip List | | | 154 | ResT460EstTPC | No | If Value Skip Over | |
| --- | --- | --- | --- | --- | --- | --- | --- | --- | --- | --- | --- |
| 159 | Tranz1CodeOpt12 | Multiple Choice | P900 | MC & Skip List | | | 154 | ResT460EstTPC | No | If Value Skip Over | |
| 160 | Tranz1CodeOpt13 | Multiple Choice | Silent Partner | MC & Skip List | | | 154 | ResT460EstTPC | No | If Value Skip Over | |
| 161 | Tranz1CodeOpt14 | Multiple Choice | PrintPak350 | MC & Skip List | | | 154 | ResT460EstTPC | No | If Value Skip Over | |
| 162 | EndList35 | End List | End List | No GUI | | | 154 | ResT460EstTPC | No | If Value Skip Over | |
| 163 | CheckReader6 | Do you want Check_Reader? | Tap Yes if you want Check_Reader. | Yes/No Form | | | | | | | |
| 164 | Pin_Pads12 | Do you want the Pin Pads? | Tap Yes if you want the Pin Pads. | Yes/No Form | | | 316 | ResTrz1Ndt890 | 2 | If Less Skip | |
| 165 | XXRestauOmniE | Restaurant Omni East Features Set, pick "This List Covers My Needs" or if you require other Features, Select Previous & Pick another Features Set. | List of Choices. | List Form | | | | | | | |
| 166 | ParmtrProdCode6 | Prod Code: | Enter Feature Parameter. (Setup Options: 21 - Product Code ; 22 - Server Prompt ; 23 - Waiter Banking ; 25 - Additional Auth %) | Report with Help | | | | | | | |
| 167 | ParmtrServerPmt2 | Server Prompt: | Enter Feature Parameter. (Setup Options: 21 - Product Code ; 22 - Server Prompt ; 23 - Waiter Banking ; 25 - Additional Auth %) | Text Form | | | | | | | |
| | | | Enter Feature Parameter. (Setup Options: 21 - Product Code ; 22 - Server | Text | | | | | | | |

| | | | | | | | | | | | |
|---|---|---|---|---|---|---|---|---|---|---|---|
| 168 | ParmtrWaitBank2 | Waiter Bank: | Prompt , 23 - Waiter Banking ; 25 - Additional Auth %) | Form | | | | | | | |
| 169 | ParmtrAddAuth2 | Add. Auth %: | Enter Feature Parameter. (Setup Options: 21 - Product Code ; 22 - Server Prompt ; 23 - Waiter Banking ; 25 - Additional Auth %) | Text Form | | | | | | | |
| 170 | EndList38 | End List | End List | End List for GUI 23 | | | | | | | |
| 171 | ResOmniEstTPC | Choose One Solutions for Features Set with Terminal / Printer / Capacity: | Omni396 / Omni1 / 300~ | Single MC | | | | | | | |
| 172 | ResOmniEstTPC1 | Multiple Choice | Omni3200 / None / 300~ | MC & Skip List | | | | | | | |
| 173 | EndList39 | End List | End List | No GUI | | | | | | | |
| 174 | Omni1CodeOpt3 | Choose Printer Code Options for Omni1: | P250 | Single MC | | 171 | ResOmniEstTPC | No | If Value Skip Over | | |
| 175 | Omni1CodeOpt4 | Multiple Choice | P900 | MC & Skip List | | 171 | ResOmniEstTPC | No | If Value Skip Over | | |
| 176 | Omni1CodeOpt5 | Multiple Choice | PrintPak350 | MC & Skip List | | 171 | ResOmniEstTPC | No | If Value Skip Over | | |
| 177 | EndList40 | End List | End List | No GUI | | 171 | ResOmniEstTPC | No | If Value Skip Over | | |
| 178 | CheckReader7 | Do you want Check_Reader? | Tap Yes if you want Check_Reader. | Yes/No Form | | | | | | | |
| 179 | Pin_Pads14 | Do you want the Pin Pads? | Tap Yes if you want the Pin Pads. | Yes/No Form | | 318 | ResOmni1Soft21 | 2 | If Less Skip | | |
| | | Restaurant Hypercom | | | | | | | | | |

A-79

| | | | | | | | | | | | | |
|---|---|---|---|---|---|---|---|---|---|---|---|---|
| 180 | XXRestauHypcmE | East Features Set, pick "This List Covers My Needs" or if you requireother Features, Select Previous & Pick another Features Set. | List of Choices. | List Form | | | | | | | | |
| 181 | ParmtrProdCode7 | Prod Code: | Enter Feature Parameter. (Setup Options: 21 - Product Code ; 22 - Server Prompt ; 23 - Waiter Banking ; 25 - Additional Auth %) | Report with Help | | | | | | | | |
| 182 | ParmtrServerPmt3 | Server Prompt: | Enter Feature Parameter. (Setup Options: 21 - Product Code ; 22 - Server Prompt ; 23 - Waiter Banking ; 25 - Additional Auth %) | Text Form | | | | | | | | |
| 183 | ParmtrWaitBank3 | Waiter Bank: | Enter Feature Parameter. (Setup Options: 21 - Product Code , 22 - Server Prompt , 23 - Waiter Banking ; 25 - Additional Auth %) | Text Form | | | | | | | | |
| 184 | ParmtrAddAuth3 | Add. Auth %: | Enter Feature Parameter. (Setup Options: 21 - Product Code ; 22 - Server Prompt ; 23 - Waiter Banking ; 25 - Additional Auth %) | Text Form | | | | | | | | |
| 185 | EndList41 | End List | End List | End List for GUI 23 | | | | | | | | |
| 186 | ResHypEstTPC | Choose One Solutions for Features Set Terminal / Printer / Capacity. | HypercomT7 / T7P / 300 | Single MC | | | | | | | | |
| 187 | ResHypEstTPC1 | Multiple Choice | HypercomT77 / T77 / 300 | MC & Skip List | | | | | | | | |
| 188 | ResHypEstTPC2 | Multiple Choice | HypercomT8 / T8 / 300 | MC & Skip List | | | | | | | | |
| | | | | No | | | | | | | | |

*A-80*

| | | | | | | | | | | | | |
|---|---|---|---|---|---|---|---|---|---|---|---|---|
| 189 | EndList43 | End List | End List | GUI | | | | | | | | |
| 190 | T7PCodeOpt2 | Choose Printer Code Options for T7P: | Impact | Single MC | | | 186 | ResHypEstTPC | No | If Value Skip Over | | |
| 191 | T7PCodeOpt3 | Multiple Choice | Thermal | MC & Skip List | | | 186 | ResHypEstTPC | No | If Value Skip Over | | |
| 192 | EndList44 | End List | End List | No GUI | | | 186 | ResHypEstTPC | No | If Value Skip Over | | |
| 193 | T77CodeOpt6 | Choose Printer Code Options for T77: | Friction | Single MC | | | 187 | ResHypEstTPC1 | No | If Value Skip Over | | |
| 194 | T77CodeOpt7 | Multiple Choice | Slip | MC & Skip List | | | 187 | ResHypEstTPC1 | No | If Value Skip Over | | |
| 195 | T77CodeOpt8 | Multiple Choice | Thermal | MC & Skip List | | | 187 | ResHypEstTPC1 | No | If Value Skip Over | | |
| 196 | EndList45 | End List | End List | No GUI | | | 187 | ResHypEstTPC1 | No | If Value Skip Over | | |
| 197 | T8CodeOpt1 | Choose Printer Code Options for T8: | P250 | MC & Skip List | | | 188 | ResHypEstTPC2 | No | If Value Skip Over | | |
| 198 | EndList46 | End List | End List | No GUI | | | 188 | ResHypEstTPC2 | No | If Value Skip Over | | |
| 199 | CheckReader8 | Do you want Check_Reader? | Tap Yes if you want Check_Reader. | Yes/No Form | | | | | | | | |
| 200 | Pin_Pads16 | Do you want the Pin Pads? | Tap Yes if you want the Pin Pads | Yes/No Form | | | 320 | ResT7pT7ndci8 | 2 | If Less Skip | | |
| 201 | XXRestauT330C | Restaurant T330 Central East Features Set, pick "This List Covers My Needs" or if you | List of Choices. | List Form | | | | | | | | |

*A-81*

| | | | | | | | | | | | |
|---|---|---|---|---|---|---|---|---|---|---|---|
| | | requireother Features, Select Previous & Pick another Features Set. | | | | | | | | | |
| 202 | ParmtrServerPmt4 | Server Prompt: | Enter Feature Parameter. (Setup Options: 22 - Server Prompt ; 23 - Waiter Banking ; 25 - Additional Auth %) | Report with Help | | | | | | | |
| 203 | ParmtrWaitBank4 | Waiter Bank: | Enter Feature Parameter. (Setup Options: 22 - Server Prompt ; 23 - Waiter Banking ; 25 - Additional Auth %) | Text Form | | | | | | | |
| 204 | ParmtrAddAuth4 | Add. Auth %: | Enter Feature Parameter. (Setup Options: 22 - Server Prompt ; 23 - Waiter Banking ; 25 - Additional Auth %) | Text Form | | | | | | | |
| 205 | EndList42 | End List | End List | End List for GUI 23 | | | | | | | |
| 206 | ResT330CenTPC | Choose One Solutions for Features Set with Terminal / Printer / Capacity: | Tranz330 / Tranz2 / 75 | MC & Skip List | | | | | | | |
| 207 | EndList50 | End List | End List | No GUI | | | | | | | |
| 208 | Tranz2CodeOpt4 | Choose Printer Code Options for Tranz 2: | P150 | Single MC | | | | | | | |
| 209 | Tranz2CodeOpt5 | Multiple Choice | P200 | MC & Skip List | | | | | | | |
| 210 | Tranz2CodeOpt6 | Multiple Choice | P250 | MC & Skip List | | | | | | | |
| 211 | Tranz2CodeOpt7 | Multiple Choice | P900 | MC & Skip List | | | | | | | |
| 212 | EndList51 | End List | End List | No GUI | | | | | | | |
| 213 | CheckReader9 | Do you want | Tap Yes if you want | Yes/No | | | | | | | |

*A-82*

| | | Check_Reader? | Check_Reader. | Form | | | | | | | | |
|---|---|---|---|---|---|---|---|---|---|---|---|---|
| 214 | Pin_Pads18 | Do you want the Pin Pads? | Tap Yes if you want the Pin Pads. | Yes/No Form | | | 323 | ResTranz2Mcrs4 | 2 | If Less Skip | | |
| 215 | XXRestauT380C | Restaurant T380 Central East Features Set, pick "This List Covers My Needs" or if you require other Features, Select Previous & Pick another Features Set. | List of Choices. | List Form | | | | | | | | |
| 216 | ParmtrServerPmt5 | Server Prompt: | Enter Feature Parameter. (Setup Options: 22 - Server Prompt ; 23 - Waiter Banking ; 25 - Additional Auth %) | Report with Help | | | | | | | | |
| 217 | ParmtrWaitBank5 | Waiter Bank: | Enter Feature Parameter. (Setup Options: 22 - Server Prompt ; 23 - Waiter Banking ; 25 - Additional Auth %) | Text Form | | | | | | | | |
| 218 | ParmtrAddAuth5 | Add. Auth %: | Enter Feature Parameter. (Setup Options: 22 - Server Prompt ; 23 - Waiter Banking ; 25 - Additional Auth %) | Text Form | | | | | | | | |
| 219 | EndList52 | End List | End List | End List for GUI 23 | | | | | | | | |
| 220 | ResT380CenTPC | Choose One Solutions for Features Set with Terminal / Printer / Capacity: | Tranz380 / Tranz3 / 500 | MC & Skip List | | | | | | | | |
| 221 | EndList53 | End List | End List | No GUI | | | | | | | | |
| 222 | Tranz3CodeOpt | Choose Printer Code Options for Tranz 3: | P150 | Single MC | | | | | | | | |
| 223 | Tranz3CodeOpt1 | Multiple Choice | P250 | MC & Skip List | | | | | | | | |
| 224 | Tranz3CodeOpt2 | Multiple Choice | P900 | MC & Skip | | | | | | | | |

A-83

| | | | | | | | | | | | |
|---|---|---|---|---|---|---|---|---|---|---|---|
| | | | List | | | | | | | | |
| 225 | EndList54 | End List | End List | No GUI | | | | | | | |
| 226 | CheckReader10 | Do you want Check_Reader? | Tap Yes if you want Check_Reader. | Yes/No Form | | | | | | | |
| 227 | Pin_Pads20 | Do you want the Pin Pads? | Tap Yes if you want the Pin Pads. | Yes/No Form | | | 324 | ResTrz3Mcr3802 | 2 | If Less Skip | |
| 228 | XXLodgingFeatCode | Choose Lodging Features Code: | Front_Desk | Single MC | | | | | | | |
| 229 | LodgingFeatCode1 | Multiple Choice | Hospitality_380A | MC & Skip List | | | 254 | XXHospital380A | Yes | If Value Skip | |
| 230 | LodgingFeatCode2 | Multiple Choice | Hospitality_T7 | MC & Skip List | | | 270 | XXHospitalT7 | Yes | If Value Skip | |
| 231 | LodgingFeatCode3 | Multiple Choice | Hospitality_380S | MC & Skip List | | | 290 | XXHospital380S | Yes | If Value Skip | |
| 232 | EndList27 | End List | End List | No GUI | | | | | | | |
| 233 | XXFrontDesk | Lodging Front Desk Features Set, pick "This List Covers My Needs" or if you require other Features, Select Previous & Pick another Features Set. | List of Choices | List Form | | | | | | | |
| 234 | ParmtrProdCode8 | Prod Code: | Enter Feature Parameter. (Setup Options: 36 - Product Code ; 37 - Clerk Prompt ; 38 - Clerk ID Table) | Report with Help | | | | | | | |
| 235 | ParmtrClerkPmt5 | Clerk Prompt: | Enter Feature Parameter. (Setup Options: 36 - Product Code ; 37 - Clerk Prompt ; 38 - Clerk ID Table) | Text Form | | | | | | | |
| 236 | ParmtrClerkID4 | Clerk ID Table: | Enter Feature Parameter. (Setup Options: 36 - Product Code ; 37 - Clerk Prompt ; 38 - Clerk ID Table) | Text Form | | | | | | | |

A-84

| | | | | | | | | | | | |
|---|---|---|---|---|---|---|---|---|---|---|---|
| 237 | EndList55 | End List | End List | End List for GUI 23 | | | | | | | |
| 238 | FrontDeskTPC | Choose One Solutions for Features Set with Terminal / Printer / Capacity: | Tranz330 / Tranz4 / 75 | Single MC | | | | | | | |
| 239 | FrontDeskTPC1 | Multiple Choice | Tranz380 / Tranz1 / 350 | MC & Skip List | | | | | | | |
| 240 | EndList56 | End List | End List | No GUI | | | | | | | |
| 241 | Tranz4CodeOpt | Choose Printer Code Options for Tranz 4: | P250 | Single MC | | | 238 | FrontDeskTPC | No | If Value Skip Over | |
| 242 | Tranz4CodeOpt1 | Multiple Choice | P900 | MC & Skip List | | | 238 | FrontDeskTPC | No | If Value Skip Over | |
| 243 | Tranz4CodeOpt2 | Multiple Choice | Silent Partner | MC & Skip List | | | 238 | FrontDeskTPC | No | If Value Skip Over | |
| 244 | Tranz4CodeOpt3 | Multiple Choice | PrintPak350 | MC & Skip List | | | 238 | FrontDeskTPC | No | If Value Skip Over | |
| 245 | EndList58 | End List | End List | No GUI | | | 238 | FrontDeskTPC | No | If Value Skip Over | |
| 246 | Tranz1CodeOpt15 | Choose Printer Code Options for Tranz 1: | P150 | Single MC | | | 239 | FrontDeskTPC1 | No | If Value Skip Over | |
| 247 | Tranz1CodeOpt16 | Multiple Choice | P250 | MC & Skip List | | | 239 | FrontDeskTPC1 | No | If Value Skip Over | |
| 248 | Tranz1CodeOpt17 | Multiple Choice | P900 | MC & Skip | | | 239 | FrontDeskTPC1 | No | If Value Skip | |

*A-85*

| | | | | | | | | | | |
|---|---|---|---|---|---|---|---|---|---|---|
| | | | | List | | | | | | Over |
| 249 | Tranz1CodeOpt18 | Multiple Choice | Silent Partner | MC & Skip List | | | 239 | FrontDeskTPC1 | No | If Value Skip Over |
| 250 | Tranz1CodeOpt19 | Multiple Choice | PrintPak350 | MC & Skip List | | | 239 | FrontDeskTPC1 | No | If Value Skip Over |
| 251 | EndList57 | End List | End List | No GUI | | | 239 | FrontDeskTPC1 | No | If Value Skip Over |
| 252 | CheckReader11 | Do you want Check_Reader? | Tap Yes if you want Check_Reader. | Yes/No Form | | | | | | |
| 253 | Pin_Pads22 | Do you want the Pin Pads? | Tap Yes if you want the Pin Pads. | Yes/No Form | | | 325 | LodgTrz4Nft330 | 2 | If Less Skip |
| 254 | XXHospital380A | Lodging Hospitality 380A Features Set, pick "This List Covers My Needs" or if you require other Features, Select Previous & Pick another Features Set. | List of Choices. | List Form | | | | | | |
| 255 | ParmtrProdCode9 | Prod Code: | Enter Feature Parameter. (Setup Options: 36 - Product Code ; 37 - Clerk Prompt ; 38 - Clerk ID Table) | Report with Help | | | | | | |
| 256 | ParmtrClerkPmt6 | Clerk Prompt: | Enter Feature Parameter. (Setup Options: 36 - Product Code ; 37 - Clerk Prompt , 38 - Clerk ID Table) | Text Form | | | | | | |
| 257 | ParmtrClerkID5 | Clerk ID Table: | Enter Feature Parameter. (Setup Options: 36 - Product Code ; 37 - Clerk Prompt ; 38 - Clerk ID Table) | Text Form | | | | | | |
| 258 | EndList61 | End List | End List | End List for GUI 23 | | | | | | |
| | | Choose One Solutions for | | | | | | | | |

A-86

| | | | | | | | | | | | | |
|---|---|---|---|---|---|---|---|---|---|---|---|---|
| 259 | Hosp380ATPCA | Features Set with Terminal / Printer / Capacity / Application: | Tranz380 / Tranz4 / 250 / NFT8010 | Single MC | | | | | | | | |
| 260 | Hosp380ATPCA1 | Multiple Choice | Tranz380 / Tranz4 / 250 / NFT8011 | MC & Skip List | | | | | | | | |
| 261 | Hosp380ATPCA2 | Multiple Choice | Tranz380 / Tranz4 / 250 / NFT8012 | MC & Skip List | | | | | | | | |
| 262 | EndList63 | End List | End List | No GUI | | | | | | | | |
| 263 | Tranz4CodeOpt4 | Choose Printer Code Options for Tranz 4: | P250 | Single MC | | | | | | | | |
| 264 | Tranz4CodeOpt5 | Multiple Choice | P900 | MC & Skip List | | | | | | | | |
| 265 | Tranz4CodeOpt6 | Multiple Choice | Silent Partner | MC & Skip List | | | | | | | | |
| 266 | Tranz4CodeOpt7 | Multiple Choice | PrintPak350 | MC & Skip List | | | | | | | | |
| 267 | EndList64 | End List | End List | No GUI | | | | | | | | |
| 268 | CheckReader12 | Do you want Integrated Check Reader? | Tap Yes if you want Integrated Check Reader. | Yes/No Form | | | | | | | | |
| 269 | Pin_Pads24 | Do you want the Pin Pads? | Tap Yes if you want the Pin Pads. | Yes/No Form | | | 327 | LodgTrz4Nft810 | 2 | If Less Skip | | |
| 270 | XXHospitalT7 | Lodging Hospitality T7 Features Set, pick "This List Covers My Needs" or if you requireother Features, Select Previous & Pick another Features Set. | List of Choices. | List Form | | | | | | | | |
| 271 | ParmtrProdCode10 | Prod Code: | Enter Feature Parameter. (Setup Options: 36 - Product Code ; 37 - Clerk Prompt ; 38 - Clerk ID Table) | Report with Help | | | | | | | | |

*A-87*

| 272 | ParmtrClerkPmt7 | Clerk Prompt: | Enter Feature Parameter. (Setup Options: 36 - Product Code ; 37 - Clerk Prompt ; 38 - Clerk ID Table) | Text Form | | | | | | | |
|---|---|---|---|---|---|---|---|---|---|---|---|
| 273 | ParmtrClerkID6 | Clerk ID Table: | Enter Feature Parameter. (Setup Options: 36 - Product Code ; 37 - Clerk Prompt ; 38 - Clerk ID Table) | Text Form | | | | | | | |
| 274 | EndList62 | End List | End List | End List for GUI 23 | | | | | | | |
| 275 | HospitalT7TPC | Choose One Solutions for Features Set with Terminal / Printer / Capacity: | HypercomT7 / T7P / 400 | Single MC | | | | | | | |
| 276 | HospitalT7TPC1 | Multiple Choice | HypercomT77 / T77 / 400 | MC & Skip List | | | | | | | |
| 277 | HospitalT7TPC2 | Multiple Choice | HypercomT8 / T8 / 400 | MC & Skip List | | | | | | | |
| 278 | EndList69 | End List | End List | No GUI | | | | | | | |
| 279 | T7PCodeOpt4 | Choose Printer Code Options for T7P: | Impact | Single MC | | | 275 | HospitalT7TPC | No | If Value Skip Over | |
| 280 | T7PCodeOpt5 | Multiple Choice | Thermal | MC & Skip List | | | 275 | HospitalT7TPC | No | If Value Skip Over | |
| 281 | EndList70 | End List | End List | No GUI | | | 275 | HospitalT7TPC | No | If Value Skip Over | |
| 282 | T77CodeOpt9 | Choose Printer Code Options for T77: | Friction | Single MC | | | 276 | HospitalT7TPC1 | No | If Value Skip Over | |
| | | | | MC | | | | | | If | |

*A-88*

| | | | | | | | | | | |
|---|---|---|---|---|---|---|---|---|---|---|
| 283 | T77CodeOpt10 | Multiple Choice | Slip | & Skip List | | | 276 | HospitalT7TPC1 | No | Value Skip Over |
| 284 | T77CodeOpt11 | Multiple Choice | Thermal | MC & Skip List | | | 276 | HospitalT7TPC1 | No | If Value Skip Over |
| 285 | EndList71 | End List | End List | No GUI | | | 276 | HospitalT7TPC1 | No | If Value Skip Over |
| 286 | T8CodeOpt2 | Choose Printer Code Options for T8: | P250 | MC & Skip List | | | 277 | HospitalT7TPC2 | No | If Value Skip Over |
| 287 | EndList72 | End List | End List | No GUI | | | 277 | HospitalT7TPC2 | No | If Value Skip Over |
| 288 | CheckReader13 | Do you want Check_Reader? | Tap Yes if you want Check_Reader. | Yes/No Form | | | | | | |
| 289 | Pin_Pads26 | Do you want the Pin Pads? | Tap Yes if you want the Pin Pads. | Yes/No Form | | | 330 | LodgT7PT7glod4 | 2 | If Less Skip |
| 290 | XXHospital380S | Lodging Hospitality 380S Features Set, pick "This List Covers My Needs" or if you require other Features, Select Previous & Pick another Features Set. | List of Choices. | List Form | | | | | | |
| 291 | ParmtrProdCode11 | Prod Code: | Enter Feature Parameter. (Setup Options: 36 - Product Code ; 37 - Clerk Prompt) | Report with Help | | | | | | |
| 292 | ParmtrClerkPmt8 | Clerk Prompt: | Enter Feature Parameter. (Setup Options: 36 - Product Code ; 37 - Clerk Prompt) | Text Form | | | | | | |
| 293 | EndList73 | End List | End List | End List for GUI 23 | | | | | | |
| 294 | Hosp380STPC | Choose One Solutions for Features Set with | Tranz380 / Tranz3 / 400 | MC & | | | | | | |

A-89

| | | | | | | | | | | | | |
|---|---|---|---|---|---|---|---|---|---|---|---|---|
| | | Terminal / Printer / Capacity: | | Skip List | | | | | | | | |
| 295 | EndList74 | End List | End List | No GUI | | | | | | | | |
| 296 | Tranz3CodeOpt3 | Choose Printer Code Options for Tranz 3. | P150 | Single MC | | | | | | | | |
| 297 | Tranz3CodeOpt4 | Multiple Choice | P250 | MC & Skip List | | | | | | | | |
| 298 | Tranz3CodeOpt5 | Multiple Choice | P900 | MC & Skip List | | | | | | | | |
| 299 | EndList75 | End List | End List | No GUI | | | | | | | | |
| 300 | CheckReader14 | Do you want Check_Reader? | Tap Yes if you want Check_Reader. | Yes/No Form | | | | | | | | |
| 301 | Pin_Pads28 | Do you want the Pin Pads? | Tap Yes if you want the Pin Pads. | Yes/No Form | | | 333 | LodgTrz3Mldg5 | 2 | If Less Skip | |
| 302 | RetTrz1Nr3moda | Tranz330/Tranz1/125/NR3MODA | Your Solution. Tap YES if Calculator will more to Pricing, Or Tap PREVIOUS & Make Different Choices for (Terminal / Printers / Capacity / Application) | Yes/No Form | | . | 40 | RetTrzEastTPC | Yes | If Not Value Skip Over | |
| 303 | RetTrz1Nr8moda | Tranz380/Tranz1/300/NR8MODA | Your Solution. Tap YES if Calculator will more to Pricing, Or Tap PREVIOUS & Make Different Choices for (Terminal / Printers / Capacity / Application) | Yes/No Form | | | 41 | RetTrzEastTPC1 | Yes | If Not Value Skip Over | |
| 304 | RetIntegNr4mod8 | Tranz460/Integrated/230/NR4MOD8 | Your Solution. Tap YES if Calculator will more to Pricing, Or Tap PREVIOUS & Make Different Choices for (Terminal / Printers / Capacity / Application) | Yes/No Form | | | 42 | RetTrzEastTPC2 | Yes | If Not Value Skip Over | |
| 305 | RetTrz2Mdbp5 | Tranz330/Tranz2/200/MDBP005 | Your Solution. Tap YES if Calculator will more to Pricing, Or Tap PREVIOUS & Make Different Choices for (Terminal / Printers / Capacity / Application) | Yes/No Form | | | 60 | RetTrzCenTPC | Yes | If Not Value Skip Over | |
| | | | Your Solution. Tap YES if | | | | | | | If | |

| | | | | | | | | | | |
|---|---|---|---|---|---|---|---|---|---|---|
| 306 | RetTrz2Mdp3805 | Tranz380/Tranz2/500+/MDP3805 | Calculator will more to Pricing, Or Tap PREVIOUS & Make Different Choices for (Terminal / Printers / Capacity / Application) | Yes/No Form | | | 61 | RetTrzCenTPC1 | Yes | Not Value Skip Over |
| 307 | RetIntegMdp4602 | Tranz460/Integrate/500+/MDP4602 | Your Solution. Tap YES if Calculator will more to Pricing, Or Tap PREVIOUS & Make Different Choices for (Terminal / Printers / Capacity / Application) | Yes/No Form | | | 62 | RetTrzCenTPC2 | Yes | If Not Value Skip Over |
| 308 | RetOmni1Soft21 | Omni396/Omni1/300+/Softpay2.1 | Your Solution. Tap YES if Calculator will more to Pricing, Or Tap PREVIOUS & Make Different Choices for (Terminal / Printers / Capacity / Application) | Yes/No Form | | | 77 | RetOmniEstTPC | Yes | If Not Value Skip Over |
| 309 | RetNoneSoft21 | Omni3200/None/300+/Softpay2.1 | Your Solution. Tap YES if Calculator will more to Pricing, Or Tap PREVIOUS & Make Different Choices for (Terminal / Printers / Capacity / Application) | Yes/No Form | | | 78 | RetOmniEstTPC1 | Yes | If Not Value Skip Over |
| 310 | RetT7pT7ndci8 | HypercomT7/T7P/300/T7_NDCI.008 | Your Solution. Tap YES if Calculator will more to Pricing, Or Tap PREVIOUS & Make Different Choices for (Terminal / Printers / Capacity / Application) | Yes/No Form | | | 91 | RetHypEstTPC | Yes | If Not Value Skip Over |
| 311 | RetT77T7ndci8 | HypercomT77/T77/300/T7_NDCI.008 | Your Solution. Tap YES if Calculator will more to Pricing, Or Tap PREVIOUS & Make Different Choices for (Terminal / Printers / Capacity / Application) | Yes/No Form | | | 92 | RetHypEstTPC1 | Yes | If Not Value Skip Over |
| 312 | RetT8T7ndci8 | HypercomT8/T8/300/T7_NDCI.008 | Your Solution. Tap YES if Calculator will more to Pricing, Or Tap PREVIOUS & Make Different Choices for (Terminal / Printers / Capacity / Application) | Yes/No Form | | | 93 | RetHypEstTPC2 | Yes | If Not Value Skip Over |
| 313 | RetIntegT7mappp8 | HypcmT7/Integ./380/T7_MAPPP.008 | This is the Solution you have Selected "HypercomT7 / Integrated / 380 / T7_MAPPP.008". If You Tap YES the Calculator will take you to | Yes/No Form | | | 114 | RetHypCenTPC | Yes | If Not Value |

A-91

| | | | | | | | | | | | | |
|---|---|---|---|---|---|---|---|---|---|---|---|---|
| | | | the Pricing, Or Tap PREVIOUS & Make the Different Choices. (Terminal / Printers / Capacity / Application) | | | | | | | | Skip Over | |
| 314 | RetT77T7mappp8 | HypcomT77/T77/380/T7_MAPPP.008 | This is the Solution you have Selected "HypercomT77 / T77 / 380 / T7_MAPPP.008". If You Tap YES the Calculator will take you to the Pricing, Or Tap PREVIOUS & Make the Different Choices. (Terminal / Printers / Capacity / Application) | Yes/No Form | | | | | 115 | RetHypCenTPC1 | Yes | If Not Value Skip Over | |
| 315 | ResTrz1Ndt3460 | Tranz330/Tranz1/125/NDT3460 | Your Solution. Tap YES if Calculator will more to Pricing, Or Tap PREVIOUS & Make Different Choices for (Terminal / Printers / Capacity / Application) | Yes/No Form | | | | | 137 | ResT330EstTPC | Yes | If Not Value Skip Over | |
| 316 | ResTrz1Ndt890 | Tranz380/Tranz1/300/NDT8090 | Your Solution. Tap YES if Calculator will more to Pricing, Or Tap PREVIOUS & Make Different Choices for (Terminal / Printers / Capacity / Application) | Yes/No Form | | | | | 154 | ResT460EstTPC | Yes | If Not Value Skip Over | |
| 317 | ResIntegNdt4630 | Tranz460/Integrated/300/NDT4630 | Your Solution. Tap YES if Calculator will more to Pricing, Or Tap PREVIOUS & Make Different Choices for (Terminal / Printers / Capacity / Application) | Yes/No Form | | | | | 155 | ResT460EstTPC1 | Yes | If Not Value Skip Over | |
| 318 | ResOmni1Soft21 | Omni396/Omni1/300+/Softpay2.1 | Your Solution. Tap YES if Calculator will more to Pricing, Or Tap PREVIOUS & Make Different Choices for (Terminal / Printers / Capacity / Application) | Yes/No Form | | | | | 171 | ResOmniEstTPC | Yes | If Not Value Skip Over | |
| 319 | ResNoneSoft21 | Omni3200/None/300+/Softpay2.1 | Your Solution. Tap YES if Calculator will more to Pricing, Or Tap PREVIOUS & Make Different Choices for (Terminal / Printers / Capacity / Application) | Yes/No Form | | | | | 172 | ResOmniEstTPC1 | Yes | If Not Value Skip Over | |
| | | | Your Solution. Tap YES if Calculator will more to | | | | | | | | | If Not | |

A-92

| 320 | ResT7pT7ndci8 | HypercomT7/T7P/300/T7_NDCI.008 | Your Solution. Tap YES if Calculator will more to Pricing, Or Tap PREVIOUS & Make Different Choices for (Terminal / Printers / Capacity / Application) | Yes/No Form | | | | 186 | ResHypEstTPC | Yes | Value Skip Over | |
|---|---|---|---|---|---|---|---|---|---|---|---|---|
| 321 | ResT77T7ndci8 | HypercomT77/T77/300/T7_NDCI.008 | Your Solution. Tap YES if Calculator will more to Pricing, Or Tap PREVIOUS & Make Different Choices for (Terminal / Printers / Capacity / Application) | Yes/No Form | | | | 187 | ResHypEstTPC1 | Yes | If Not Value Skip Over | |
| 322 | ResT8T7ndci8 | HypercomT8/T8/300/T7_NDCI.008 | Your Solution. Tap YES if Calculator will more to Pricing, Or Tap PREVIOUS & Make Different Choices for (Terminal / Printers / Capacity / Application) | Yes/No Form | | | | 188 | ResHypEstTPC2 | Yes | If Not Value Skip Over | |
| 323 | ResTranz2Mcrs4 | Tranz330/Tranz2/75/MCRS004 | Your Solution. Tap YES if Calculator will more to Pricing, Or Tap PREVIOUS & Make Different Choices for (Terminal / Printers / Capacity / Application) | Yes/No Form | | | | 206 | ResT330CenTPC | Yes | If Not Value Skip Over | |
| 324 | ResTrz3Mcr3802 | Tranz380/Tranz3/500/MCR3802 | Your Solution. Tap YES if Calculator will more to Pricing, Or Tap PREVIOUS & Make Different Choices for (Terminal / Printers / Capacity / Application) | Yes/No Form | | | | 220 | ResT380CenTPC | Yes | If Not Value Skip Over | |
| 325 | LodgTrz4Nft330 | Tranz330/Tranz4/75/NFT3030 | Your Solution. Tap YES if Calculator will more to Pricing, Or Tap PREVIOUS & Make Different Choices for (Terminal / Printers / Capacity / Application) | Yes/No Form | | | | 238 | FrontDeskTPC | Yes | If Not Value Skip Over | |
| 326 | LodgTrz1Nft810 | Tranz380/Tranz1/350/NFT8010 | Your Solution. Tap YES if Calculator will more to Pricing, Or Tap PREVIOUS & Make Different Choices for (Terminal / Printers / Capacity / Application) | Yes/No Form | | | | 239 | FrontDeskTPC1 | Yes | If Not Value Skip Over | |
| 327 | LodgTrz4Nft810 | Tranz380/Tranz4/250/NFT8010 | Your Solution. Tap YES if Calculator will more to Pricing, Or Tap PREVIOUS & Make Different Choices for (Terminal / Printers / Capacity / Application) | Yes/No Form | | | | 259 | Hosp380ATPCA | Yes | If Not Value Skip Over | |
| | | | Your Solution. Tap YES if | | | | | | | | | |

A-93

| 328 | LodgTrz4Nft811 | Tranz380/Tranz4/250/NFT8011 | Calculator will more to Pricing, Or Tap PREVIOUS & Make Different Choices for (Terminal / Printers / Capacity / Application) | Yes/No Form | | | | 260 | Hosp380ATPCA1 | Yes | If Not Value Skip Over | |
|---|---|---|---|---|---|---|---|---|---|---|---|---|
| 329 | LodgTrz4Nft812 | Tranz380/Tranz4/250/NFT8012 | Your Solution. Tap YES if Calculator will more to Pricing, Or Tap PREVIOUS & Make Different Choices for (Terminal / Printers / Capacity / Application) | Yes/No Form | | | | 261 | Hosp380ATPCA2 | Yes | If Not Value Skip Over | |
| 330 | LodgT7PT7glod4 | HypercomT7/T7P/400/T7_GLOD.004 | Your Solution. Tap YES if Calculator will more to Pricing, Or Tap PREVIOUS & Make Different Choices for (Terminal / Printers / Capacity / Application) | Yes/No Form | | | | 275 | HospitalT7TPC | Yes | If Not Value Skip Over | |
| 331 | LodgT77T7glod4 | HypercomT77/T77/400/T7GLOD.004 | Your Solution. Tap YES if Calculator will more to Pricing, Or Tap PREVIOUS & Make Different Choices for (Terminal / Printers / Capacity / Application) | Yes/No Form | | | | 276 | HospitalT7TPC1 | Yes | If Not Value Skip Over | |
| 332 | LodgT8T7glod4 | HypercomT8/T8/400/T7_GLOD.004 | Your Solution. Tap YES if Calculator will more to Pricing, Or Tap PREVIOUS & Make Different Choices for (Terminal / Printers / Capacity / Application) | Yes/No Form | | | | 277 | HospitalT7TPC2 | Yes | If Not Value Skip Over | |
| 333 | LodgTrz3Mldg5 | Tranz380/Tranz3/400/MLDG005 | Your Solution. Tap YES if Calculator will more to Pricing, Or Tap PREVIOUS & Make Different Choices for (Terminal / Printers / Capacity / Application) | Yes/No Form | | | | 294 | Hosp380STPC | Yes | If Not Value Skip Over | |
| 334 | AlreadyOwn1 | Pick the appropriate response. | Already own this solution | Single MC | | | | 0 | | | | |
| 335 | Rent | Multiple Choice | Wish to Rent | MC & Skip List | | | | 0 | | | | |
| 336 | Purchase | Multiple Choice | Wish to Purchase | MC & Skip List | | | | 0 | | | | |
| | | | | MC & | | | | | | | | |

*A-94*

| 337 | Lease | Multiple Choice | Wish to Lease | Skip List | | | | | | | If Value Skip Over | |
|---|---|---|---|---|---|---|---|---|---|---|---|---|
| 338 | EndList67 | End List | End List | No GUI | | | | 0 | | | | |
| 339 | Price | Enter the Price: | Tap Keyboard, tap 123, enter the Price, tap Done, tap Next. | Text Form | | | 334 | AlreadyOwn1 | Yes | If Value Skip Over | |
| 340 | Quantity | 0000, 9999 | Tap numbers to enter the quantity of Equipment. | Number Form | | | 334 | AlreadyOwn1 | Yes | If Value Skip Over | |
| 341 | PPUnit | Purchase Per Unit: | Tap Keyboard, tap 123, enter the purchase per unit cost, tap Done, tap Next. | Text Form | | | 334 | AlreadyOwn1 | Yes | If Value Skip Over | |
| 342 | ImprintNeed | Imprinter needed? | Tap Yes if an imprinter is needed. | Yes/No Form | | | 349 | AlreadyOwn | No | If Value Skip | |
| 343 | ImprintType | Type of Imprinter: | Regular | MC & Skip List | | | | 0 | | | | |
| 344 | ImprintType1 | Multiple Choice. | Portable | MC & Skip List | | | | 0 | | | | |
| 345 | EndList59 | EndList | EndList | No GUI | | | | 0 | | | | |
| 346 | PlateQuan | 000, 999 | Tap numbers to enter quantity of imprinters. | Number Form | | | | | | | | |
| 347 | PlasticQuan | 000, 999 | Tap numbers to enter quantity of plastic imprinters. | Number Form | | | | | | | | |
| 348 | PPUnit1 | Purchase Per Unit. | Tap Keyboard, tap 123, enter the purchase per unit cost, tap Done, tap Next. | Text Form | | | | | | | | |
| 349 | AlreadyOwn | Already own one? | Tap Yes if the customer already owns a Regular Imprinter. | Yes/No Form | | | 342 | ImprintNeed | Yes | If Value Skip Over | |
| 350 | OwnAmex | Already own one? | Tap Yes if the customer already owns an AMEX Imprinter. | Yes/No Form | | | 342 | ImprintNeed | Yes | If Value Skip Over | |
| | | | Tap Yes if you do not want | | | | | | | | | |

A-95

| 351 | DontWant | Do not want one? | one. By checking the box, the merchant acknowledges to Global Payments that an imprint is required for non-swiped transactions. | Yes/No Form | | | | 349 | AlreadyOwn | | Yes | If Value Skip Over | |
| 352 | Commt | Do you have any Comments? | Tap Yes if you have any Comments. | Yes/No Form | | | | 65535 | END | | No | If Value Skip | |
| 353 | CommtTxt | Enter the Comments: | Tap Keyboard, enter the Comments, tap Done, tap Next. | Text Form | | | | | | | | | |

Confidential Property of Numoda Corporation Engineering Department

| | Date: | 10/08/2001 | | | |
|---|---|---|---|---|---|
| | Title: | LisRetail_TranzEast | | | |
| | Name: | S00001545_V1 | Reviewed by: | | |
| | SurveyID: | 1545 | Application: | | Date: |
| NUMODA | Questions to copy: | 0 | QA: | | Date: |
| | Next Survey: | 0 -- No Survey | Management: | | Date: |
| Application Listing | How to Sync: | Desktop to Palm by User | Customer: | | Date: |
| | Type: | List | | | |

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | LisRetailTranzE | Retail Tranz East Features Set, pick "This List Covers My Needs" or if uou require other Features, Select Previous & Pick another Features Set. | List of Choices. | List Form | | | | | | | | | | | 26 | V Text |

| Mobile ID | LisRetailTranzE |
|---|---|
| 0 | 2-Transaction Set_Auth Only |
| | |

A-96

| | |
|---|---|
| 0 | 4-Transaction Set_Debit Purch/Return |
| 0 | 6-Transaction Set_Debit Cash Back |
| 0 | 7-Transaction Set_Check Services |
| 0 | 10-Industry Compliance_Amex Market Data |
| 0 | 11-Adjustments_Void |
| 0 | 12-Adjustments_Correction |
| 0 | 13-Host Processing_Hub Settlement |
| 0 | 15-Host Processing_Amex Split Dial (Auth) |
| 0 | 16-Host Processing_Term-based Processing |
| 0 | 18-Host Processing_Auto_settle |
| 0 | 19-Setup Options_Amount Ceiling |
| 0 | 20-Setup Options_Demo Mode |
| 0 | 21-Setup Options_Fraud Control |
| 0 | 22-Setup Options_Optional Data Fields |
| 0 | 23-Setup Options_Cust Discretionary Data |
| 0 | 24-Setup Options_Product Code |
| 0 | 25-Setup Options_Clerk Prompt |
| 0 | 26-Setup Options_Clerk ID Table |
| 0 | 27-Setup Options_Password Protect |
| | 28-Setup |

| | |
|---|---|
| 0 | Options_AVS/MOTO |
| 0 | 29-Setup Options_Card Truncation |
| 0 | 30-Reports/Reviews_Card summary |
| 0 | 31-Reports/Reviews_Batch summary |
| 0 | 33-Reports/Reviews_Altered Transactions |
| 0 | 34-Reports/Reviews_Card Totals |
| 0 | 35-Reports/Reviews_Batch Detail |
| 0 | 36-Reports/Reviews_Batch Totals |
| 0 | 37-Other Features_Dynamic Download |
| 0 | 46-Communication_Async |
| 0 | This List Covers My Needs |

Confidential Property of Numoda Corporation Engineering Department

NUMODA
Application Listing

Date: 10/08/2001
Title: LisRetail_TranzCentral
Name: S00001546_V1
SurveyID: 1546
Questions to copy: 0
Next Survey: 0 -- No Survey
How to Sync: Desktop to Palm by User
Type: List Reviewed by:
Application: _____ Date: _____
QA: _____ Date: _____
Management: _____ Date: _____
Customer: _____ Date: _____

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| | | Retail Tranz Center Features Set, | | | | | | | | | | | | | | |

A-98

| | | | | | | | | | | | | | | | | | |
|---|---|---|---|---|---|---|---|---|---|---|---|---|---|---|---|---|---|
| 1 | LisRetailTranzC | pick "This List Covers My Needs" or if you require other Features, Select Previous & Pick another Features Set. | List of Choices. | List Form | | | | | | | | | | | | 26 | V Text |

| Mobile ID | LisRetailTranzC |
|---|---|
| 0 | 2-Transaction Set_Auth Only |
| 0 | 3-Transaction Set_Pre-Auth |
| 0 | 4-Transaction Set_Debit Purch/Return |
| 0 | 5-Transaction Set_Debit Balance Inq |
| 0 | 6-Transaction Set_Debit Cash Back |
| 0 | 7-Transaction Set_Check Services |
| 0 | 10-Industry Compliance_Amex Market Data |
| 0 | 11-Adjustments_Void |
| 0 | 17-Host Processing_Host-Based Processing |
| 0 | 20-Setup Options_Demo Mode |
| 0 | 21-Setup Options_Fraud Control |
| 0 | 22-Setup Options_Optional Data Fields |
| 0 | 23-Setup Options_Cust Discretionary Data |
| 0 | 24-Setup Options_Product Code |
| 0 | 25-Setup Options_Clerk Prompt |

*A-99*

| 0 | 26-Setup Options_Clerk ID Table |
|---|---|
| 0 | 27-Setup Options_Password Protect |
| 0 | 28-Setup Options_AVS/MOTO |
| 0 | 29-Setup Options_Card Truncation |
| 0 | 30-Reports/Reviews_Card summary |
| 0 | 31-Reports/Reviews_Batch summary |
| 0 | 32-Reports/Reviews_Host Totals |
| 0 | 34-Reports/Reviews_Card Totals |
| 0 | 35-Reports/Reviews_Batch Detail |
| 0 | 36-Reports/Reviews_Batch Totals |
| 0 | 38-Other Features_Auto Retry |
| 0 | 39-Other Features_Purchase Card Level2 |
| 0 | 40-Other Features_Trans Search & Report |
| 0 | 41-Other Features_Auto Reconcil |
| 0 | 42-Other Features_Auto Update |
| 0 | 46-Communication_Async |
| 0 | This List Covers My Needs |

Confidential Property of Numoda Corporation Engineering Department

Date: 10/08/2001
Title: LisRetail_OmniEast
Name: S00001547_V1     Reviewed by:
SurveyID: 1547          Application: _____ Date:_____

*A-100*

| | Questions to copy: | 0 | QA: _____ | Date:_____ |
|---|---|---|---|---|
| | Next Survey: | 0 -- No Survey | Management: _____ | Date:_____ |
| | How to Sync: | Desktop to Palm by User | Customer: _____ | Date:_____ |
| Application Type: | | List | | |
| Listing | | | | |

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | LisRetailOmniE | Retail Omni East Features Set, pick "This List Covers My Needs" or if you require other Features, Select Previous & Pick another Features Set | List of Choices. | List Form | | | | | | | | | | | 26 | V Text |

| Mobile ID | LisRetailOmniE |
|---|---|
| 0 | 2-Transaction Set_Auth Only |
| 0 | 4-Transaction Set_Debit Purch/Return |
| 0 | 6-Transaction Set_Debit Cash Back |
| 0 | 7-Transaction Set_Check Services |
| 0 | 10-Industry Compliance_Amex Market Data |
| 0 | 11-Adjustments_Void |
| 0 | 13-Host Processing_Hub Settlement |
| | 14-Host Processing_Amex |

*A-101*

| | |
|---|---|
| 0 | PIP Processing |
| 0 | 15-Host Processing_Amex Split Dial (Auth) |
| 0 | 16-Host Processing_Term-based Processing |
| 0 | 18-Host Processing_Auto settle |
| 0 | 20-Setup Options_Demo Mode |
| 0 | 21-Set Options_Fraud Control |
| 0 | 24-Setup Options_Product Code |
| 0 | 25-Setup Options_Clerk Prompt |
| 0 | 26-Setup Options_Clerk ID Table |
| 0 | 27-Setup Options_Password Protect |
| 0 | 28-Setup Options_AVS/MOTO |
| 0 | 30-Reports/Reviews_Card summary |
| 0 | 31-Reports/Reviews_Batch summary |
| 0 | 35-Reports/Reviews_Batch Detail |
| 0 | 36-Reports/Reviews_Batch Totals |
| 0 | 45-Communication_Sync |
| 0 | This List Covers My Needs |

Confidential Property of Numoda Corporation Engineering Department

NUMODA

Date: 10/08/2001
Title: LisRetail_HypercomEast
Name: S00001548_V1      Reviewed by:
SurveyID: 1548          Application: _____ Date:_____
Questions to copy: 0    QA: _____ Date:_____

*A-102*

| Application Listing | Next Survey: | 0 -- No Survey | Management: _____ | Date:_____ |
| | How to Sync: | Desktop to Palm by User | Customer: _____ | Date:_____ |
| | Type: | List | | |

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | LisRetailHypcomE | Retail Hypercom East Features Set, pick "This List Covers My Needs" or if you require other Features, Select Previous & Pick another Features Set. | List of Choices. | List Form | | | | | | | | | | | 26 | V Text |

| Mobile ID | LisRetailHypcomE |
|---|---|
| 0 | 2-Transaction Set_Auth Only |
| 0 | 4-Transaction Set_Debit Purch/Return |
| 0 | 6-Transaction Set_Debit Cash Back |
| 0 | 7-Transaction Set_Check Services |
| 0 | 10-Industry Compliance_Amex Market Data |
| 0 | 11-Adjustments_Void |
| 0 | 12-Adjustments_Correction |
| 0 | 14-Host Processing_Amex PIP Processing |
| 0 | 16-Host Processing_Term- |

*A-103*

| | |
|---|---|
| | based Processing |
| 0 | 18-Host Processing_Auto_settle |
| 0 | 21-Setup Options_Fraud Control |
| 0 | 22-Setup Options_Optional Data Fields |
| 0 | 25-Setup Options_Clerk Prompt |
| 0 | 27-Setup Options_Password Protect |
| 0 | 28-Setup Options_AVS/MOTO |
| 0 | 29-Setup Options_Card Truncation |
| 0 | 30-Reports/Reviews_Card summary |
| 0 | 31-Reports/Reviews_Batch summary |
| 0 | 34-Reports/Reviews_Card Totals |
| 0 | 35-Reports/Reviews_Batch Detail |
| 0 | 36-Reports/Reviews_Batch Totals |
| 0 | 45-Communication_Sync |
| 0 | This List Covers My Needs |

Confidential Property of Numoda Corporation Engineering Department

NUMODA
Application Listing

| | | | | |
|---|---|---|---|---|
| Date: | 10/08/2001 | | | |
| Title: | LisRetail_HypercomCentral | | | |
| Name: | S00001549_V1 | Reviewed by: | | |
| SurveyID: | 1549 | Application: | | Date: |
| Questions to copy: | 0 | QA: | | Date: |
| Next Survey: | 0 -- No Survey | Management: | | Date: |
| How to Sync: | Desktop to Palm by User | Customer: | | Date: |

Type: List

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | LisRetailHypcomC | | Retail Hypercom Central Features Set, pick "This List Covers My Needs" or if you require other Features, Select Previous & Pick another Features Set. | List of Choices. | List Form | | | | | | | | | | 26 | V Text |

| Mobile ID | LisRetailHypcomC |
|---|---|
| 0 | 2-Transaction Set_Auth Only |
| 0 | 3-Transaction Set_Pre-Auth |
| 0 | 4-Transaction Set_Debit Purch/Return |
| 0 | 5-Transaction Set_Debit Balance Inq |
| 0 | 6-Transaction Set_Debit Cash Back |
| 0 | 7-Transaction Set_Check Services |
| 0 | 10-Industry Compliance_Amex Market Data |
| 0 | 11-Adjustments_Void |
| 0 | 17-Host Processing_Host-Based Processing |
| 0 | 20-Setup Options_Demo |

*A-105*

|   |   |
|---|---|
|   | Mode |
| 0 | 21-Setup Options_Fraud Control |
| 0 | 22-Setup Options_Optional Data Fields |
| 0 | 23-Setup Options_Cust Discretionary Data |
| 0 | 24-Setup Options_Product Code |
| 0 | 25-Setup Options_Clerk Prompt |
| 0 | 26-Setup Options_Clerk ID Table |
| 0 | 27-Setup Options_Password Protect |
| 0 | 28-Setup Options_AVS/MOTO |
| 0 | 29-Setup Options_Card Truncation |
| 0 | 30-Reports/Reviews_Card summary |
| 0 | 31-Reports/Reviews_Batch summary |
| 0 | 32-Reports/Reviews_Host Totals |
| 0 | 34-Reports/Reviews_Card Totals |
| 0 | 35-Reports/Reviews_Batch Detail |
| 0 | 36-Reports/Reviews_Batch Totals |
| 0 | 38-Other Features_Auto Retry |
| 0 | 39-Other Features_Purchase Card Level2 |
| 0 | 40-Other Features_Trans Search & Report |
| 0 | 41-Other Features_Auto Reconcil |

*A-106*

| | |
|---|---|
| 0 | 42-Other Features_Auto Update |
| 0 | 46-Communication_Async |
| 0 | This List Covers My Needs |

Confidential Property of Numoda Corporation Engineering Department

NUMODA
Application Listing

Date: 10/08/2001
Title: LisRestaurantT330East
Name: S00001551_V1
SurveyID: 1551
Questions to copy: 0
Next Survey: 0 -- No Survey
How to Sync: Desktop to Palm by User
Type: List Reviewed by:
Application: _____ Date: _____
QA: _____ Date: _____
Management: _____ Date: _____
Customer: _____ Date: _____

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXRestauT330E | Restaurant T330 East Features Set, pick "This List Covers My Needs" or if you require other Features, Select Previous & Pick another Features Set. | List of Choices. | List Form | | | | | | | | | | | 0 | V Text |

| Mobile ID | XXRestauT330E |
|---|---|
| 0 | 2-Transaction Set_Auth Only |
| 0 | 5-Transaction Set_Check Services |
| 0 | 8-Transaction Set_Private |

*A-107*

|  | Lable |
|---|---|
| 0 | 9-Adjustments_Tip Adjustment |
| 0 | 11-Adjustments_Correction |
| 0 | 12-Host Processing_Hub Settlement |
| 0 | 14-Host Processing_Auto_settle |
| 0 | 15-Host Processing_Amex Split Dial |
| 0 | 16-Host Processing_Term-based Processing |
| 0 | 18-Setup Options_Demo Mode |
| 0 | 19-Setup Options_Fraud Control |
| 0 | 21-Setup Options_Product Code |
| 0 | 22-Setup Options_Server Prompt |
| 0 | 23-Setup Options_Waiter Banking |
| 0 | 25-stup Options_Additional Auth % |
| 0 | 26-Setup Options_Auto Server Update |
| 0 | 28-Setup Options_Tip Table |
| 0 | 29-Setup Options_Ticket Number |
| 0 | 30-Setup Options_Covers Prompt |
| 0 | 34-Reports/Receipts_Server Summary |
| 0 | 35-Reports/Receipts_server Detail |
| 0 | 36-Reports/Receipts_Card summary |
|  | 37-Reports/Receipts_Batch |

*A-108*

| 0 | summary |
|---|---|
| 0 | 38-Reports/Receipts_Batch Detail |
| 0 | 42-Local Reviews_Tip Edit Check |
| 0 | 43-Local Reviews_Card summary |
| 0 | 44-Local Reviews_Batch Totals |
| 0 | 46-Communication_Async |
| 0 | This List Covers My Needs |

Confidential Property of Numoda Corporation Engineering Department

| | Date: | 10/08/2001 | | |
|---|---|---|---|---|
| | Title: | LisRestaurantT460East | | |
| | Name: | S00001552_V1 | Reviewed by: | |
| | SurveyID: | 1552 | Application: | Date: |
| NUMODA | Questions to copy: | 0 | QA: | Date: |
| | Next Survey: | 0 -- No Survey | Management: | Date: |
| Application Listing | How to Sync: | Desktop to Palm by User | Customer: | Date: |
| | Type: | List | | |

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXRestauT460E | Restaurant T330 East Features Set, pick "This List Covers My Needs" or if you require other Features, Select Previous & Pick another Features Set | List of Choices. | List Form | | | | | | | | | | | 0 | V Text |

*A-109*

| Mobile ID | XXRestauT460E |
|---|---|
| 0 | 3-Transaction Set_Open/Close tab |
| 0 | 4-Transaction Set_Debit Purch/Return |
| 0 | 5-Transaction Set_Check Services |
| 0 | 8-Transaction Set_Private Label |
| 0 | 9-Adjustments_Tip Adjustment |
| 0 | 10-Adjustments_Void |
| 0 | 11-Adjustments_Correction |
| 0 | 12-Host Processing_Hub Settlement |
| 0 | 14-Host Processing_Auto_settle |
| 0 | 15-Host Processing_Amex Split Dial |
| 0 | 16-Host Processing_Term-based Processing |
| 0 | 18-Setup Options_Demo Mode |
| 0 | 19-Setup Options_Fraud Control |
| 0 | 21-Setup Options_Product Code |
| 0 | 22-Setup Options_Server Prompt |
| 0 | 23-Setup Options_Waiter Banking |
| 0 | 24-Setup Options_Central Cashier |
| 0 | 25-Setup Options_Additional Auth % |
| 0 | 26-Setup Options_Auto Server Update |

*A-110*

| | |
|---|---|
| 0 | 27-Setup Options_Server ID Table |
| 0 | 28-Setup Options_Tip Table |
| 0 | 29-Setup Options_Ticket Number |
| 0 | 30-Setup Options_Covers Prompt |
| 0 | 33-Setup Options_Card Truncation |
| 0 | 34-Reports/Receipts_Server Summary |
| 0 | 35-Reports/Receipts_Server Detail |
| 0 | 36-Reports/Receipts_Card summary |
| 0 | 37-Reports/Receipts_Batch summary |
| 0 | 38-Reports/Receipts_Batch Detail |
| 0 | 40-Reports/Receipts_Tip Edit Check |
| 0 | 42-Local Reviews_Tip Edit Check |
| 0 | 43-Local Reviews_Card summary |
| 0 | 44-Local Reviews_Batch Totals |
| 0 | 46-Communication_Async |
| 0 | This List Covers My Needs |

Confidential Property of Numoda Corporation Engineering Department

| | | | | |
|---|---|---|---|---|
| Date: | 10/08/2001 | | | |
| Title: | LisRestaurantOmniEast | | | |
| Name: | S00001553_V1 | Reviewed by: | | |
| SurveyID: | 1553 | Application: | | Date: |
| Questions to copy: | 0 | QA: | | Date: |
| Next Survey: | 0 -- No Survey | Management: | | Date: |

| Application Listing | How to Sync Type: | Desktop to Palm by User List | Customer: | Date: |
|---|---|---|---|---|

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXRestauOmniE | Restaurant Omni East Features Set, pick "This List Covers My Needs" or if you require other Features, Select Previous & Pick another Features Set. | List of Choices. | List Form | | | | | | | | | | | 0 | V Text |

| Mobile ID | XXRestauOmniE |
|---|---|
| 0 | 2-Transaction Set_Auth Only |
| 0 | 3-Transaction Set_Open/Close tab |
| 0 | 4-Transaction Set_Debit Purch/Return |
| 0 | 5-Transaction Set_Check Services |
| 0 | 6-Transaction Set_Cash |
| 0 | 9-Adjustments_Tip Adjustment |
| 0 | 10-Adjustments_Void |
| 0 | 11-Adjustments_Correction |
| 0 | 12-Host Processing_Hub Settlement |
| 0 | 13-Host Processing_Amex PIP Processing |
| 0 | 14-Host |

*A-112*

|   |                                          |
|---|------------------------------------------|
|   | Processing_Auto_settle                   |
| 0 | 15-Host Processing_Amex Split Dial       |
| 0 | 16-Host Processing_Term-based Processing |
| 0 | 18-Setup Options_Demo Mode               |
| 0 | 19-Setup Options_Fraud Control           |
| 0 | 21-Setup Options_Product Code            |
| 0 | 22-Setup Options_Server Prompt           |
| 0 | 23-Setup Options_Waiter Banking          |
| 0 | 25-Setup Options_Additional Auth %       |
| 0 | 27-Setup Options_Server ID Table         |
| 0 | 29-Setup Options_Ticket Number           |
| 0 | 31-Setup Options_Tax Calculation         |
| 0 | 32-Setup Options_Tip Discounting         |
| 0 | 34-Reports/Receipts_Server Summary       |
| 0 | 35-Reports/Receipts_Server Detail        |
| 0 | 36-Reports/Receipts_Card summary         |
| 0 | 37-Reports/Receipts_Batch summary        |
| 0 | 38-Reports/Receipts_Batch Detail         |
| 0 | 39-Reports/Receipts_Tip Discount         |
|   | 40-Reports/Receipts_Tip Edit             |

*A-113*

| | |
|---|---|
| 0 | Check |
| 0 | 41-Local Reviews_Server Detail/Summary |
| 0 | 44-Local Reviews_Batch Totals |
| 0 | 45-Communication_Sync |
| 0 | This List Covers My Needs |

Confidential Property of Numoda Corporation Engineering Department

| | | |
|---|---|---|
| Date: | 10/08/2001 | |
| Title: | LisRestaurantHypcmEast | |
| Name: | S00001554_V1 | Reviewed by: |
| SurveyID: | 1554 | Application: _____ Date:_____ |
| Questions to copy: | 0 | QA: _____ Date:_____ |
| Next Survey: | 0 -- No Survey | Management: _____ Date:_____ |
| How to Sync: | Desktop to Palm by User | Customer: _____ Date:_____ |
| Type: | List | |

NUMODA
Application Listing

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXRestauHypcmE | Restaurant Hypercom East Features Set, pick "This List Covers My Needs" or if you requireother Features, Select Previous & Pick another Features Set. | List of Choices. | List Form | | | | | | | | | | | 0 | V Text |

| Mobile ID | XXRestauHypcmE |
|---|---|
| | 3-Transaction Set_Open/Close |

*A-114*

| | |
|---|---|
| 0 | tab |
| 0 | 4-Transaction Set_Debit Purch/Retrun |
| 0 | 5-Transaction Set_Check Services |
| 0 | 9-Adjustments_Tip Adjustment |
| 0 | 10-Adjustments_Void |
| 0 | 11-Adjustments_Correction |
| 0 | 13-Host Processing_Amex PIP Processing |
| 0 | 16-Host Processing_Term-based Processing |
| 0 | 19-Setup Options_Fraud Control |
| 0 | 21-Setup Options_Product Code |
| 0 | 22-Setup Options_Server Prompt |
| 0 | 23-Setup Options_Waiter Banking |
| 0 | 24-Setup Options_Central Cashier |
| 0 | 25-Setup Options_Additional Auth % |
| 0 | 27-Setup Options_Server ID Table |
| 0 | 29-Setup Options_Ticket Number |
| 0 | 32-Setup Options_Tip Discounting |
| 0 | 33-Setup Options_Card Truncation |
| 0 | 34-Reports/Receipts_Server Summary |
| 0 | 35-Reports/Receipts_Server Detail |
| | 36-Reports/Receipts_Card |

*A-115*

| | |
|---|---|
| 0 | summary |
| 0 | 37-Reports/Receipts_Batch summary |
| 0 | 38-Reports/Receipts_Batch Detail |
| 0 | 39-Reports/Receipts_Tip Discount |
| 0 | 40-Reports/Receipts_Tip Edit Check |
| 0 | 41-Local Reviews_Server Detail/Summary |
| 0 | 43-Local Reviews_Card summary |
| 0 | 45-Communication_Sync |
| 0 | 46-Communication_Async |
| 0 | This List Covers My Needs |

Confidential Property of Numoda Corporation Engineering Department

NUMODA
Application Listing

Date: 10/08/2001
Title: LisRestaurantT330Cent
Name: S00001555_V1
SurveyID: 1555
Questions to copy: 0
Next Survey: 0 -- No Survey
How to Sync: Desktop to Palm by User
Type: List Reviewed by:
Application: _____ Date:_____
QA: _____ Date:_____
Management: _____ Date:_____
Customer: _____ Date:_____

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXRestauT330C | | Restaurant T330 Central East Features Set, pick "This List Covers My Needs" or if | List of | List | | | | | | | | | | 0 | V |

A-116

| | you requireother Features, Select Previous & Pick another Features Set. | Choices. | Form | | | | | | | | | | Text |
|---|---|---|---|---|---|---|---|---|---|---|---|---|---|

| Mobile ID | XXRestauT330C |
|---|---|
| 0 | 2-Transaction Set_Auth Only |
| 0 | 5-Transaction Set_Check Services |
| 0 | 8-Transactin Set_Private Label |
| 0 | 9-Adjustments_Tip Adjustment |
| 0 | 10-Adjustments_Void |
| 0 | 15-Host Processing_Amex Split Dial |
| 0 | 17-Host Processing_Host-Based Processing |
| 0 | 18-Setup Options_Demo Mode |
| 0 | 19-Setup Options_Fraud Control |
| 0 | 22-Setup Options_Server Prompt |
| 0 | 23-Setup Options_Waiter Banking |
| 0 | 25-Setup Options_Additional Auth % |
| 0 | 26-Setup Options_Auto Server Update |
| 0 | 31-Setup Options_Tax Calculation |
| 0 | 34-Reports/Receipts_Server Summary |
| 0 | 35-Reports/Receipts_Server Detail |

*A-117*

| | |
|---|---|
| 0 | 38-Reports/Receipts_Batch Detail |
| 0 | 41-Local Reviews_Server Detail/Summary |
| 0 | 43-Local Reviews_Card summary |
| 0 | 44-Local Reviews_Batch Totals |
| 0 | 46-Communication_Async |
| 0 | This List Covers My Needs |

Confidential Property of Numoda Corporation Engineering Department

NUMODA
Application Listing

| | |
|---|---|
| Date: | 10/08/2001 |
| Title: | LisRestaurantT380Cent |
| Name: | S00001556_V1 |
| SurveyID: | 1556 |
| Questions to copy: | 0 |
| Next Survey: | 0 -- No Survey |
| How to Sync: | Desktop to Palm by User |
| Type: | List |

Reviewed by:
Application: _____ Date: _____
QA: _____ Date: _____
Management: _____ Date: _____
Customer: _____ Date: _____

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXRestauT380C | Restaurant T380 Central East Features Set, pick "This List Covers My Needs" or if you require other Features, Select Previous & Pick another Features Set. | List of Choices. | List Form | | | | | | | | | | | 0 | V Text |

A-118

| Mobile ID | XXRestauT380C |
|---|---|
| 0 | 2-Transaction Set_Auth Only |
| 0 | 5-Transaction Set_Check Services |
| 0 | 8-Transaction Set_Private Label |
| 0 | 9-Adjustments_Tip Adjustment |
| 0 | 10-Adjustments_Void |
| 0 | 15-Host Processing_Amex Split Dial |
| 0 | 17-Host Processing_Host-Based Processing |
| 0 | 18-Setup Options_Demo Mode |
| 0 | 19-Setup Options_Fraud Control |
| 0 | 22-Setup Options_Server Prompt |
| 0 | 23-Setup Options_Waiter Banking |
| 0 | 25-Setup Options_Additional Auth % |
| 0 | 26-Setup Options_Auto Server Update |
| 0 | 29-Setup Options_Ticket Number |
| 0 | 30-Setup Options_Covers Prompt |
| 0 | 31-Setup Options_Tax Calculation |
| 0 | 34-Reports/Receipts_Server Summary |
| 0 | 35-Reports/Receipts_Server Detail |
| 0 | 38-Reports/Receipts_Batch Detail |
| | 41-Local Reviews_Server |

| | |
|---|---|
| 0 | Detail/Summary |
| 0 | 43-Local Reviews_Card summary |
| 0 | 44-Local Reviews_Batch Totals |
| 0 | 46-Communication_Async |
| 0 | This List Covers My Needs |

Confidential Property of Numoda Corporation Engineering Department

NUMODA
Application Listing

Date: 10/08/2001
Title: LisFront_Desk
Name: S00001557_V1
SurveyID: 1557
Questions to copy: 0
Next Survey: 0 -- No Survey
How to Sync: Desktop to Palm by User
Type: List Reviewed by:
Application: _____ Date: _____
QA: _____ Date: _____
Management: _____ Date: _____
Customer: _____ Date: _____

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXFrontDesk | Lodging Front Desk Features Set, pick "This List Covers My Needs" or if you require other Features, Select Previous & Pick another Features Set. | List of Choices. | List Form | | | | | | | | | | | 0 | V Text |

| Mobile ID | XXFrontDesk |
|---|---|
| 0 | 1-PC_Hub_PC Hub Required |
| 0 | 3-Transaction Set_Check-In |
| 0 | 4-Transaction Set_Check-Out |

*A-120*

| | |
|---|---|
| 0 | 5-Transaction Set_Credit |
| 0 | 6-Transaction Set_After Depart-Sale |
| 0 | 7-Transaction Set_Force Check-In |
| 0 | 9-Transaction Set_Check Services |
| 0 | 10-Transaction Set_Preferred Customer |
| 0 | 11-Transaction Set_Prestigious Property |
| 0 | 19-Industry Compliance_Amex Market Data |
| 0 | 20-Host Processing_PC Hub Settlement |
| 0 | 21-Host Processing_Term-based Processing |
| 0 | 23-Reports/Receipts_Expanded Receipt detail |
| 0 | 24-Reports/Receipts_Card Detail |
| 0 | 25-Reports/Receipts_Card summary |
| 0 | 28-Reports/Receipts_Label Setup |
| 0 | 31-Local Reviews_Trans Type Total |
| 0 | 34-Setup Options_Demo Mode |
| 0 | 35-Setup Options_Fraud Control |
| 0 | 36-Setup Options_Prodcut Code |
| 0 | 37-Setup Options_Clerk Prompt |
| | 38-Setup Options_Clerk ID |

*A-121*

| 0 | Table |
|---|---|
| 0 | 39-Setup Options_Amex Split Dial |
| 0 | 43-Communication_Async |
| 0 | 45-Communication_950/Local/Wats |
| 0 | 46-Communication_PC Hub Auto-polling |
| 0 | This List Covers My Needs |

Confidential Property of Numoda Corporation Engineering Department

NUMODA
Application Listing

Date: 10/08/2001
Title: LisHospitality_380A
Name: S00001558_V1
SurveyID: 1558
Questions to copy: 0
Next Survey: 0 -- No Survey
How to Sync: Desktop to Palm by User
Type: List Reviewed by:
Application: _____ Date:_____
QA: _____ Date:_____
Management: _____ Date:_____
Customer: _____ Date:_____

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXHospital380A | Lodging Hospitality 380A Features Set, pick "This List Covers My Needs" or if you requireother Features, Select Previous & Pick another Features Set. | List of Choices. | List Form | | | | | | | | | | | 0 | V Text |

A-122

| Mobile ID | XXHospital380A |
|---|---|
| 0 | 2-PC Hub_Standalone Product |
| 0 | 3-Transaction Set_Check-In |
| 0 | 4-Transaction Set_Check-Out |
| 0 | 5-Transaction Set_Credit |
| 0 | 6-Transaction Set_After Depart-Sale |
| 0 | 7-Transaction Set_Force Check-In |
| 0 | 8-Transaction Set_Add'l Auth |
| 0 | 9-Transaction Set_Check Services |
| 0 | 10-Transaction Set_Preferred Customer |
| 0 | 11-Transaction Set_Prestigious Property |
| 0 | 12-Adjustments_Change Folio |
| 0 | 15-Adjustments_Change Date |
| 0 | 16-Adjustments_Change Amex Category |
| 0 | 19-Industry Compliance_Amex Market Data |
| 0 | 20-Host Processing_PC Hub Settlement |
| 0 | 21-Host Processing_Term-based Processing |
| 0 | 23-Reports/Receipts_Expanded Receipt detail |
| 0 | 24-Reports/Receipts_Card Detail |
| 0 | 25-Reports/Receipts_Card summary |
| 0 | 26-Reports/Receipts_Aged Open |
| 0 | 27-Reports/Receipts_Altered Transactions |

*A-123*

| | |
|---|---|
| 0 | 28-Reports/Receipts_Label Setup |
| 0 | 32-Local Reviews_Card Type Totals |
| 0 | 33-Local Reviews_Batch Type Totals |
| 0 | 34-Setup Options_Demo Mode |
| 0 | 35-Setup Options_Fraud Control |
| 0 | 36-Setup Options_Product Code |
| 0 | 37-Setup Options_Clerk Prompt |
| 0 | 38-Setup Options_Clerk ID Table |
| 0 | 39-Setup Options_Amex Split Dial |
| 0 | 41-Setup Options_"Quick" check-in |
| 0 | 43-Communication_Async |
| 0 | 45-Communication_950/Local/Wats |
| 0 | 46-Communication_PC Hub Auto-polling |
| 0 | This List Covers My Needs |

Confidential Property of Numoda Corporation Engineering Department

| | | | | |
|---|---|---|---|---|
| | Date: | 10/08/2001 | | |
| | Title: | LisHospitality_T7 | | |
| NUMODA | Name: | S00001559_V1 | Reviewed by: | |
| | SurveyID: | 1559 | Application: _____ | Date:_____ |
| | Questions to copy: | 0 | QA: _____ | Date:_____ |
| Application Listing | Next Survey: | 0 -- No Survey | Management: _____ | Date:_____ |
| | How to Sync: | Desktop to Palm by User | Customer: _____ | Date:_____ |
| | Type: | List | | |

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXHospitalT7 | Lodging Hospitality T7 Features Set, pick "This List Covers My Needs" or if you require other Features, Select Previous & Pick another Features Set. | List of Choices. | List Form | | | | | | | | | | | 0 | V Text |

| Mobile ID | XXHospitalT7 |
|---|---|
| 0 | 2-PC Hub_Standalone Product |
| 0 | 3-Transaction Set_Check-In |
| 0 | 4-Transaction Set_Check-Out |
| 0 | 5-Transaction Set_Credit |
| 0 | 6-Transaction Set_After Depart-Sale |
| 0 | 7-Transaction Set_Force Check-In |
| 0 | 8-Transaction Set_Add'l Auth |
| 0 | 9-Transaction Set_Check Services |
| 0 | 10-Transaction Set_Preferred Customer |
| 0 | 11-Transaction Set_Prestigious Property |
| 0 | 12-Adjustments_Change Folio |
| 0 | 14-Adjustments_Change Room |
| 0 | 15-Adjustments_Change Date |
| 0 | 19-Industry Compliance_Amex Market |

*A-125*

|   | Data |
|---|---|
| 0 | 21-Host Processing_Term-based Processing |
| 0 | 23-Reports/Receipts_Expanded Receipt detail |
| 0 | 24-Reports/Receipts_Card Detail |
| 0 | 25-Reports/Receipts_Card summary |
| 0 | 26-Reports/Receipts_Aged Open |
| 0 | 28-Reports/Receipts_Label Setup |
| 0 | 30-Local Reivews_Detail Transaction |
| 0 | 32-Local Reviews_Card Type Totals |
| 0 | 33-Local Reviews_Batch Type Totals |
| 0 | 35-Setup Options_Fraud Control |
| 0 | 36-Setup Options_Product Code |
| 0 | 37-Setup Options_Clerk Prompt |
| 0 | 38-Setup Options_Clerk ID Table |
| 0 | 40-Setup Options_Amex Reverse PIP |
| 0 | 42-Setup Options_Card Truncation |
| 0 | 44-Communication_Sync |
| 0 | 45-Communication_950/Local/Wats |
| 0 | This List Covers My Needs |

Confidential Property of Numoda Corporation Engineering Department

NUMODA
Application Listing

| | |
|---|---|
| Date: | 10/08/2001 |
| Title: | LisHospitality_380S |
| Name: | S00001560_V1 |
| SurveyID: | 1560 |
| Questions to copy: | 0 |
| Next Survey: | 0 -- No Survey |
| How to Sync: | Desktop to Palm by User |
| Type: | List |

| Reviewed by: | | |
|---|---|---|
| Application: | _____ | Date:_____ |
| QA: | _____ | Date:_____ |
| Management: | _____ | Date:_____ |
| Customer: | _____ | Date:_____ |

| FldID | Field Name | Prompt | Help | GUI | Score | Score Method | Score Value | Skip | Skip Relative | Skip Value | Skip Method | Group | Print On Report | Key | Length | Type |
|---|---|---|---|---|---|---|---|---|---|---|---|---|---|---|---|---|
| 0 | Complete | Complete | Complete | No GUI | | | | | | | | | Yes | | 0 | Date |
| 1 | XXHospital380S | Lodging Hospitality 380S Features Set, pick "This List Covers My Needs" or if you require other Features, Select Previous & Pick another Features Set. | List of Choices. | List Form | | | | | | | | | | | 0 | V Text |

| Mobile ID | XXHospital380S |
|---|---|
| 0 | 2-PC Hub_Standalone Product |
| 0 | 3-Transaction Set_Check-In |
| 0 | 4-Transaction Set_Check-Out |
| 0 | 5-Transaction Set_Credit |
| 0 | 6-Transaction Set_After Depart-Sale |
| 0 | 7-Transaction Set_Force Check-In |
| 0 | 8-Transaction Set_Add'l Auth |
| 0 | 9-Transaction Set_Check |

A-127

|   | Services |
|---|---|
| 0 | 10-Transaction Set_Preferred Customer |
| 0 | 11-Transaction Set_Prestigious Property |
| 0 | 12-Adjustments_Change Folio |
| 0 | 13-Adjustments_Undo Checkout |
| 0 | 14-Adjustments_Change Room |
| 0 | 15-Adjustments_Change Date |
| 0 | 16-Adjustments_Change Amex Category |
| 0 | 19-Industry Compliance_Amex Market Data |
| 0 | 22-Host Processing_Host-Based Processing |
| 0 | 23-Reports/Receipts_Expanded Receipt detail |
| 0 | 24-Reports/Receipts_Card Detail |
| 0 | 25-Reports/Receipts_Card summary |
| 0 | 26-Reports/Receipts_Aged Open |
| 0 | 29-Reports/Receipts_Optional Signature Line |
| 0 | 30-Local Reviews_Detail Transaction |
| 0 | 31-Local Reviews_Trans Type Total |
| 0 | 32-Local Reviews_Card Type Totals |
| 0 | 33-Local Reviews_Batch Type Totals |
|   | 34-Setup Options_Demo |

A-128

| 0 | Mode |
|---|---|
| 0 | 35-Setup Options_Fraud Control |
| 0 | 36-Setup Options_Product Code |
| 0 | 37-Setup Options_Clerk Prompt |
| 0 | 39-Setup Options_Amex Split Dial |
| 0 | 43-Communication_Async |
| 0 | 45-Communication_950/Local/Wats |
| 0 | This List Covers My Needs |

Confidential Property of Numoda Corporation Engineering Department

We claim:

1. A computerized data capture system for processing applications for merchant card service processing accounts, the system having a project database, the project database comprising:
   (a) a plurality of data capture objects that are relevant to the system, wherein a subset of the data capture objects are defined to process applications for merchant card service processing accounts; and
   (b) table structures which define the relationship between the data capture objects, wherein the data capture objects are a type of object used in an object-oriented programming environment, and wherein applications for merchant card service processing accounts are captured and processed using the plurality of data capture objects and the table structures of the project database.

2. The system according to claim 1 wherein the project database includes a plurality of project subsets, and the system further includes (i) a remote data capture input device, and (ii) a central data capture management device, wherein a subset of the plurality of data capture objects necessary to perform a project subset are defined and downloaded from the central data capture management device into the remote data capture input device.

3. The system according to claim 2 wherein the table structure is maintained in the central data capture management device.

4. The system according to claim 2 wherein the input device is a handheld computer.

5. A method of capturing data for applications for merchant card service processing accounts, the captured data being used in a data capture system that processes applications for merchant card service processing accounts, the method comprising:
   (a) creating a project database that processes applications for merchant card service processing accounts, the project database including a plurality of data capture objects that are relevant to the system;
   (b) defining one or more project subsets from a specific subset of the data capture objects to process applications for merchant card service processing accounts; and
   (c) providing the one or more project subsets to one or more data capture input devices; and
   (d) entering data for processing applications for merchant card service processing accounts into the data capture input devices, wherein the data capture objects are a type of object used in an object-oriented programming environment, and wherein applications for merchant card service processing accounts are captured and processed by the data capture input devices using the plurality of data capture objects that are relevant to the system and the one or more project subsets.

6. The method of claim 5 wherein step (a) further comprises partially defining properties of the data capture objects, and step (b) further comprises defining additional properties of the data capture objects after the data capture objects are placed in a project subset so that project subsets may be provided to, and executed in, the data capture input device without using any shared libraries or their code, wherein the additional properties define how the data capture objects are supposed to function in the project subset.

7. The method of claim 6 wherein the additional properties of the data capture objects define which users of the input device are entitled to use the data capture objects and which programs should receive the data capture objects.

8. The method of claim 5 wherein further comprising:
   (e) uploading the data entered into the data capture input device to the project database; and
   (f) the project database distributing the uploaded data to entities that have authority to grant or deny a merchant card service processing account.

9. The method of claim 5 wherein the data capture input devices are mobile, wireless devices.

* * * * *